United States Patent
Lin et al.

(10) Patent No.: US 11,558,873 B2
(45) Date of Patent: Jan. 17, 2023

(54) METHOD AND APPARATUS FOR GROUP SCHEDULING FOR PDCCH OVERHEAD REDUCTION

(71) Applicant: Samsung Electronics Co., Ltd., Suwon-si (KR)

(72) Inventors: Qiongjie Lin, Sunnyvale, CA (US); Aris Papasakellariou, Houston, TX (US); Ebrahim MolavianJazi, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 16/949,598

(22) Filed: Nov. 5, 2020

(65) Prior Publication Data

US 2021/0160879 A1    May 27, 2021

Related U.S. Application Data

(60) Provisional application No. 63/054,556, filed on Jul. 21, 2020, provisional application No. 62/939,319, filed on Nov. 22, 2019.

(51) Int. Cl.
*H04W 72/04* (2009.01)
*H04W 76/30* (2018.01)
(Continued)

(52) U.S. Cl.
CPC ....... *H04W 72/0493* (2013.01); *H04L 1/0003* (2013.01); *H04L 1/1819* (2013.01);
(Continued)

(58) Field of Classification Search
CPC ........... H04W 72/0493; H04W 72/042; H04W 72/0446; H04W 72/0453; H04W 72/1257;
(Continued)

(56) References Cited

U.S. PATENT DOCUMENTS

2016/0295561 A1* 10/2016 Papasakellariou .... H04L 5/0094
2019/0053208 A1*  2/2019 Zhang ................... H04L 5/0053
(Continued)

OTHER PUBLICATIONS

Keysight Technologies UK Ltd., "Correction to NR MAC transport size selection test cases", Change Request, 3GPP TSG-RAN5 Meeting #85, Nov. 18-22, 2019, R5-198173, 99 pages.
(Continued)

*Primary Examiner* — Afshawn M Towfighi

(57) ABSTRACT

Methods and apparatuses for group scheduling for physical downlink control channel (PDCCH) overhead reduction. A method of operating a UE includes receiving first configuration information for reception of first PDCCHs. A PDCCH from the first PDCCHs provides a first downlink control information (DCI) format that includes a first number of information bits. The method further includes receiving second configuration information for a location of a second number of information bits, smaller than the first number of information bits, in the first DCI format; receiving at least one of the first PDCCHs; and determining, from the second number of information bits, values of one or more fields associated with reception of a first physical downlink shared channel (PDSCH) or with transmission of a first physical uplink shared channel (PUSCH).

20 Claims, 16 Drawing Sheets

(51) Int. Cl.
*H04L 1/00* (2006.01)
*H04W 72/12* (2009.01)
*H04W 72/14* (2009.01)
*H04L 1/18* (2006.01)

(52) U.S. Cl.
CPC ..... *H04W 72/042* (2013.01); *H04W 72/0446* (2013.01); *H04W 72/0453* (2013.01); *H04W 72/1257* (2013.01); *H04W 72/14* (2013.01); *H04W 76/30* (2018.02)

(58) Field of Classification Search
CPC ... H04W 72/14; H04W 76/30; H04W 72/121; H04W 72/04; H04L 1/0003; H04L 1/1819; H04L 1/1854; H04L 1/1887; H04L 1/1896; H04L 5/0053; H04L 1/0004
See application file for complete search history.

(56) References Cited

U.S. PATENT DOCUMENTS

| | | | |
|---|---|---|---|
| 2019/0082448 A1* | 3/2019 | Nogami | H04W 72/1289 |
| 2019/0182807 A1 | 6/2019 | Panteleev et al. | |
| 2020/0022144 A1* | 1/2020 | Papasakellariou | H04W 72/0413 |
| 2021/0360592 A1* | 11/2021 | Wei | H04W 72/042 |
| 2021/0392625 A1* | 12/2021 | Lin | H04W 72/042 |
| 2022/0070940 A1* | 3/2022 | Taherzadeh Boroujeni | H04L 5/0053 |
| 2022/0110128 A1* | 4/2022 | Takahashi | H04W 72/0446 |

OTHER PUBLICATIONS

Qualcomm Incorporated, "Update to MAC DL TBS test cases—7.1.7.x.x", Change Request, 3GPP TSG-RAN WG5 Meeting #84, Aug. 26-30, 2019, R5-196005, 21 pages.
International Search Report dated Feb. 18, 2021 in connection with International Patent Application No. PCT/KR2020/016155, 3 pages.
"5G; NR; Physical channelsand modulation (3GPP TS 38.211 version 16.2.0 Release 16)", ETSI TS 138 211 V16.2.0, Jul. 2020,136 pages.
"5G; NR; Multiplexing and channel coding (3GPP TS 38.212 version 16.2.0 Release 16)", ETSI TS 138 212 V16.2.0, Jul. 2020, 154 pages.
"5G; NR; Physical layer procedures for control (3GPP TS 38.213 version 16.2.0 Release 16)", ETSI TS 138 213 V16.2.0, Jul. 2020, 180 pages.
"5G; NR; Physical layer procedures for data (3GPP TS 38.214 version 16.2.0 Release 16)", ETSI TS 138 214 V16.2.0, Jul. 2020, 167 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
"5G; NR; Medium Access Control (MAC) protocol specification (3GPP TS 38.321 version 16.1.0 Release 16)", ETSI TS 138 321 V16.1.0, Jul. 2020, 153 pages.
Extended European Search Report dated Oct. 14, 2022 regarding Application No. 20891241.0, 10 pages.
Samsung, "On UE-Group Common PDCCH", 3GPP TSG RAN WG1 Meeting NR#3, R1-1715981, Sep. 2017, 4 pages.
Samsung, "Functionalities of UE-Common PDCCH", 3GPP TSG RAN WG1 NR ad-Hoc#2, R1-1710698, Jun. 2017, 5 pages.

* cited by examiner

METHOD AND APPARATUS FOR GROUP SCHEDULING FOR PDCCH OVERHEAD REDUCTION

CROSS-REFERENCE TO RELATED APPLICATIONS AND CLAIM OF PRIORITY

The present application claims priority to U.S. Provisional Patent Application No. 62/939,319, filed on Nov. 22, 2019 and U.S. Provisional Patent Application No. 63/054,556, filed on Jul. 21, 2020. The content of the above-identified patent document is incorporated herein by reference.

TECHNICAL FIELD

The present disclosure relates generally to wireless communication systems and, more specifically, the present disclosure relates to a group scheduling for physical downlink control channel (PDCCH) overhead reduction.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates a group scheduling for PDCCH overhead reduction.

In one embodiment, a user equipment (UE) is provided. The UE includes a transceiver configured to receive first configuration information for reception of first PDCCHs. A PDCCH from the first PDCCHs provides a first downlink control information (DCI) format that includes a first number of information bits. The transceiver is further configured to receive second configuration information for a location of a second number of information bits, smaller than the first number of information bits, in the first DCI format and at least one of the first PDCCHs. The UE also includes a processor operably connected to the transceiver. The processor is configured to determine, from the second number of information bits, values of one or more fields associated with reception of a first physical downlink shared channel (PDSCH) or with transmission of a first physical uplink shared channel (PUSCH).

In another embodiment, a base station (BS) is provided. The BS includes a processor configured to determine a second number of information bits to indicate values of one or more fields associated with reception of a first PDSCH or with transmission of a first PUSCH. The BS also includes a transceiver operably connected to the processor. The transceiver is configured to transmit first configuration information associated with reception of first PDCCHs. A PDCCH from the first PDCCHs provides a first DCI format that includes a first number of information bits. The transceiver is further configured to transmit second configuration information for a location of a second number of information bits, smaller than the first number of information bits, in the first DCI format and at least one of the first PDCCHs.

In yet another embodiment, a method is provided. The method includes receiving first configuration information for reception of first PDCCHs. A PDCCH from the first PDCCHs provides a first DCI format that includes a first number of information bits. The method further includes receiving second configuration information for a location of a second number of information bits, smaller than the first number of information bits, in the first DCI format; receiving at least one of the first PDCCHs; and determining, from the second number of information bits, values of one or more fields associated with reception of a first PDSCH or with transmission of a first PUSCH.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.7.0, "NR; Physical channels and modulation;" 3GPP TS 38.212 v15.7.0, "NR; Multiplexing and Channel coding;" 3GPP TS 38.213 v15.7.0, "NR; Physical Layer Procedures for Control;" 3GPP TS 38.214 v15.7.0, "NR; Physical Layer Procedures for Data;" 3GPP TS 38.321 v15.7.0, "NR; Medium Access Control (MAC) protocol specification;" and 3GPP TS 38.331 v15.7.0, "NR; Radio Resource Control (RRC) Protocol Specification."

Figure 1:
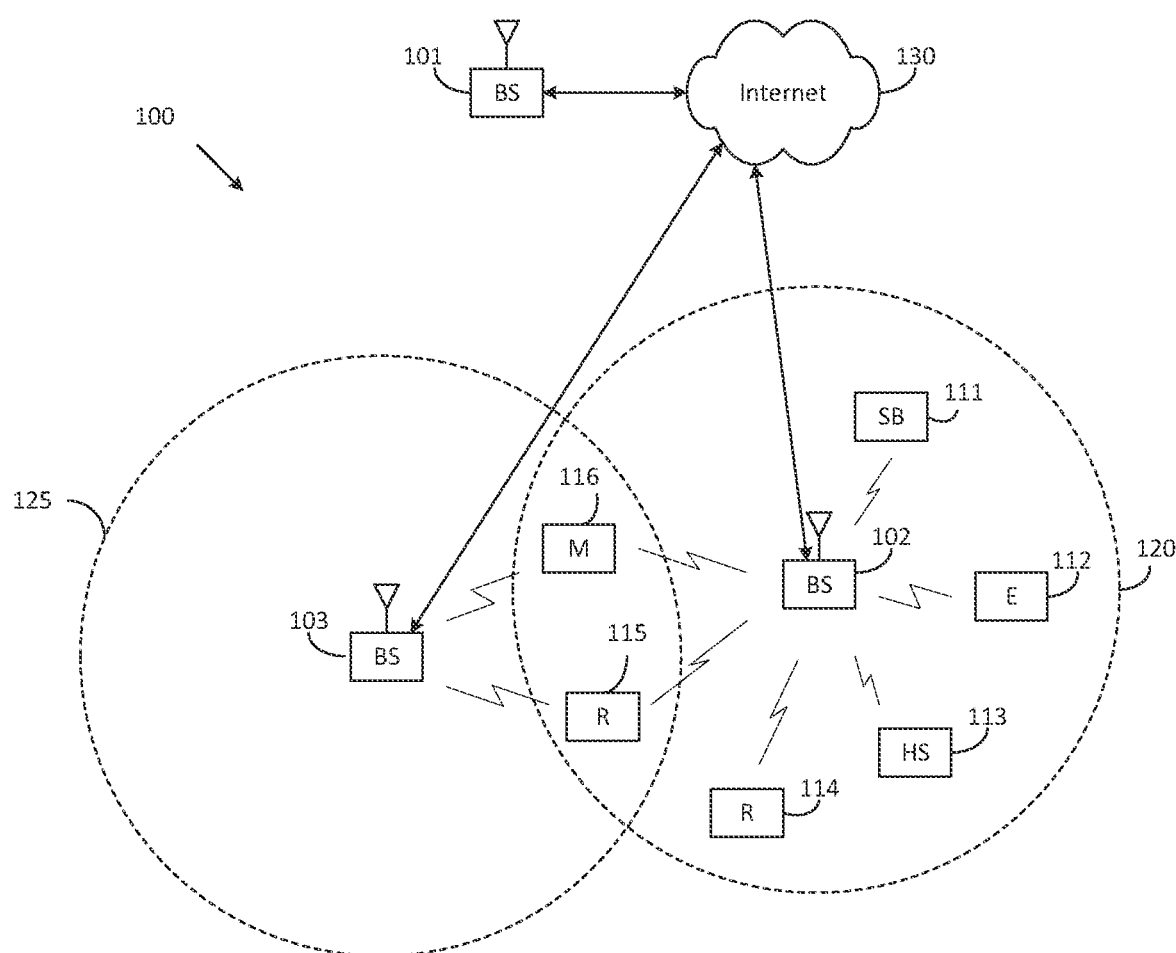
FIG. 1 illustrates an example wireless network according to embodiments of the present disclosure.
Figure 2:
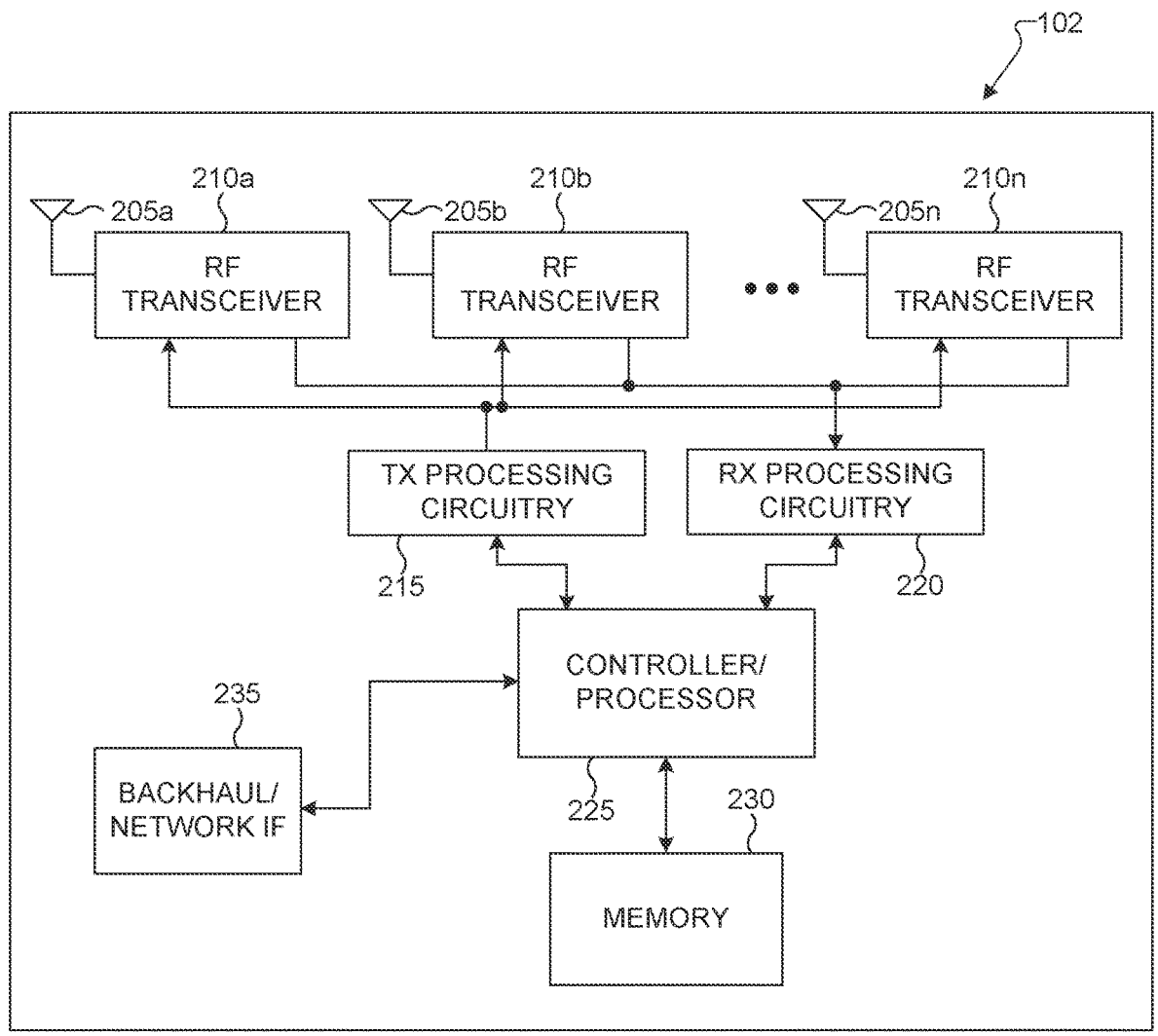
FIG. 2 illustrates an example gNB according to embodiments of the present disclosure.
Figure 3:
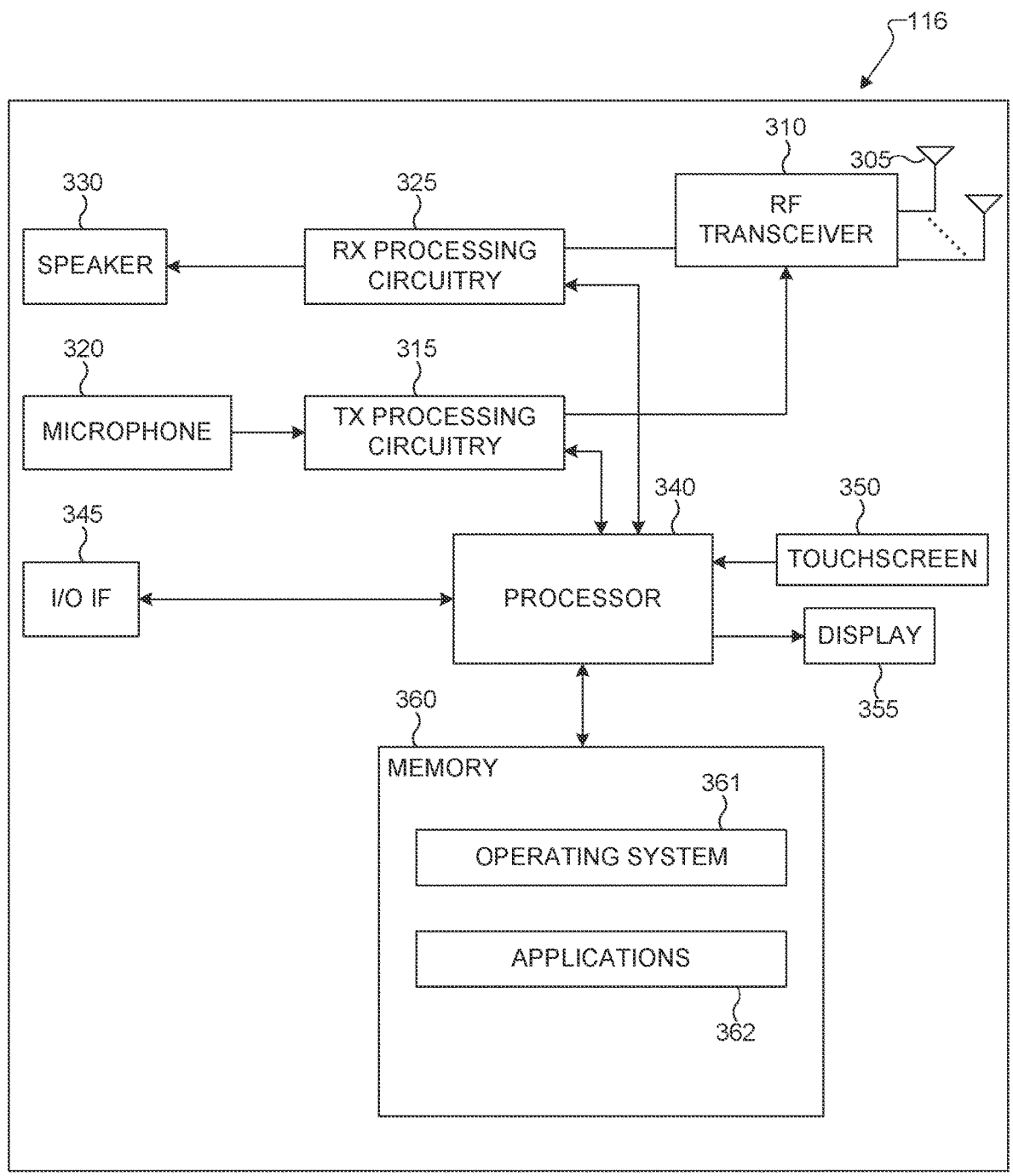
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for group scheduling for PDCCH overhead reduction in NR. In certain embodiments, and one or more of the gNBs 101-103 includes circuitry, programing, or a combination thereof, for group scheduling for PDCCH overhead reduction in NR.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or PDCCHs. A PDSCH or a PDCCH can be transmitted over a variable number of slot symbols including one slot symbol. For brevity, a DCI format scheduling a PDSCH reception by a UE is referred to as a DL DCI format and a DCI format scheduling a PUSCH transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
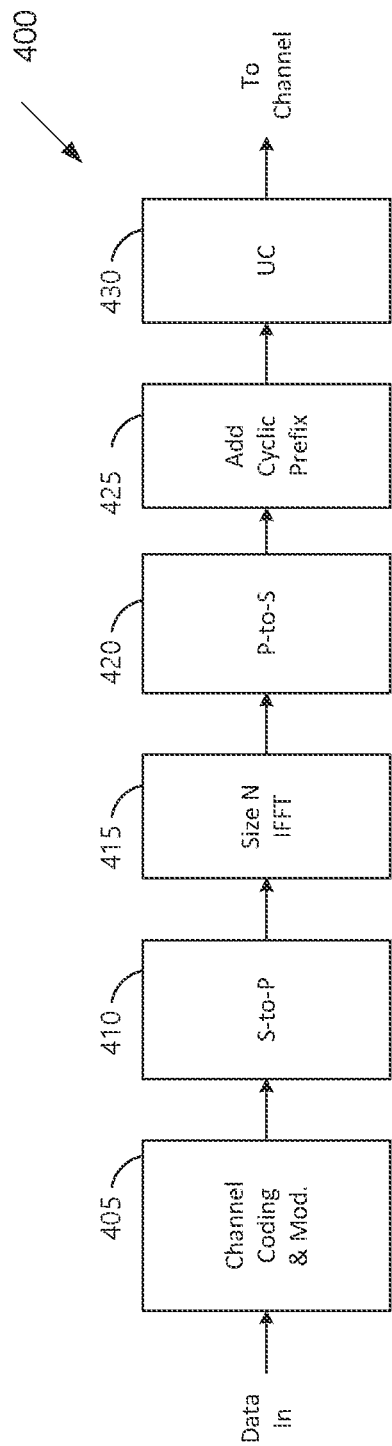
FIGS. 4 and 5 illustrate example wireless transmit and receive paths according to this disclosure.
Figure 5:
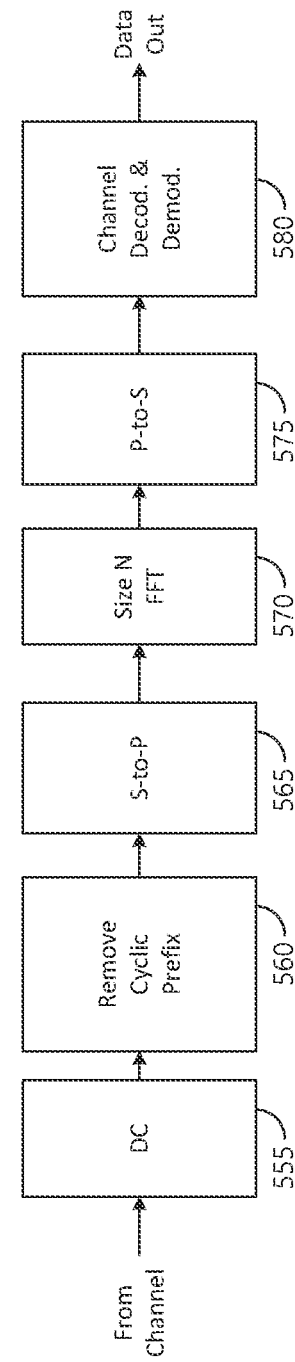

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure pertains "NR-Light UE" or "NR-L UE" or "BL/CE UE", which is a UE or a group of UEs with reduced cost and/or complexity (e.g., with one or more of: reduced bandwidth, reduced number of Rx and/or Tx RF chain, reduced power class, and so on) compared to a legacy/baseline UE or UE group/category, e.g., one as defined by 3GPP 5G NR Rel-15. Such a UE or UE group may be recognized as a UE category (or multiple UE categories) satisfying certain predetermined/specified radio and/or service requirements and/or certain predetermined/specified UE capabilities. Such a UE or UE group/category can also support certain features, e.g., for coverage recovery or coverage enhancement. Examples of such an NR-Light UE can include smart wearables/watches, surveillance cameras, and (mid-tier) wireless sensors. In certain scenarios and deployments, there may be a large number (e.g., tens or hundreds or more) of NR-Light UEs within a serving cell.

This disclosure also pertains any UE that benefits from/seeks coverage enhancement, e.g., due to deployment situations, such as deep in building use cases, underground use cases, and so on.

This disclosure also pertains any UE that benefits from/seeks reduced overhead for transmissions, such as transmission with reduced control information, transmissions with CG (a.k.a., grant free), or transmissions with SPS.

DL SPS and UL CG configurations provide efficient resource utilization means with low control signalling overhead for (rather) periodic or semi-persistent traffic.

There is a need for extending the DL SPS/UL CG configuration framework to multiple UEs. There is another need to reduce reservation of resources for DL SPS reception/UL CG transmission for individual UEs, and instead provide mechanisms for UEs to share the same resources. There is yet another need to decrease control signalling overhead when multiple DL SPS/UL CG configurations corresponding to one or multiple UEs need to be jointly activated, modified, selected, or released. There is a further need to facilitate low latency modification of DL SPS/UL CG configurations, without the need to release, re-configure, and re-activate the resources.

The present disclosure provides enhancements for DL SPS and/or UL CG configurations and transmissions, wherein the focus of enhancements is at least one or more of: reducing control signalling overhead, reducing latency in configurations, transmissions, and various operations regarding DL SPS and/or UL CG configurations, and increasing the efficiency in (time-frequency) resource utilization. Various example embodiments are disclosed in the context of group operations (such as activation, deactivation/release, modification/update, and selection) for DL SPS and/or UL CG configurations. Here, group operation refers to methods and schemes (and corresponding apparatus) that act on multiple DL SPS and/or UL CG configurations, wherein a single operation/command simultaneously applies to multiple DL SPS and/or UL CG configurations.

In various embodiments, multiple DL SPS and/or UL CG configurations may refer to multiple UEs, e.g., a number (>=1) of DL SPS and/or UL CG configurations for each UE operate with a single control signalling. In various embodiments, a DL SPS and/or UL CG configuration can be dedicated to a single UE or can be shared among multiple UEs. One key motivation for focusing on group operations for DL SPS/UL CG configurations is related to use cases, such as mMTC/massive IoT or NR-Light, with large number of UEs in a serving cell and with (rather) periodic or semi-persistent DL/UL traffic. The embodiments, however, are generic and can be applied to other use cases and settings as well.

This disclosure addresses the above concepts and provides additional design aspects for supporting low overhead transmission schemes and group operations for DL SPS or UL CG configurations, and discloses novel solutions and embodiments for DL SPS/UL CG operation as summarized in the following and fully elaborated further below.

In one embodiment, "DL SPS Type-1" with RRC activation/release corresponds to a periodic PDSCH reception on time-frequency resources that are semi-statically configured, activated, and released by RRC. This can be considered as a downlink dual of UL CG Type-1 configuration.

In another embodiment, for sharing a DL SPS among a group of UEs with broadcast/multicast or multiplexing schemes, methods are provided for configuration, activation, transmission (including HARQ retransmission), and release of a DL SPS that is shared among multiple UEs. Both transparent and indicated sharing considered. Two examples to sharing the resources among multiple UEs are discloses: a broadcast/multicast/groupcast example, wherein a same message/transport block (TB) is transmitted to a group of UEs, and a multiplexing example, wherein different messages/TB s are multiplexed and transmitted to a group of UEs.

In another embodiment, procedures for group activation of DL SPS/UL CG for one or multiple UEs via PDSCH are provided to describe a configuration-group or UE-group commands, conveyed on a dynamic PDSCH, for activation of multiple DL SPS/UL CG configurations for one or multiple UEs. The configuration-group or UE-group activation commands can be considered as (UE-)group activation MAC command. In case of multiple UEs, a group activation command can be scheduled by a group-common DCI format. Various details on HARQ procedure for group activation command are elaborated.

In another embodiment, contents of a group activation of DL SPS/UL CG for one or multiple UEs via PDSCH are provided to describe the content of a configuration-group or UE-group activation command for one or multiple UE, including methods for multiplexing individual commands, structure and bit-width of commands, and methods for identification of individual command(s) for each UE from a (UE-)group activation command.

In another embodiment, group release of DL SPS/UL CG for multiple UEs, which describes UE-group commands, conveyed on group-common DCI/PDCCH or a dynamic PDSCH, is provided for releasing multiple DL SPS/UL CG configurations for multiple UEs, including HARQ procedures for UE-group release of DL SPS/UL CG configurations.

In another embodiment, DCI/MAC-based update/modification of DL SPS/UL CG configuration(s) along with HARQ-ACK feedback is provided to describe methods for modification or update of one or multiple parameters in one or multiple DL SPS/UL CG configuration(s) corresponding to one or multiple UE(s). The modification can be based on a modification DCI, conveyed on PDCCH, or a configuration-group or UE-group modification MAC command, conveyed on a dynamic PDSCH. In addition, HARQ procedures for modification of DL SPS/UL CG configurations are elaborated.

In another embodiment, DCI/MAC-based selection of DL SPS/UL CG Type-1 configuration from multiple configurations is provided to describe methods for switching among multiple DL SPS/UL CG Type-1 configurations, such that only one configuration is selected and active at a time. A default DL SPS/UL CG configuration is considered to be active before receiving any selection command. In an enhancement, a DL SPS Type-1 or UL CG Type-1 can be considered, which is configured and activated by RRC, but released via DCI.

A dynamic data transmission, e.g., in DL or UL, pertains an aperiodic transmission of information on a PDSCH or PUSCH. A dynamic data transmission on PDSCH or PUSCH can be scheduled by a DCI format in a PDCCH, based on gNB decision and possibly also based on a scheduling request (SR) from the UE, which can be indicated by the UE in physical uplink control channel (PUCCH) or physical random access channel (PRACH) to request UL scheduling, if needed. A DCI format scheduling unicast PDSCH or PUSCH, such as a DCI format 1_0 or 1_1 or 1_2 and so on for PDSCH or a DCI format 0_0 or 0_1 or 0_2 and so on for PUSCH, indicate (basic) parameters related to resource allocation, power control, and scheduling and HARQ (if applicable), such as: time domain resource allocation (TDRA), frequency domain resource allocation (FDRA), virtual to physical resource mapping (for the case of interleaving), modulation and coding scheme (MCS), UL frequency hopping parameters, HARQ process number (HPN), new data indicator (NDI), redundancy version (RV), and (for PUSCH) transmission power control (TPC) for PUSCH or (for PDSCH) PUCCH resource index, TPC for PUCCH, PDSCH-to-HARQ feedback timing, and downlink assignment index (DAI).

A scheduling DCI (such as DCI format 1_1, 1_2 or 0_1, 0_2) can additionally include parameters related to cross scheduling, MIMO operation, enhanced HARQ operation, control information multiplexing, rate matching (if applicable), repetition, and so on, such as (indications for) one or more of: cell/carrier/bandwidth part (BWP) indications, antenna port, transmission configuration indicator/scheduling request indicator (TCI/SRI), precoding matrix indicator (PMI), CSI-RS trigger/request, scheduling reference signal (SRS) trigger/request, DMRS initialization, phase tracking reference signal (PTRS) association (if applicable), number of codeblock groups (CBGs), CBG flushing indicator, DAI (for multiplexing HARQ codebook on PUSCH), uplink shared channel (UL-SCH) indicator, beta_offset, physical resource block (PRB) bundling size, rate matching indicator, number of repetitions, and so on. The order and/or bit-width of the information fields (IEs) in a scheduling DCI format can be predetermined in system specifications and/or can be configurable (e.g., as in DCI format 0_2 or 1_2 for compact scheduling of ultra-reliable low-latency communication (URLLC) traffic).

A DCI format scheduling unicast data transmission can be addressed to a UE-specific search space (USS) set corresponding to a UE-specific control resource set (CORESET) using a UE-specific radio network temporary identifier (RNTI) such as C-RNTI or modulation coding scheme MCS (MCS-C-RNTI). A dynamic PDSCH or PUSCH transmission can be repeated a number of times per RRC configuration or per DCI indication, wherein the repetition can be on a slot basis (a.k.a., slot aggregation or repetition Type-1) or on a shorter time scale/duration, such as a "mini-slot" repetitions or "multi-segment" repetition, a.k.a., a repetition Type-2.

A UE can also receive control information regarding unicast PDSCH/PUSCH transmission via group-common signalling, such as GC-DCI via a common PDCCH addressed to a common RNTI in a common search space (CSS) set corresponding to a common CORESET, wherein control information and signalling for multiple UEs are multiplexed in a same DCI. Such common control signalling can include information regarding dynamic DL/UL slot format indication (SFI), DL or UL transmission interruption/cancellation/pre-emption, group-common TPC command for PUSCH, PUCCH, SRS, and so on. A dynamic, unicast PDSCH/PUSCH can be pre-empted or cancelled based on a DL pre-emption indication (PI) via DCI format 2_1 or based on an UL cancellation indication (CI) via DCI format 2_4. A dynamic, unicast PDSCH/PUSCH can receive power control TPC commands via DCI format 2_2, in addition to a TPC command received in a UE-specific/individual scheduling DCI format.

Throughout this disclosure, the terms "transmission" and "retransmission," if not explicitly clarified, are used to refer to a transmission from UE side or a transmission from a gNB side (i.e., a reception at the UE side), which may be clear from the context.

Throughout this disclosure, the terms "initial transmission" and "original transmission" are used interchangeably to refer to a transmission or reception before any HARQ retransmission and/or HARQ combining.

Throughout this disclosure, the terms "DL SPS" and "SPS PDSCH" and "DL SPS PDSCH" are used interchangeably, with details and definitions as discussed below and throughput this disclosure.

Throughout this disclosure, the terms "UL CG" and "CG PUSCH" and "UL CG PUSCH" are used interchangeably, with details and definitions as discussed below and throughput this disclosure.

In some use cases and scenarios (e.g., VoIP, sensor measurements, data collection, and so on), a periodic or semi-persistent data traffic is expected on the DL or UL, which encourages a (pre-)configured resource allocation and scheduling for data transmission, rather than individual scheduling of each transmission occasion, which would unnecessarily increase control signalling in the system.

For such periodic or semi-persistent DL or UL data transmissions, semi-persistent scheduling (SPS) and/or configured grant (CG) transmission is more appropriate and reasonable. An UL CG (a.k.a., CG PUSCH) Type-1 configuration pertains purely semi-statically (i.e., RRC) configuration, activation, and release/deactivation of resource allocation and transmission parameters, except possibly for some implicit parameter determinations, while an UL CG (a.k.a., CG PUSCH) Type-2 configuration pertains some (basic) resource allocation and transmission parameter indications are by RRC configuration, while other (most) resource allocation and transmission parameter indications are dynamically by an activation DCI, except possibly for some implicit parameter determinations, and a release of the resources is dynamically indicated by a deactivation/releasing DCI.

For semi-persistent DL data transmission, a DL SPS configuration is defined, which is similar to an UL CG Type-2 configuration, wherein some (basic) resource allocation and transmission parameter indications are by RRC configuration, while other (most) resource allocation and transmission parameters as well as activation of the resources are dynamically indicated by an activation DCI, except possibly for some implicit parameter determinations, and a release of the resources is also dynamically indicated by a deactivation/releasing DCI.

A version similar to UL CG Type-1 for DL traffic (which pertains purely semi-statically (i.e., RRC) configuration, activation, and release/deactivation of resource allocation and transmission parameters, except possibly for some implicit parameter determinations) is discussed in greater detail below; therefore, the abovementioned DL SPS configuration (which follows a combination of RRC and DCI signalling) can be considered as a DL SPS Type-2 configuration.

For example, RRC can configure the following parameters for DL SPS: periodicity, number of HARQ processes, PUCCH resource index for HARQ feedback, and MCS. In another example, an RRC can configure the following parameters for UL CG (Type-1 and Type-2): periodicity, a number of HARQ processes, timer (e.g., for release of UL CG resources in case of inactivity), MCS table, open and closed loop power control parameters, a number of repetitions, RV for repetitions. For an UL CG Type-1 configuration, other transmission parameters are also RRC configured, such as: time/frequency allocation, frequency hopping parameters, MCS, MIMO related, e.g., antenna ports, SRI, PMI, DMRS initialization, and pathloss RS index.

For UL CG Type-2 and DL SPS, however, such parameters are indicated by the activation DCI. For DL SPS/UL CG transmission, similar to dynamic data transmission, (blind, i.e., not HARQ-feedback-based) repetition(s) can be on a slot basis (a.k.a., slot aggregation or repetition Type-1) or on a shorter time scale/duration, such as a "mini-slot" repetitions or "multi-segment" repetition, a.k.a., a repetition Type-2, and the number of repetitions can be dynamically indicated in the activation DCI. Time/frequency resources for an UL CG configuration can be shared among multiple UEs, although this can be transparent to the UEs sharing the UL CG configuration. A UE-specific DMRS configuration can be used to resolve UL CG transmission collisions at the gNB. A detailed discussion of sharing time/frequency resources of a DL SPS configuration among multiple UEs is discussed in greater detail below. At least for UL CG, it is assumed that nothing is transmitted in a configured transmission occasion if there is no data (and/or control information, e.g., uplink control information (UCI)) to send.

A DCI format for activation of a DL SPS can be a DCI format that schedules unicast PDSCH reception, such as a DCI format 1_0, 1_1, 1_2, and so on. Similarly, a DCI format for activation of a UL CG Type-2 can be a DCI format that schedules unicast PUSCH transmission, such as a DCI format 0_0, 0_1, 0_2, and so on. All or some of these DCI formats can be also used for releasing DL SPS/UL CG, e.g., only DCI format 1_0 for releasing DL SPS and only DCI format 0_0 for releasing UL CG can be used. A DCI format for activation, deactivation/release, and HARQ retransmission(s) corresponding to a DL SPS/UL CG configuration is addressed using CS-RNTI to a UE-specific search space (USS) set corresponding to a UE-specific CORESET. To distinguish the activation and release DCIs, some parameters in the DCI format are fixed/predetermined in the system specifications to be used as validation, e.g., since HARQ related information—as discussed below—are implicitly determined or are decided by the UE, the HARQ related information can be used for DCI validation. For example, a valid activation DCI sets new data indicator (NDI)=0, HARQ process number (HPN)=all zeros, and redundancy version (RV)=00, while a valid releasing DCI sets NDI=0, HPN=all zeros, RV=00, MCS=all ones, and FDRA=all ones. The UE is expected to provide a HARQ-ACK indication when detecting a deactivation/release DCI format for a DL SPS/UL CG configuration. A DCI format addressed to CS-RNTI and with NDI=1 can schedule a HARQ retransmission for a failed initial DL SPS/UL CG transmission, or a retransmission thereof.

HARQ related information for DL SPS/UL CG can be implicitly determined. For example, a HARQ process number for DL SPS/UL CG can be determined based on the timing (e.g., starting symbol/slot) of the DL SPS/UL CG transmission occasion using a predetermined formula in the system specifications, and also possibly based on a configured offset value. For example, for configured downlink assignments (i.e., DL SPS PDSCH), the HARQ Process ID associated with the slot where the DL transmission starts is derived from the following equation:

HARQ process ID=[floor(CURRENT_slot>10/(numberOfSlotsPerFramexperiodicity))] modulo nrof-HARQ-Processes, where CURRENT_slot= [(system frame number (SFN)× numberOfSlotsPerFrame)+slot number in the frame] and numberOfSlotsPerFrame refers to the number of consecutive slots per frame.

In another example, for configured uplink grants (i.e., UL CG PUSCH), the HARQ Process ID associated with the first symbol of a UL transmission is derived from the following equation: HARQ Process ID=[floor(CURRENT_symbol/ periodicity)] modulo nrofHARQ-Processes, where CURRENT_symbol=(SFN×numberOfSlotsPerFrame×numberOfSymbolsPerSlot+slot number in the frame× numberOfSymbolsPerSlot+symbol number in the slot), and numberOfSlotsPerFrame and numberOfSymbolsPerSlot refer to the number of consecutive slots per frame and the number of consecutive symbols per slot.

For determining NDI, in one example, only initial/original transmissions may be allowed/supported on DL SPS/UL CG transmissions and any retransmission is dynamically scheduled using a DCI format, therefore there is no need for an NDI field.

In another example, a redundancy version for a DL SPS/UL CG transmission can be fixed to RV=0, while for the case of repetitions, an RV for each repetition can be based on a sequential/cyclic selection of RV from a configured set of RVs, e.g., {0, 0, 0, 0} or {0, 3, 0, 3} or {0, 2, 3, 1}.

In yet another example, for certain applications (such as for unlicensed operation), HARQ related parameters for UL CG PUSCH such as HPN and RV can be decided by the UE and then multiplexed as configured grant UCI (CG-UCI) with the UL CG data transmission; in addition, a HARQ retransmission of an initial UL CG transmission using UL CG resources may be allowed according to this example, therefore, CG-UCI additionally includes an NDI field, i.e., NDI=0 for initial UL CG transmission, and NDI=1 for a HARQ retransmission of an initial UL CG transmission or a retransmission thereof.

A HARQ feedback is supported for DL SPS PDSCH, where a UE generates an ACK if the UE correctly decodes a transport block for SPS PDSCH, and generates a NACK if the UE does not correctly decode the transport block for SPS PDSCH. A PUCCH resource index for sending the HARQ feedback for DL SPS PDSCH can be semi-statically provided by RRC; in one example, a PUCCH resource can be indicated/updated by the activation DCI. In addition, an activation DCI for DL SPS can indicate, among other parameters, a PDSCH-to-HARQ feedback timing, unless such a timing is configured or predetermined in the system specifications.

In one example, a DAI indication for SPS PDSCH may not be needed, since a reception for an activated DL SPS configuration cannot be missed by the UE (unlike a DCI-based PDSCH), so no confusion/inconsistency between UE and gNB information is expected. A TPC command for UL CG PUSCH and for PUCCH carrying HARQ for DL SPS PDSCH is provided via group-common DCI format 2_2.

A HARQ feedback (from the gNB to the UE) may or may not be supported for UL CG PUSCH. In one example, a HARQ feedback for an UL CG transmission is not supported, in which case the UE monitors the PDCCH in a predetermined/configured time window after an UL CG PUSCH transmission: if the UE receives a DCI format that schedules a HARQ retransmission of an UL CG transmission (which can be an indication that, the gNB detected a DMRS for an UL CG transmission from the UE, but was not able to successfully decode the UL CG PUSCH transport block), then the UE retransmits the UL CG transmission on a dynamic PDSCH with the transmission parameters indicated in the scheduling DCI format.

But, if the UE does not receive any DCI format by the end of the time window after an UL CG transmission, the UE assumes that UL CG transmission was successful. The UE might not distinguish the case that the gNB missed to detect the DMRS for the UL CG transmission from the UE (e.g., due to a collision with UL CG transmissions from other UEs on the same time-frequency resources), but this might be expected to happen with a low probability (e.g., a lower probability than a target BLER for UL CG PUSCH).

In another example, a HARQ feedback for an UL CG transmission is supported, in which case, the UE expects to receive a downlink feedback indication (DFI) format in a predetermined or configured time window after an UL CG transmission, where the DFI provides a HARQ ACK or NACK feedback, possibly along with some other transmission parameters (such as RV, number of repetitions, and so on). If the UE does not receive the DFI by the end of the window after an UL CG transmission, the UE assumes that the gNB either failed to detect the DMRS for the UL CH PUSCH transmission (e.g., due to a collision with UL CG transmissions from other UEs on the same time-frequency resources) or failed to transmit the HARQ feedback/DFI (e.g., due to listen-before-talk (LBT), reasons in unlicensed operation).

Considering the latter case, a support for HARQ feedback for UL CG can be beneficial compared to no HARQ feedback support in some use cases, since otherwise, the gNB could fail (e.g., due to LBT reasons) to transmit a DCI format scheduling a HARQ retransmission for an UL CG transmission, without the UE being able to determine such an event.

A configuration for DL SPS/UL CG can be cell-group-specific or cell-specific or BWP-specific, wherein a UE can be configured with one or multiple DL SPS/UL CG configuration(s) per cell group/cell/BWP. In case of multiple configurations, each configuration can be associated with an index/indication to distinguish a single DL SPS/UL CG configuration or a "state" to indicate a subset (of size>=1) of DL SPS/UL CG configuration(s). Such an index or state can be used in individual or joint/group activation and/or release commands, such as activation DCI and deactivation/releasing DCI, to distinguish some DL SPS/UL CG configuration(s) from others.

In embodiments for "DL SPS Type-1" with RRC activation/release, a UE is RRC configured with resources for DL PDSCH reception with RRC signalling for activation and release of the resources, and without any DCI format/PDCCH reception needed for scheduling and/or activation of the resources. This can be considered/referred to as a "DL configured grant Type-1" (similar to an UL configured grant Type-1, but in DL direction) or, with some abuse of terminology, a "DL SPS Type-1" (considering the existing DL SPS in 3GPP LTE/NR specifications as "DL SPS Type-2"—similar to UL configured grant Typ-2—which requires an activation/release DCI to enable/disable the resources); The latter terminology is used in the rest of this text for simplicity. The benefit of such configuration is to reduce control overhead (e.g., PDCCH transmission/reception and blind DCI decoding) for scenarios in which rather regular/periodic DL traffic is expected. In addition, a DL SPS Type-1 configuration can be shared among multiple UEs, as discussed in greater detail below, so that resources (e.g., time/frequency) are more efficiently used across the system.

According to this embodiment, the resources can be time-frequency resources, and can also include spatial/code domain resources and/or parameters. Since there is no activation DCI for a DL SPS Type-1, all PDSCH reception parameters are either RRC configured or implicitly driven from the RRC configured parameters or fixed in the system specifications.

In one example, a configuration for DL SPS Type-1 can include indication for one or more of the following: resource allocation parameters such as virtual to physical resource mapping; link adaptation parameters such as MCS/transport block size (TBS) table and/or entry to the corresponding MCS/TBS table, i.e., MCS/TBS index; MIMO related parameters such as antenna port, TCI, DMRS initialization; code-block group (CBG) operation parameters such as number of CBGs and/or CBG flushing parameters; parameters for PRB bundling such as PRB bundling size; parameters for rate matching such as rate matching indicator; parameters for repetition such as (actual/nominal/default) number of repetitions (including/excluding impact of DL SPS PDSCH reception colliding with an UL symbol/slot per SIB/RRC or dynamic slot format indication (SFI)).

In another example, HARQ feedback related parameters are configured or implicitly derived. In a related example, PDSCH-to-HARQ timing is explicitly included in the DL SPS Type-1 configuration, where the timing is an offset with respect to the last symbol of DL SPS PDSCH reception including repetition(s), if any. In another related example, only one HARQ process is configured for DL SPS Type-1 with the HARQ process number (HPN) predetermined (e.g., HPN=0) or explicitly configured, or multiple HARQ processes can be configured for DL SPS Type-1, where HPN is determined based on the (start) timing of the DL SPS transmission occasions (and any offset configured for the DL SPS configuration).

In yet another related example, a redundancy version (RV) is fixed in the specifications, e.g., RV=0, for the case of no repetition, or when repetition is enabled, the RV is determined e.g., based on a cyclic shift/selection from a predetermined or configured RV sequence, e.g., from the set of RV sequences {0, 0, 0, 0}, {0, 3, 0, 3}, or {0, 3, 1, 2} based on the actual/nominal repetition index.

In a further related example, HPN and/or RV and/or DAI is/are jointly coded with another configuration parameter (e.g., one or more of TDRA, FDRA, number of repetitions, RV, and so on); or HPN/RV is explicitly indicated inside the DL SPS PDSCH, e.g., as an extra bit field appended to the PDSCH content/data and/or as a header; or HPN/RV is implicitly indicated e.g., as a parameter impacting PDSCH DMRS, e.g., introducing a scrambling to the DMRS sequence and/or an additional/residual cyclic shift for DMRS, and so on.

In an additional example, in one option, DL SPS Type-1 resources are only used for initial transmissions (so NDI field is not needed) and any HARQ retransmission is dynamically scheduled by a DCI format, while in another option, DL SPS Type-1 resources can be also used to send HARQ retransmissions of an incorrectly received initial DL SPS PDSCH, in which case NDI is explicitly indicated inside the DL SPS PDSCH, e.g., as an extra bit field appended to the PDSCH content/data and/or as a header; or is implicitly indicated e.g., in terms of timing of DL SPS Type-1 reception occasions (e.g., even occasions for initial transmissions, and odd occasions for HARQ retransmissions), or e.g., as a parameter impacting PDSCH DMRS, e.g., introducing a scrambling to the DMRS sequence and/or an additional/residual cyclic shift for DMRS, and so on.

In one example, when the gNB has no data to transmit in a DL SPS Type-1 occasion, in one option, the gNB is expected to send nothing for that occasion, while in another option, the gNB is expected to send a default bit string such as all zeros or all ones.

In one example, a UE can be configured with one or multiple such DL SPS Type-1 configurations per serving cell or per cell group, which can include separate or shared/overlapping resources in time/frequency.

In another example, a DL SPS Type-1 configuration can includes resources which are shared among multiple UEs (additional details are provided below), where such resource sharing can be implicitly or explicitly indicated to the UEs or can be transparent to UEs. In yet another example, a DL SPS Type-1 can be configured with DMRS configuration which is UE-specific, e.g., UE-specific cyclic shift parameters, cover codes, initialization/scrambling, base sequences, spatial ports/parameters, and/or so on, for DMRS configuration. This can be useful to the gNB, e.g., to be able to distinguish different UEs, in case a DL SPS resource is shared among multiple UEs.

Figure 6:
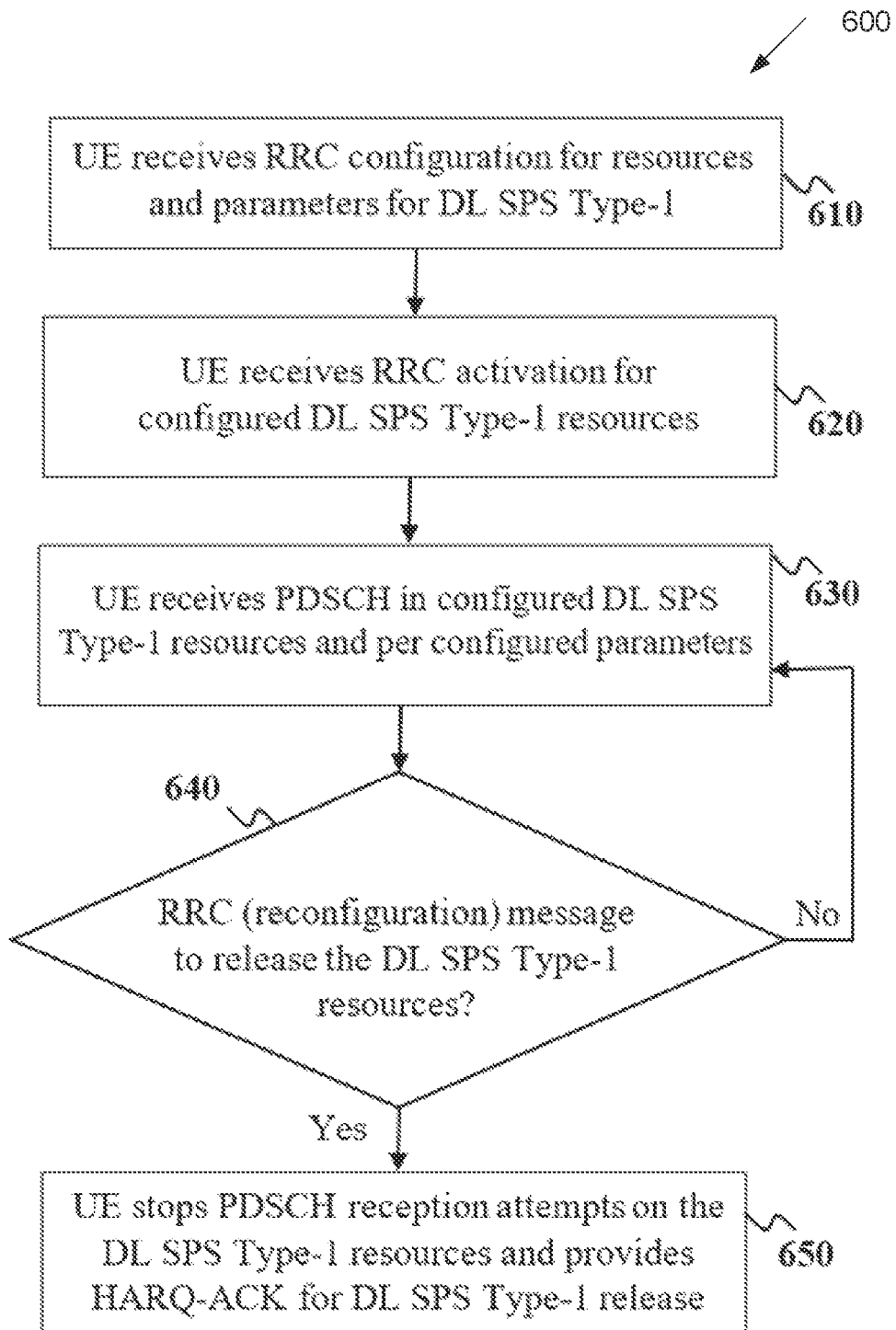
FIG. 6 illustrates a flow chart of a method for configuration, activation, and release for downlink (DL) semi-persistent scheduling (SPS) Type-1 according to embodiments of the present disclosure.

FIG. 6 illustrates a flow chart of a method for configuration, activation, and release for DL SPS Type-1 600 according to embodiments of the present disclosure. An embodiment of the configuration, activation, and release for DL SPS Type-1 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

AS illustrated in FIG. 6, a UE receives an RRC configuration of resource and parameters corresponding to a DL SPS Type-1 at step 610. The UE then receives an RRC activation of the configured resources for DL SPS Type-1 at step 620. (Here, "then" refers to a logical order of actions, and not necessarily a chronological order, so that RRC configuration and RRC activation of resources can happen at the same time or different times.) Then, the UE (attempts to) receive SPS PDSCH in the configured resources for DL SPS Type-1 and per configured parameters at step 630. The UE monitors for an RRC (reconfiguration) message indicating a release of DL SPS Type-1 resources at step 640. If the UE has not received any RRC (reconfiguration) message indicating a release of DL SPS Type-1 resources, the UE continues to (attempt to) receive SPS PDSCH in the configured resources for DL SPS Type-1 and per configured parameters at step 630. When the UE receives an RRC (reconfiguration) message indicating a release of DL SPS Type-1 resources, the UE stops SPS PDSCH reception attempts on the configured resources for DL SPS Type-1 and provides the gNB with a HARQ-ACK feedback for DL SPS Type-1 PDSCH release at step 650.

In one example for enhancement, a DL SPS Type-1 can be configured and activated by RRC but released via a release DCI. In another example for enhancement, a DL SPS Type-1 can be activated by an activation DCI but released via RRC (reconfiguration/release) message/command.

In embodiments for sharing a DL SPS among a group of UEs with broadcast/groupcast/multicast or multiplexing examples, a DL SPS (Type-1 or Type-2 as discussed above) configuration can be shared among multiple UEs/a group of UEs, so that time/frequency/spatial resources for a DL SPS configuration is shared among multiple UEs.

According to this embodiment, a PDSCH (including all repetition(s)/blind retransmission(s) thereof, if any) in a shared/group DL SPS resource is received by all UEs sharing that configuration. A motivation for such DL SPS sharing is reduced/low-overhead PDSCH transmission for a group of UEs to enable PDSCH transmission by the gNB without requiring any PDCCH transmission by gNB/decoding by UEs.

A shared/group DL SPS configuration can be provided by dedicated RRC configuration (common RRC configuration/SIB indication can be another option). If a UE is configured with multiple DL SPS configurations, the UE can have zero, one, or more than one configuration to be shared with other UEs, while the remaining DL SPS configurations are dedicated (i.e., not shared) with any other UE.

In one example, resource sharing for a shared DL SPS configuration is transparent to UEs. In such example, then serves as a multicast/broadcast transmission scheme, where a same TB is received by and intended for all UEs sharing the DL SPS configuration. In this case, the activation/release of a shared DL SPS (Type-2, per terminology of the above discussed embodiments for DL SPS Type-1 with RRC activation/release) configuration follows similar validation procedures as those described for DL SPS earlier in this disclosure, or updating the shared DL SPS configuration as described below in the embodiments for DCI/MAC-based update/modification of DL SPS/UL CG configuration(s) along with HARQ-ACK feedback discussed below, i.e., individual activation for each UE in the UE group. According to this example, the gNB configures, among (some) other parameters, a same/common PDSCH DMRS configuration for all UEs sharing the DL SPS configuration/resources.

For the aforementioned example, (i.e., transparent sharing of a DL SPS among multiple UEs), a HARQ retransmission can be (enabled or) disabled by an RRC parameter; if HARQ retransmission is enabled or if a HARQ disabling configuration is not provided, the UE provides HARQ feedback for each DL SPS reception (and repetition(s), if any) according to a number of alternatives.

In one alternative (1), a UE in the UE group uses a dedicated PUCCH resource to provide a HARQ ACK or NACK feedback, where an ACK corresponds to a successful reception/decoding of the DL SPS PDSCH reception, while a NACK corresponds to one or both of not detecting a DL SPS PDSCH reception and not successfully decoding a DL SPS PDSCH after a detection thereof (In one variant of alternative (1), NACK only refers to the latter, i.e., not successfully decoding a DL SPS PDSCH after a detection thereof, but not the former, so that the gNB realizes no detection of a DL SPS PDSCH reception by a UE if neither ACK nor NACK is sent by the UE—in a further example, the latter case does not apply to DL SPS, i.e., the gNB is expected to transmit in all occasions of a DL SPS, so detection is not necessary/relevant).

In one alternative (2), a UE in the UE group uses a shared PUCCH resource to provide a NACK only feedback, where the NACK corresponds to one or both of not detecting a DL SPS PDSCH reception (if applicable) and not successfully decoding a DL SPS PDSCH after a detection thereof (so that, if no HARQ feedback is received/detected by the gNB from a UE, the gNB may/can assume ACK).

In one alternative (3), a UE in the UE group uses a shared PUCCH resource to provide an ACK only feedback, where the ACK corresponds to successfully detecting and decoding a DL SPS PDSCH reception (so that, if no HARQ feedback is received/detected by the gNB from a UE, the gNB may/can assume NACK). In the description of the aforementioned alternatives (1) or (2) or (3) above, dedicated or shared PUCCH configuration is from gNB configuration perspective (whether to use same/common PUCCH resource or dedicated/distinct PUCCH resources) and is transparent to the UEs in the UE group (i.e., gNB implementation issue), as all other parameter configurations for the aforementioned example.

Regarding which HARQ feedback to use: in one example, dedicated or broadcast configuration signalling (e.g., RRC or SIB) corresponding to DL SPS (Type-1 or Type-2, per terminology the above discussed embodiments for DL SPS Type-1 with RRC activation/release) configuration indicate which scheme for HARQ feedback (e.g., alternative (1) or (2) or (3)) the UE may follow.

In another example, an/the activation DCI for DL SPS (Type-2, per terminology of the above discussed embodiments for DL SPS Type-1 with RRC activation/release) indicates which scheme for HARQ feedback (e.g., alternative (1) or (2) or (3)) the UE may follow.

In another example, an updating DCI (as discussed in the embodiments for DCI/MAC-based update/modification of DL SPS/UL CG configuration(s) along with HARQ-ACK feedback below) can overwrite/override the indication in RRC/SIB/activation DCI with respect to the HARQ feedback scheme (e.g., alternative (1) or (2) or (3)) that the UE needs to follow.

According to the aforementioned example (i.e., transparent sharing of a DL SPS among multiple UEs), and regardless of the HARQ feedback scheme (e.g., Alternative (1) or (2) or (3) above), when one or multiple UE(s) fail(s) to receive a DL SPS reception as indicated by NACK feedback (or by not sending an ACK feedback) to the gNB, in one example, the gNB can/may retransmit a HARQ retransmission of the failed SPS PDSCH (or retransmission(s) thereof) using dynamic PDSCH scheduled by a DCI format for each individual UE indicating a failure.

In one example, in the case of using a shared PUCCH resource for the HARQ feedback, e.g., as described in alternatives (2) or (3) above, the gNB is still able (via implementation) to distinguish UEs based on appropriate configuration of some parameters, e.g., usage of UE-specific parameters such as one or more of cyclic shift, orthogonal cover codes, pseudo-random scrambling, and so on.

In one example, resource sharing for the shared DL SPS is indicated to UEs, and only part (and not the entirety) of a PDSCH transmission in a shared DL SPS resource is intended for a/the/each UE. This example, then serves as a multiplexing transmission scheme, where different TBs are received by and intended for different UEs sharing the DL SPS configuration, so the benefit is more efficient utilization of time/frequency resources among multiple UEs in deployments where (rather) periodic DL traffic is anticipated. In one example, the number of UEs that share a DL SPS configuration is rather small (say 2 or 4), while the gNB can still transmit rather large messages for each UE.

In another example, the number of UEs that share a DL SPS configuration is rather large (say 12 or 16), and the gNB can transmit rather small messages for each UE (i.e., small data transmission). Further according to this example, if the gNB does not intend to transmit PDSCH for one UE or some UE(s) in the UE group sharing the DL SPS configuration, the gNB can transmit a default bit string for that UE, such as all "0"s or all "1"s.

For the aforementioned example (i.e., indicated sharing of a DL SPS among multiple UEs with a multiplexing option), in case of sharing a DL SPS (Type-2, per terminology of the above discussed embodiments for DL SPS Type-1 with RRC activation/release), activation/release of the DL SPS configuration can be based on a group-common DCI format/control signalling in a common CORESET/CSS set (e.g., an existing common CORESET/CSS set in NR Rel-15/16 or new common CORESET/CSS set) addressed to UEs sharing a common RNTI (E.g., an existing common RNTI in NR Rel-15/16 or a new common RNTI, say CS-G-RNTI).

In a related example, the GC-DCI format can indicate activation/release of multiple shared DL SPS configuration, e.g., using a state codepoint in the CG-DCI format, where each state corresponds to a subset of shared DL SPS configurations. In another related example, a MAC-like example can be used for activation/release of multiple shared DL SPS configurations among multiple UEs, as described in the embodiments for procedures for group activation of DL SPS/UL CG for one or multiple UEs via PDSCH below.

In yet another example, release of a shared DL SPS (Type-2) configuration is based on a group-common DCI format, but an activation is based on distinct/individual DCI format(s) for each UE in the UE group. In a further example, both activation and release of a shared DL SPS (Type-2) configuration is based on distinct/individual DCI format(s) for each UE in the UE group.

Figure 7:
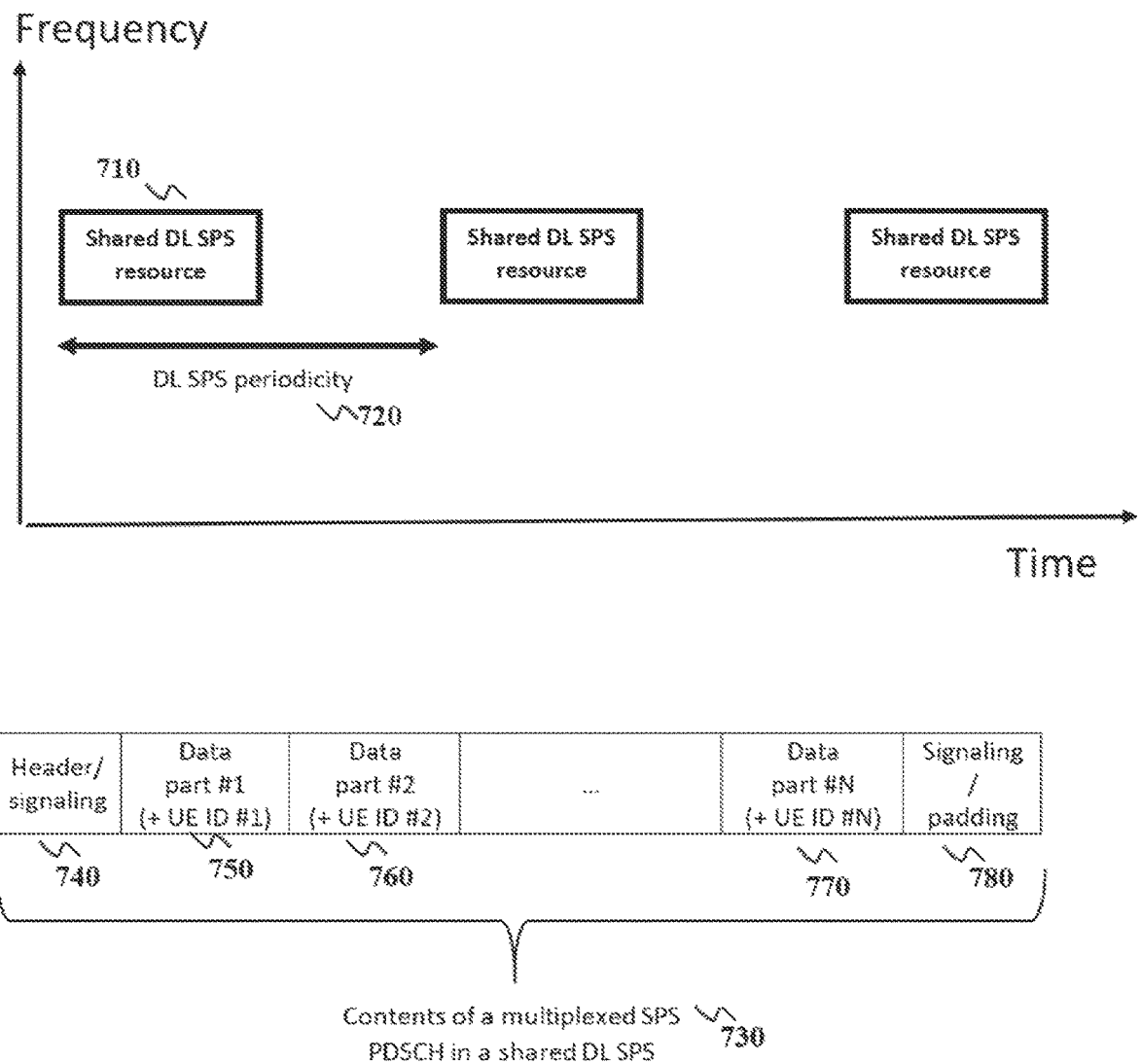
FIG. 7 illustrates an example sharing of a DL SPS configuration among multiple UEs according to embodiments of the present disclosure.

FIG. 7 illustrates an example sharing of a DL SPS configuration among multiple UEs according to embodiments of the present disclosure. An embodiment of the sharing of a DL SPS configuration among multiple UEs shown in FIG. 7 is for illustration only.

FIG. 7 illustrates an example of the aforementioned example, i.e., an indicated sharing of a DL SPS configuration among multiple UEs with a multiplexing example.

As illustrated in FIG. 7, a time-frequency resource for a shared DL SPS is shown in 710, wherein resources are repeated with a configured periodicity as shown in 720. An example contents of a multiplexed SPS PDSCH in a shared DL SPS resource is shown in 730, which possibly includes a header and/or some control information signalling (such as number N of multiplexed parts/UEs) as shown in 740, as well as a first data/message/component for a first UE possibly along with an indication of a first ID for the corresponding UE as shown in 750, a second data/message/component for a second UE possibly along with an indication of a second ID for the corresponding UE as shown in 760, and so on, until an N-th data/message/component for an N-th UE possibly along with an indication of an N-th ID for the corresponding UE as shown in 770. There can be finally some control signalling and/or zero padding as shown in 780.

According to the aforementioned example, the configuration for the shared DL SPS for the/each UE includes a new parameter that indicates which part of the PDSCH transmission is intended for the UE, e.g., each SPS PDSCH includes a number, say [N], of equal-bit-width parts/components and a parameter "[PDSCH-part-]index" indicates which part/component is intended for that UE, or e.g., a parameter "startingBit" indicates which bit position in the PDSCH string is intended for the UE (the actual bit position can be a factor, say 8, times the indicated value for the parameter, to reduce the overhead), or e.g., in case that PDSCH parts for different UEs are of different length, an SLIV-like method (with a larger range of SLIV value) is used to indicate the start and length of the PDSCH part/component intended for the UE.

In one example, the number [N] of UEs in the UE-group can be implicitly indicated. For example, for a DL SPS (Type-2, per terminology of the above discussed embodiments for DL SPS Type-1 with RRC activation/release) configuration, an activation/release DCI (or an updating command/DCI; as discussed in the embodiments for DCI/MAC-based update/modification of DL SPS/UL CG configuration(s) along with HARQ-ACK feedback below) is a group-common control signalling in a common CORESET/CSS set (e.g., an existing common CORESET/CSS set in NR Rel-15/16 or new common CORESET/CSS set) addressed to UEs sharing a common RNTI (e.g., an existing common RNTI in NR Rel-15/16 or a new common RNTI, say CS-G-RNTI), where the RNTI determination/calculation is additionally dependent on the size of UE group, and the number/size of the UE group can be one from a predetermined or configured set of numbers, say {2, 4, 6, 8, 12, 16}, for the possible UE-group sizes.

The UE is expected to monitor the CSS set corresponding to the RNTI as determined based on the largest/smallest UE-group size from among the set of predetermined/configured sizes for the UE group.

In yet another example, the UE-group size can be a factor/parameter in the search space equation for detection of the DCI format activating the DL SPS, and to limit the UE blind decoding attempts, the number/size of the UE group can be one from a predetermined or configured set of numbers, say {2, 4, 6, 8, 12, 16}, for the possible UE-group sizes.

Regarding HARQ feedback and retransmission for the aforementioned example (i.e., indicated sharing of a DL SPS configuration among multiple UEs), similar to the aforementioned example (i.e., transparent sharing of a DL SPS configuration among multiple UEs), a HARQ retransmission can be enabled or disabled by an RRC parameter; if HARQ retransmission is enabled (or if a HARQ disabling configuration is not provided), again similar to the aforementioned example, the UE can use different HARQ feedback schemes, such as alternative (1) or (2) or (3) above, and determine the actual HARQ feedback schemes based on a gNB signalling as described for the aforementioned example.

In an enhancement of alternatives (2) and (3), when shared resources are used to report a HARQ feedback for a shared DL SPS configuration in the aforementioned example, the HARQ feedback from UEs additionally includes some notion of the UE identity as described above, e.g., a (global) UE ID provided by higher layers or a function thereof, or a group membership ID which distinguishes the UE among the UE group members, such as the "[PDSCH-part-]index" and/or "startingBit" and/or the SLIV-based configuration parameter as described earlier to indicate which part/component of a multiplexed/shared DL SPS transmission is intended for the UE, and/or a combination/function thereof.

It is noted that, for the description of alternatives (1) or (2) or (3) above as applied to the aforementioned example, in one option, dedicated or shared PUCCH configuration can be from gNB configuration perspective (whether to use same/common PUCCH resource or dedicated/distinct PUCCH resources) and transparent to the UEs in the UE group (i.e., gNB implementation issue), e.g., some PUCCH related parameters can be still UE-specific even for a shared time/frequency resource for PUCCH. With this description/interpretation, it is possible for the gNB to still distinguish UEs sending NACK only feedback (in alternative (2)) or NACK only feedback (in alternative (3)) in a shared PUCCH resource, and therefore, it may be possible to support a HARQ retransmission to only the subset of UEs in the UE group that have indicated a failure, e.g., using a DCI-based scheduling of the HARQ retransmission.

On the other hand, in another option, dedicated or shared PUCCH configuration can be from UE perspective, where the configuration is visible/indicated to the UEs in the UE group, so few/no UE-specific parameter(s) is/are expected for a shared PUCCH resource. Therefore, this option better fits/supports a method in which the HARQ retransmission is intended for all UEs in the UE group (regardless of HARQ feedback/failure or success), e.g., using the DL SPS resources or using a DCI-based (individual or group) scheduling of the HARQ retransmission, unless HARQ feedback from UEs additionally includes some notion of the UE identity as described in the enhancement above.

Regarding the HARQ retransmission scheme, more options are available in the aforementioned example (i.e., indicated sharing of a DL SPS configuration among multiple UEs) compared to the aforementioned example (i.e., transparent sharing of a DL SPS configuration among multiple UEs).

In one example, regardless of the HARQ feedback scheme (e.g., alternative (1) or (2) or (3) above), when one or multiple UE(s) fail(s) to receive a DL SPS reception (or retransmission(s) thereof, if any) as indicated by NACK feedback (or by not sending an ACK feedback) to the gNB, the gNB can/may retransmit a HARQ retransmission of the failed SPS PDSCH (or retransmission(s) thereof) using either dynamic PDSCH scheduled by a DCI format only for those UEs indicating a failure, or using dynamic PDSCH scheduled by a group-common DCI format for all UEs in the group, or using DL SPS resources to all UEs in the group.

When a (individual) DCI format is used to schedule a HARQ retransmission to a UE that has indicated a failure for an initial/original shared DL SPS PDSCH transmission (which multiplexes multiple parts/components for multiple UEs), in one method, only a part/component is retransmitted which corresponds to the UE indicating the failure, while in another method, the entire multiplexed/shared DL SPS PDSCH transmission is retransmitted. A selection between these two options depends, among other things, on whether different parts/components of a shared message correspond to same TB/codeword or different TB s/codewords, as well as detailed mechanism of soft combining for HARQ.

Figure 8:
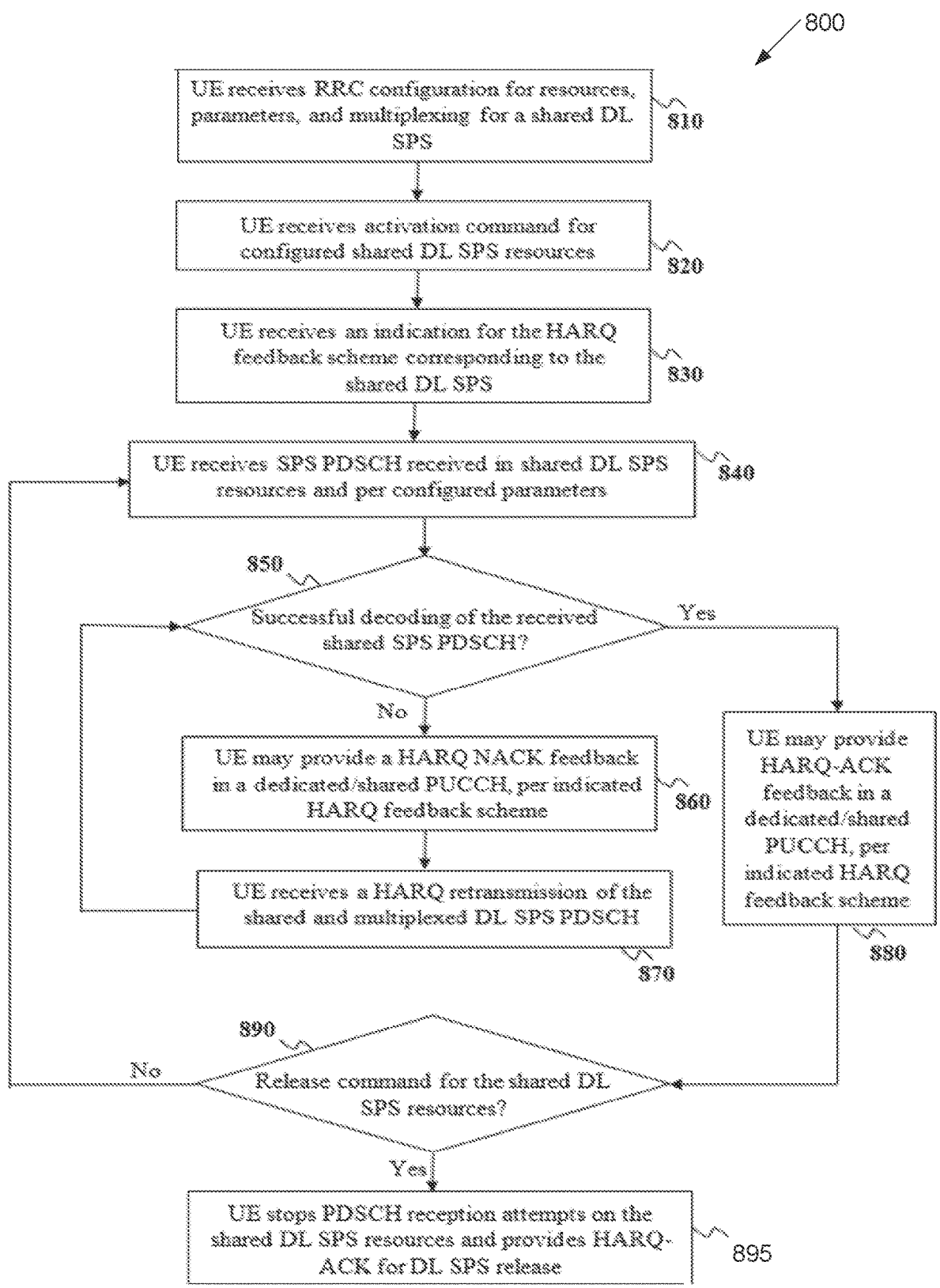
FIG. 8 illustrates a flow chart of a method for an hybrid automatic repeat request (HARD) procedure according to embodiments of the present disclosure.

FIG. 8 illustrates a flow chart of a method 800 for an HARQ procedure according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 shows an example of HARQ procedure for the aforementioned example, i.e., a HARQ feedback and retransmission for a multiplexed and shared SPS PDSCH among multiple UEs.

As illustrated in FIG. 8, a UE receives RRC configuration for resources, parameters, and multiplexing (e.g., a multiplexing identity) for a shared DL SPS at step 810. The UE then receives activation command (via RRC or DCI or MAC) for the configured shared DL SPS resources at step

820. Next, the UE receives an indication (via RRC/SIB or DCI or MAC) for the HARQ feedback scheme (e.g., alternatives (1) or (2) or (3) of enhancements thereof) corresponding to the shared DL SPS at step 830. The UE then receives an SPS PDSCH received in the configured shared DL SPS resources and per configured parameters at step 840. Then, the UE attempts to decode transport block(s) in the received shared SPS PDSCH at step 850. If the UE cannot successfully decodes the transport block(s) in the received shared SPS PDSCH, then the UE may provide a HARQ NACK feedback (possibly along with a multiplexing identity) in a dedicated or shared PUCCH, per indicated HARQ feedback scheme. The UE then receives a HARQ retransmission of the shared and multiplexed DL SPS PDSCH at step 870, e.g., either as a dynamic PDSCH that is scheduled by a UE-specific or group-common DCI or possibly in the shared DL SPS resources or in another DL SPS resource.

If the UE can successfully decode the transport block(s) in the received shared SPS PDSCH (possibly using any received HARQ retransmissions), then the UE may provide HARQ-ACK feedback (possibly along with a multiplexing identity) in a dedicated or shared PUCCH, per indicated HARQ feedback scheme at step 880. Next, the UE monitors for a release command (via RRC or DCI or MAC) for the shared DL SPS resources at step 890. If the UE has not received any release command for the shared DL SPS resources, the UE continues to receive SPS PDSCH in the configured resources for the shared DL SPS and per configured parameters at step 840. When the UE receives a release command for the shared DL SPS resources, the UE stops SPS PDSCH reception attempts on the configured resources for the shared DL SPS and provides a HARQ-ACK feedback for DL SPS PDSCH release at step 895.

When a group-common DCI is used to schedule for all UEs in the UE group a HARQ retransmission corresponding to an initial shared DL SPS PDSCH transmission, HARQ related information such as HPN, NDI, and RV are indicated in the group-common DCI. In particular, it is either assumed that all UEs sharing a DL SPS configuration determine a same HPN for an initial shared and multiplexed DL SPS PDSCH transmission (e.g., using same symbol/slot counting when calculating the HPN using a predetermined formula based on the start timing of the DL SPS transmission, e.g., because of using on a same numerology), or assumed that an indicated HPN in the group-common DCI refers to a reference HPN calculation, e.g., using a reference/default symbol/slot counting and/or a reference/default numerology (e.g., 15 kHz or a configured numerology) when calculating the HPN using a predetermined formula based on the start timing of the DL SPS transmission, while any UE that has a symbol/slot counting and/or numerology different from that/those in the reference/default setting needs to appropriately adjust the indicated HPN to determine the actual HPN intended for that UE.

When shared DL SPS is used to send for all UEs in the UE group a HARQ retransmission corresponding to an initial shared DL SPS PDSCH transmission, in one example, a HARQ retransmission is performed in a (earliest) DL SPS transmission occasion following the HARQ feedback from the UEs in the UE group, possibly plus an additional predetermined/configured timing offset/time window, such that the DL SPS transmission occasion corresponds to a same HARQ process as that for the initial shared DL SPS PDSCH transmission, e.g., when calculating the HPN using a predetermined formula based on the start timing of the DL SPS transmission. In another example, an RV is based on a cyclic/sequential selection form a predetermined set of RVs, such as {0, 0, 0, 0} or {0, 3, 0, 3} or {0, 2, 3, 1}. In yet another example, HARQ related parameters such as HPN, NDI, and RV are explicitly included/appended in the shared DL SPS PDSCH retransmissions, e.g., as a multiplexed control signalling.

In one enhancement of this example, usage of group-common DCI/shared DL SPS configuration for retransmission of a failed SPS PDSCH (or retransmission(s) thereof) to all UEs in the group is only selected by the gNB if at least a configured/predetermined minimum number [N] of UEs (e.g., at least N=2 or 4 UEs) or a configured/predetermined minimum fraction R of UE-group size (e.g., at least R=1/16 of the UE-group size, or at least R=1/4 of the UEs in the UE-group) indicate HARQ NACK (or do not indicated ACK). According to this enhancement, if the number/fraction of UEs indicating a failure in DL SPP reception (or retransmission(s) thereof) is less than the configured/predetermined minimum number or fraction of the UEs in the UE-group, individual DCI(s) is/are used for HARQ retransmission only to those UEs indicating a failure.

In one example, which is a combination of the aforementioned examples, resource sharing for the shared DL SPS is indicated to UEs, however, the entire DL SPS PDSCH is received by and intended for all UEs, i.e., a broadcast/multicast scheme. According to this example, the activation and/or release of a shared DL SPS (Type-2, per terminology of the above discussed embodiments for DL SPS Type-1 with RRC activation/release) can be based on a group-common DCI format or individual/distinct DCI formats for each UE in the UE group. In addition, HARQ feedback may or may not be supported. If a HARQ feedback is supported and HARQ retransmission is enabled (or not disabled), then similar options as in the aforementioned examples can be used.

In one embodiment of for procedures for group activation of DL SPS/UL CG for one or multiple UEs via PDSCH, when multiple DL SPS (Type-2, per terminology of the above discussed embodiments for DL SPS Type-1 with RRC activation/release) configurations or multiple UL CG Type-2 configurations need to be activated, the corresponding activation commands can be multiplexed in a group activation command and conveyed via PDSCH such as a MAC command.

In such embodiment, the multiple DL SPS (Type-2) configurations or the multiple UL CG Type-2 configurations can correspond to one or multiple UEs. In one example, the group activation/release command corresponds to a single UE, wherein the UE is configured with multiple DL SPS (Type-2) configurations/multiple UL CG Type-2 configurations, and a subset (of size>1) of those configurations need to be activated/released.

In another example, the group activation/release command corresponds to multiple UEs, wherein each UE from the multiple UEs is configured with one or multiple DL SPS (Type-2) configurations/one or multiple UL CG Type-2 configurations and a subset (of size=1 or size>1) of those configurations need to be activated/released. In the latter example, DL SPS/UL CG configurations configured to different UEs can be dedicated or shared (e.g., as discussed in the embodiments for sharing a DL SPS among a group of UEs with broadcast/multicast or multiplexing above on shared DL SPS configuration). In a related example, the group activation/release can correspond to activating/releasing one or multiple shared DL SPS/UL CG configurations that are shared among multiple UEs.

The group activation/release command for DL SPS/UL CG configuration(s) in this embodiment can be considered as a configuration-group/UE-group MAC PDU/command/message or MAC-CE command intended for one UE or multiple UEs/a group of UEs. In one example, the group activation command may be multiplexed with DL data and possibly other MAC-CE command(s).

In one example, a UE-group activation for DL SPS/UL CG configuration(s) for multiple UEs can by RRC if latency is not an issue, e.g., if no latency constraints/restrictions/limits.

In one example, when a group activation command for DL SPS/UL CG corresponds to a single UE (to activate multiple DL SPS/UL CG configurations for the UE), the group activation command is contained in a unicast PDSCH which is scheduled by a UE-specific/individual DCI format, such as DCI format 1_0 or 1_1 or 1_2 and so on, in a UE-specific CORESET and UE-specific search space (USS) set, and addressed to a UE-specific RNTI (such as CS-RNTI).

In one example, in one option, a HARQ feedback can be supported for the group activation command, e.g., using regular/legacy HARQ feedback and retransmission mechanism for PDSCH, e.g., such as those described in 3GPP NR Rel-15/16; while in another option, no HARQ feedback mechanism for the group activation command is supported with HARQ soft combining may or may not being supported, e.g., if DL SPS reception and HARQ feedback/UL CG transmissions do not start after a predetermined/configured number of symbols/slots or after expiry of a configured timer or ending of a time window, then the gNB retransmits the group activation command.

In one example, when a group activation command for DL SPS/UL CG corresponds to multiple UEs (to activate one or multiple DL SPS/UL CG configurations for each UE among the multiple UEs), the group activation command is contained in a multicast/broadcast PDSCH which is scheduled by a DCI format such as a new group-common DCI (GC-DCI) format or an existing DCI format in 3GPP NR Rel-15/16, in a common CORESET and common search space (CSS) set (e.g., a separately configured CORESET/CSS set or an existing CORESET/CSS set in 3GPP NR Rel-15/16), and addressed to a common RNTI (e.g., a new common RNTI, say CS-G-RNTI, or an existing common RNTI in 3GPP NR Rel-15/16). In one example, if a new format is used for the GC-DCI, then a size of the new format is aligned with one of the existing DCI formats to ensure no increase in UE blind decoding attempts.

If a HARQ operation for a UE-group activation command is supported and enabled (or not disabled)—as elaborated below—a (group-common) DCI format that schedules a multicast/groupcast/broadcast PDSCH which carries the UE-group activation command can provide zero or one or more of: a HARQ process number (HPN), a new data indicator (NDI), a redundancy version (RV), a PUCCH resource index, a TPC command for PUCCH, a PDSCH-to-HARQ timing indicator, [and a downlink assignment index (DAI)].

In such example, all UEs that share a UE-group activation command for DL SPS/UL CG apply the indicated parameters in the (group-common) DCI format in a same/similar manner. In one example, PUCCH resource indices for all UEs sharing a UE-group activation command is (pre-)configured, RRC configured or SIB indicated; so no need for indication in the (group-common) DCI format. In another example, if a PUCCH resource index is indicated in the (group-common) DCI format, the PUCCH resource can be a shared PUCCH resource to be used for all UEs (as discussed further below, e.g., to be used in Alternatives (b) and (c)).

In another example, when UEs that share a UE-group activation command for DL SPS/UL CG are configured/indicated to report HARQ feedback on separate/distinct/dedicated PUCCH resources (as discussed further below, e.g., to be used in Alternatives (a)), and when a PUCCH resource index is indicated in the (group-common) DCI format, the PUCCH resource can be a PUCCH resource to be used for a first UE (wherein, a first UE can be e.g., a UE whose activation command(s) is/are multiplexed first in the PDSCH that carries the UE-group activation command, or e.g., a first UE can be a UE with the smallest/largest global ID/membership ID among UEs whose activation command(s) is/are multiplexed in the PDSCH that carries the UE-group activation command), while PUCCH resource for other UEs is implicitly determined/indicated sequentially based on the PUCCH resource indicated for the first UE (where, again, ordering for sequential PUCCH resource index determination can be based on the ordering of activation command(s) for UEs in the UE-group activation command or based on the ordering of global IDs/membership IDs, and so on).

In yet another example, no PUCCH resource index is included in the (group-common) DCI format, in which case, a PUCCH resource index can be explicitly indicated in the MAC-CE command/the PDSCH carrying the UE-group activation command, either one resource for each UE, or only one resource for a first UE, and then an implicit method (e.g., sequential determination as mention above) to determine PUCCH resource indices for other UEs.

In a further example, when a PUCCH resource index is not indicated for any of the UEs, neither in the (group-common) DCI format nor in the MAC-CE command/the PDSCH carrying the UE-group activation command, a first UE implicitly determines a PUCCH resource index, e.g., based on the index of a first CCE in a (common) CORESET of a PDCCH reception with the (group-common) DCI format that schedule the MAC-CE command/the PDSCH carrying the UE-group activation command, and then an implicit method (e.g., sequential determination as mention above) to determine PUCCH resource indices for other UEs.

In the aforementioned examples, a first UE can be a UE whose activation command(s) is/are multiplexed first in the PDSCH that carries the UE-group activation command, or e.g., a first UE can be a UE with the smallest/largest global ID/membership ID among UEs whose activation command(s) is/are multiplexed in the PDSCH that carries the UE-group activation command.

In one example, if active DL BWPs for UEs that share a UE-group activation command correspond to different numerologies, then a PDSCH-to-HARQ timing indicator field in the (group-common) DCI format corresponds to a default numerology (e.g., 15 kHz for FR1 and 60 kHz for FR2) or corresponds to a numerology for a configured/indicated reference numerology, and for UEs whose numerology is different from the default/configured/indicated reference numerology, appropriate scaling is applied to determine the PDSCH-to-HARQ timing value. In a related example, it is not expected that active DL BWPs for UEs, when receiving a UE-group activation command, correspond to different numerologies. In one example, downlink assignment index (DAI) for UEs sharing a UE-group activation command is explicitly included in the MAC-CE command/the PDSCH carrying the UE-group activation command.

According to the aforementioned example, regarding HARQ feedback and retransmission procedure for the PDSCH carrying the UE-group activation command, in one example, no HARQ feedback mechanism is supported with HARQ soft combining may or may not being supported, e.g., if DL SPS reception(s) and HARQ feedback(s)/UL CG transmission(s) of indicated DL SPS/UL CG configuration(s) for one or multiple UEs that share a UE-group activation command do not start after a predetermined/configured number of symbols/slots or after expiry of a configured timer or ending of a time window, then the gNB retransmits either the UE-group activation command to all UEs or only (individual) activation commands for each of the UEs missing DL SPS reception(s) and HARQ feedback(s)/UL CG transmission(s).

In another example, a HARQ retransmission can be (enabled or) disabled by an RRC parameter. In yet another example, if HARQ feedback and retransmission mechanism is supported, and HARQ retransmission is enabled or a HARQ disabling configuration is not provided, all UEs in a UE group that share a UE-group activation command for DL SPS/UL CG provide HARQ feedback for a PDSCH that carries the UE-group activation command, upon detection of a (group-common) DCI format that schedules the (groupcast/multicast) PDSCH according to a number of alternatives.

In alternative (a), each UE in the UE group uses a dedicated PUCCH resource to provide a HARQ ACK or NACK feedback, where an ACK corresponds to a detection of the (group-common) DCI format and successful decoding of the corresponding PDSCH, while a NACK corresponds to detection of the (group-common) DCI format but unsuccessful/failed decoding of the corresponding PDSCH In alternative (b), all UEs in the UE group use a shared PUCCH resource to provide an ACK only feedback, where the ACK corresponds to a detection of the (group-common) DCI format and successful decoding of the corresponding PDSCH; so that, if no HARQ feedback is received/detected by the gNB from a UE in the UE group, the gNB may/can assume a NACK, i.e., either no detection of the (group-common) DCI format or a detection thereof but an unsuccessful/failed decoding of the corresponding PDSCH, and in either case the gNB needs to re-schedule and retransmit the DL SPS/UL CG activation command.

In alternative (c), all UEs in the UE group use a shared PUCCH resource to provide a NACK only feedback, where the NACK corresponds to a detection of the (group-common) DCI format an unsuccessful/failed decoding of the corresponding PDSCH; so that if no HARQ feedback is received/detected by the gNB from a UE in the UE group, either the UE has detected the (group-common) DCI format and successfully decoded the corresponding PDSCH (so, an implicit ACK—no need for retransmission of the DL SPS/UL CG activation command) or UE has not detected the (group-common) DCI format at all (in which case, the gNB needs to re-schedule and retransmit the DL SPS/UL CG activation command)—the gNB is still able to distinguish these two very different cases (although possibly with some extra latency), since for the former case (PDCCH detection and PDSCH decoding), the UE may act based upon the UE-group activation command for DL SPS/UL CG, but if DL SPS reception(s) and HARQ feedback(s)/UL CG transmission(s) of indicated DL SPS/UL CG configuration(s) for one or multiple UEs that share a UE-group activation command do not start after a predetermined/configured number of symbols/slots or after expiry of a configured timer or ending of a time window, the gNB can assume that the latter case happened (no PDCCH detection), so the gNB needs to re-schedule and retransmit the DL SPS/UL CG activation command.

In an enhancement of alternatives (b) and (c), when shared resources are used to report HARQ feedback for a shared DL SPS configuration in the aforementioned example, HARQ feedback from UEs additionally includes some notion of the UE identity as described in the embodiments for contents of a group activation of DL SPS/UL CG for one or multiple UEs via PDSCH below, for example one or more of the following, e.g., a (global) UE ID provided by higher layers or a function thereof, or a group membership ID which distinguishes the UE among the UE group members, such as an order index in the PDSCH command and/or a starting bit indication within PDSCH and/or an SLIV-based configuration parameter to indicate which part/component of a multiplexed/shared DL SPS transmission is intended for a/each UE, and/or an explicit or implicit group membership ID, and/or a combination/function thereof.

It is noted that, for the description of alternatives (a) or (b) or (c) above, dedicated or shared PUCCH configuration can be from gNB configuration perspective (whether to use same/common PUCCH resource or dedicated/distinct PUCCH resources) and transparent to the UEs in the UE group (i.e., gNB implementation issue), e.g., some PUCCH related parameters, such as one or more of cyclic shift, orthogonal cover codes, pseudo-random scrambling, and so on, can be still UE-specific even for a shared time/frequency resource for PUCCH. With this description/interpretation, it is possible for the gNB to still distinguish UEs sending ACK only feedback (in alternative (b)) or NACK only feedback (in alternative (c)) in a shared PUCCH resource, and therefore, it may be possible to support a HARQ retransmission to only the subset of UEs in the UE group that have indicated a failure, e.g., using a (individual) DCI-based scheduling of the HARQ retransmission.

On the other hand, in another option, dedicated or shared PUCCH configuration can be from UE perspective, where the group configuration is visible/indicated to all UEs in the UE group, so few/no UE-specific parameter(s) is/are expected for a shared PUCCH resource. Therefore, this option better fits/supports a method in which a HARQ retransmission is intended for all UEs in the UE group (regardless of HARQ feedback/failure or success), e.g., using a DCI-based (individual or group-common) scheduling of the HARQ retransmission, unless HARQ feedback from UEs additionally includes some notion of the UE identity as described in the enhancement above.

Regarding which HARQ feedback scheme to use for a PDSCH carrying a UE-group activation command for DL SPS/UL CG: in one example, dedicated or broadcast configuration signalling (e.g., RRC or SIB) e.g., in DL SPS/UL CG configuration and/or in UE-group activation configuration (e.g., CORESET/search space configuration for GC-DCI, and so on) indicates which scheme for HARQ feedback (e.g., alternative (a) or (b) or (c)) the UE may follow.

In another example, the UE-group activation command (PDCCH and/or PDSCH) indicates which scheme for HARQ feedback (e.g., alternative (a) or (b) or (c)) the UE may follow. In another example, a selection for HARQ feedback scheme (e.g., alternative (a) or (b) or (c)) can be implicit, e.g., there can be a linkage between the HARQ feedback scheme and one or more of: UE identity (global ID or a group membership ID), DL SPS/UL CG configuration indication/index/state, and so on.

Regarding the HARQ retransmission scheme, in one example, regardless of the HARQ feedback scheme (e.g., alternative (a) or (b) or (c) above), when one or multiple UE(s) fail(s) to receive a UE-group activation command for DL SPS/UL CG (or retransmission(s) thereof, if any) as indicated e.g., by NACK feedback or by not sending an ACK feedback to the gNB, the gNB can/may retransmit a HARQ retransmission of the failed UE-group activation command (or retransmission(s) thereof) using either unicast PDSCH scheduled by a (individual) DCI format only for those UEs indicating a failure, or using multicast/groupcast PDSCH scheduled by a (group-common) DCI format for all UEs in the group.

When a (individual) DCI format is used to schedule a HARQ retransmission to a UE that has indicated a failure for an initial/original UE-group activation command PDSCH transmission (which multiplexes activation command(s) for multiple UEs), in one method, only the/those activation command(s) is/are retransmitted which correspond(s) to the UE indicating the failure, while in another method, the entire multiplexed UE-group activation command PDSCH transmission is retransmitted. A selection between these two options depends, among other things, on whether different activation command(s) aimed for each UE of the UE group that share a UE-group activation command correspond to same TB/codeword or different TBs/codewords, as well as detailed mechanism of soft combining for HARQ.

Figure 9:
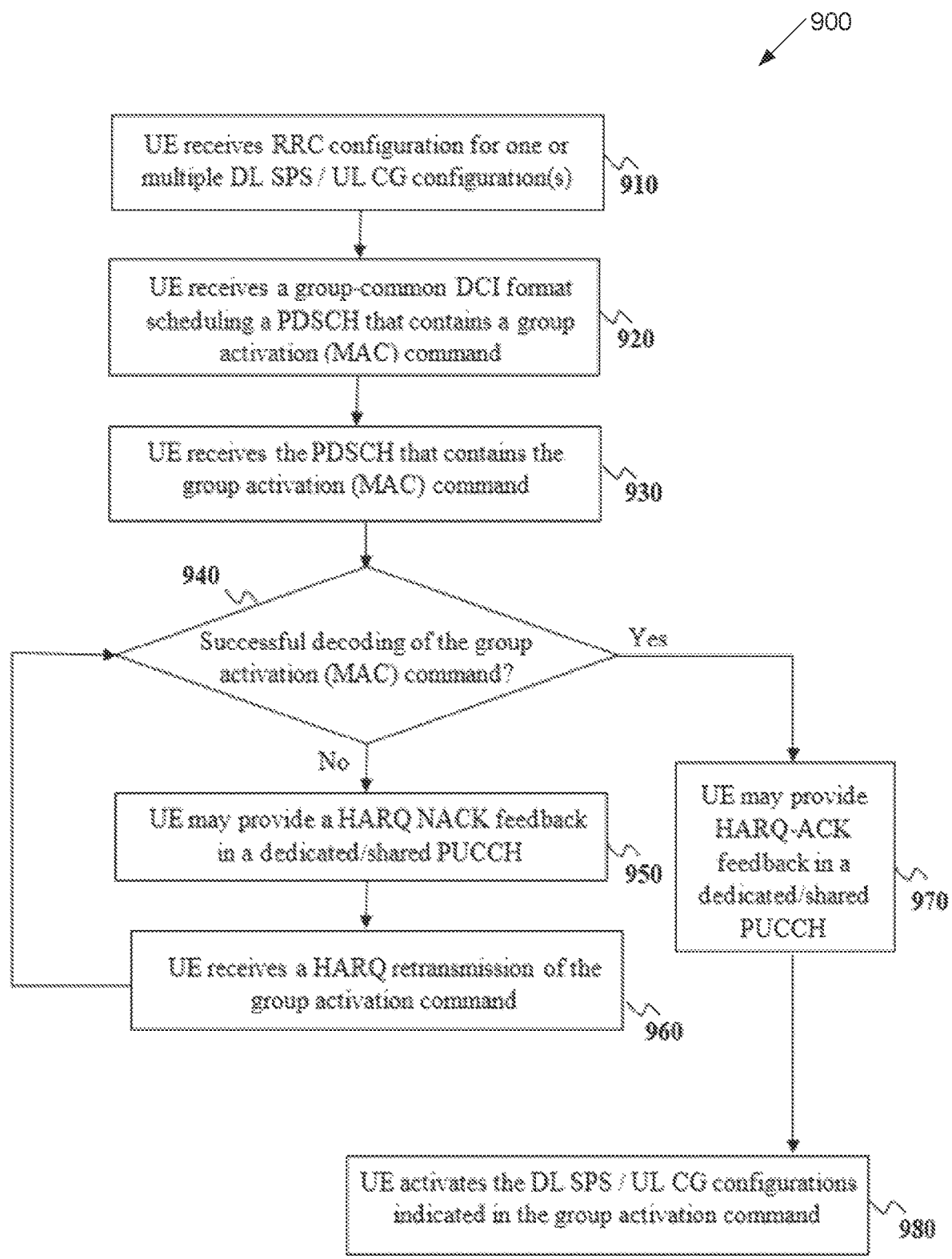
FIG. 9 illustrates a flow chart of a method for a group activation command for multiple DL SPS/uplink (UL) configured grant (CG) configurations corresponding multiple UEs according to embodiments of the present disclosure.

FIG. 9 illustrates a flow chart of a method 900 for a group activation command for multiple DL SPS/UL CG configurations corresponding multiple UEs according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, a UE receives RRC configuration for one or multiple DL SPS/UL CG configuration(s) at step 910. The UE then receives a UE receives a group-common DCI format scheduling a PDSCH that contains a group activation (MAC) command at step 920. Next, the UE receives the PDSCH that contains the group activation (MAC) command at step 930. Then, the UE attempts to decode the group activation (MAC) command at step 940. If the UE does not successfully decode the group activation (MAC) command, the UE may provide a HARQ NACK feedback in a dedicated or shared PUCCH at step 950, based on a HARQ feedback scheme indicated in the group-common DCI format.

The UE then receives a HARQ retransmission of the group activation command at step 960. If the UE successfully decodes the group activation (MAC) command, the UE may provide a HARQ ACK feedback in a dedicated or shared PUCCH at step 970, based on the HARQ feedback scheme indicated in the group-common DCI format, and finally activates the DL SPS/UL CG configurations indicated in the group activation command at step 980.

In one example, HARQ feedback and/or retransmission (e.g., one from the options listed above) used for DL SPS activation can be same or different from that used for UL CG activation, for a same UE in a same/different UE group(s).

In an enhancement, multiple DL SPS Type-1/UL CG Type-1 configurations corresponding to one or multiple UE(s) can be configured and jointly activated by RRC (and released via RRC or a release DCI/MAC). In another enhancement, multiple DL SPS Type-1/UL CG Type-1 configurations corresponding to one or multiple UE(s) can be activated by a group activation DCI/MAC (and released via RRC (reconfiguration/release) message/command or a release DCI/MAC).

In one embodiment for contents of a group activation of DL SPS/UL CG for one or multiple UEs via PDSCH, when multiple DL SPS (Type-2, per terminology of the above discussed embodiments for DL SPS Type-1 with RRC activation/release) configurations or multiple UL CG Type-2 configurations need to be activated, the corresponding activation commands can be multiplexed in a group activation command and conveyed via PDSCH such as a MAC command. According to this embodiment, a group activation command for a single UE includes one or more of: an indication (e.g., a 1-bit field) for whether the group activation corresponds to DL SPS or UL CG; an indication for a number [N] of DL DPS/UL CG configurations to be activated; and a same number [N] of individual activation commands, wherein each individual activation command can include an indication of which individual DL SPS/UL CG configuration is to be activated and a corresponding set of information elements (IEs) for activation of that DL SPS/UL CG configuration.

In one example, a possible set of information elements (IEs) for DL SPS/UL CG activation includes one or more of: resource allocation parameters such as time and/or frequency resource allocation(s), virtual to physical resource mapping, intra-/inter-/cross-slot frequency hopping indication and/or parameters (if applicable); link/scheduling related parameter such as MCS and/or TBS index in a configured MCS/TBS table, cell/carrier/BWP indication for cross-cell/carrier/BWP activation (if supported); MIMO related parameters such as antenna port, TCI/SRI/PMI, DMRS initialization, and PTRS association (if applicable); HARQ related parameter such as PDSCH-to-HARQ timing for DL SPS, or PUSCH-to-HARQ/DFI/DCI timing for UL CG (if supported, e.g., for unlicensed spectrum operation), CBG operation parameters such as number of CBGs, CBG flushing (if supported/applicable); PRB bundling parameter(s) such as PRB bundling size (if applicable); and rate matching parameter(s) such as rate matching indicator (if applicable).

In one example, a number [N] of DL SPS/UL CG configurations that are activated in a group activation command is fixed in the specification or is configurable. In a related example, a number [N] of DL SPS/UL CG configurations that are activated in a group activation command is not expected to exceed a maximum number [N_max] of possible DL SPS/UL CG configurations be activated in a group activation command, wherein [N_max] can be predetermined or configured, and may depend on one or more of: MCS/TBS for the PDSCH carrying the group activation command, the link/beam quality, number of HARQ processes, UE capability, and so on.

In another example, the set of IEs in each individual element and/or their ordering and/or their bit-width are fixed in the specifications, or are configured, or are assumed to be same as/similar to an existing DCI format (wherein which DCI format can be fixed in the systems specifications or can be configurable) perhaps with some predetermined/configurable exclusions and/or additions, or a combination thereof. In one enhancement, when all DL SPS/UL CG configurations that are activated by a same group activation command share one or multiple IEs/parameters (e.g., shared time and/or frequency resources, or e.g., shared beam/TCI/SRI/PMI, and so on), the group activation command can indicate the shared IEs/parameters (along with a corresponding length in bits for the indication of shared parameters) before starting the individual activation commands, and exclude the shared IEs/parameters from the individual activation commands, i.e., indicating only distinct (i.e., non-shared) IEs/parameters.

According to this embodiment, a group activation command for multiple UEs can include one or more of the following: an indication for the number [M] of UEs that share the group activation command, and [M] activation commands for the corresponding [M] UEs, possibly along with an indication for the bit-width of each activation command.

In one example, [M] need not be indicated in the group activation command sine [M] is fixed/pre-determined in the system specifications or is configurable. In another example, [M] is not expected to exceed a maximum number [M_max] of UEs sharing a group activation command for DL SPS/UL CG, wherein [M_max] can be predetermined in the system specifications or can be configured, and can/may depend on one or more of: MCS/TBS for the PDSCH carrying the group activation command, the link/beam quality for PDSCH, UE capability, and so on.

Regarding the structure of each activation command, in one example, an activation command for a UE corresponds to (group) activation of one or multiple DL SPS/UL CG configurations as described above. In a related example, it is expected that within a group activation command for multiple UEs (say [M] UEs as above), the number [N] (as described earlier above) of DL SPS/UL CG configuration(s) that is activated for each UE, is expected to be the same, e.g., [N]=1 configuration is activated for each of the [M] UEs, or e.g., [N]=2 configurations are activated for each of the [M] UEs.

In another related example, the number [N] of DL SPS/UL CG configuration(s) that is activated for each of the [M] UEs can be different, e.g., [N]=2 for a first UE and [N]=1 for a second UE. Regarding the bit-widths for the [M] activation commands, in one example, the bit-widths can be different, while in another example, the bit-widths are (expected to be) the same, e.g., all [M] activation commands are size-aligned, e.g., to the maximum bit-width among the activation command, using zero-padding if necessary. In a further example, the total length (in number of bits) of an activation message is not expected to exceed a predetermined or configurable value.

Regarding how to identify the corresponding activation command for each of [M] UEs within a group activation command, in one example, an index/indication is configured for each UE to indicate the position of the activation command for the/each UE in the group activation command, e.g., an index that indicates the order of UEs in the group activation command, e.g., an index=1 for a first UE indicates that the first component among the [M] components corresponds to the first UE, and index=4 for a second UE indicates that the 4$^{th}$ component among the [M] components corresponds to the second UE.

In another example, if all components are size-aligned, an indication for each UE can be in term of a starting bit (absolute value, or e.g., value in terms of a factor e.g., 8 bits) to indicate which bit in the group activation command is the starting bit for the component/activation command corresponding to each UE.

In yet another example, an SLIV-based method can be used to indicate (in a jointly coded manner) the start and length of each component within a group activation command. In a further example, if a group activation command does not include an activation command for one or multiple UEs within the [M] UEs, the components for those UEs are indicated with a default bit string, e.g., all 0's or all 1's, with a bit-width which is predetermined, or is configured, e.g., a minimum/default bit-width needed for activation of one DL SPS/UL CG configuration.

In yet another example, each UE is configured with a membership ID from a predetermined/configured set of IDs, e.g., {1, 2, 3, 4} or {1, . . . , 8} or {1, . . . , 16}, and each component of a UE-group activation command also includes a corresponding ID, so that the UE whose membership ID matches with the ID indicated a component of the UE-group activation command applies the DL SPS/UL CG configuration(s) as indicated in that component/activation command; in this case, the number of [M] UEs that share a UE-group activation command can be smaller the size of the membership ID set, and also, for a same membership ID set, a number of UEs that share a first UE-group activation command can be different from a number of UEs that share a second UE-group activation command; in addition, in this case, an ordering of activation commands for UE in a UE-group activation command can be same or different from the ordering of the UE membership IDs, e.g., it can be based on the number of configuration(s) to be activated for each UE and/or based on bit-width needed for activation of the configuration(s) for each UE, and so on.

In a further example, an explicit membership ID is not configured, rather a membership ID is implicitly determined based on a predetermined rule/formula, e.g., based on TDRA/FRDA, DMRS configuration, and so on. Regardless of the examples above and how a PDSCH carrying a UE-group activation command is structured, a phrase such as "UEs sharing a UE-group activation command" or similar to this, throughput this disclosure, can imply all UEs configured for a UE-group activation of DL SPS/UL CG, regardless of whether or not a UE in the UE group receives an activation command for DL SPS/UL CG in a transmission occasion of a UE-group activation command, or can imply only those UEs within the configured UE group that receive an activation command for DL SPS/UL CG in a transmission occasion of a UE-group activation command.

Figure 10:
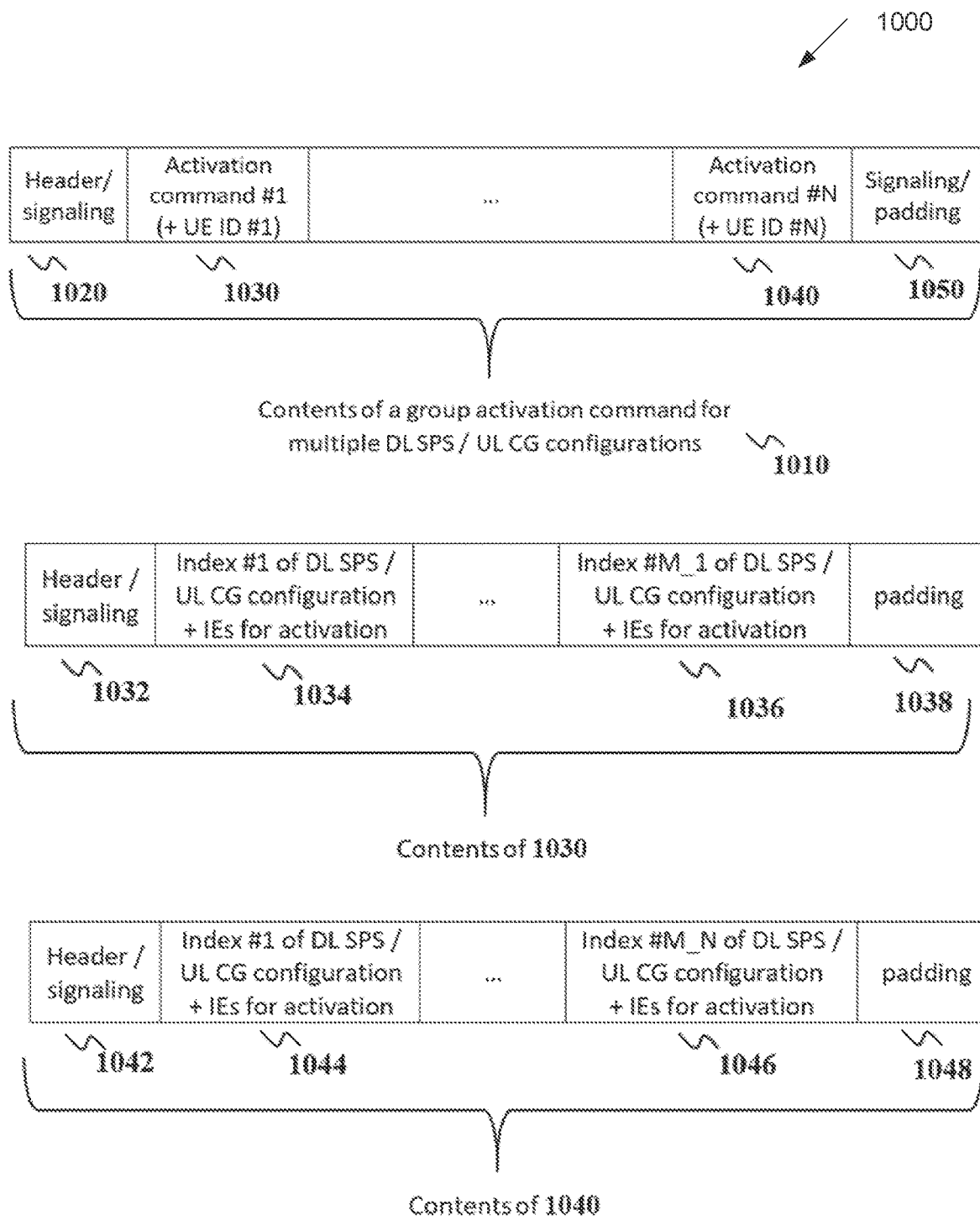
FIG. 10 illustrates an example content of a group action command for multiple DL SPS/UL CG configurations corresponding to one or multiple UEs according to embodiments of the present disclosure.

FIG. 10 illustrates an example content of a group action command for multiple DL SPS/UL CG configurations 1000 corresponding to one or multiple UEs according to embodiments of the present disclosure. An embodiment of the content of a group action command for multiple DL SPS/UL CG configurations 1000 shown in FIG. 10 is for illustration only.

As illustrated in FIG. 10, the contents of a group activation command for multiple DL SPS/UL CG configurations is shown in 1010, which consists of a header and/or some control signaling information (such as the number N>=1 of UEs sharing a group activation command), 1020, then a first activation command for a first UE possibly along with a UE ID for the first UE, 1030, until, an N-th activation command for an N-th UE possibly along with a UE ID for the N-th UE, 1040, and finally some control information signaling and/or (zero) padding, 1050.

The contents of each activation command is shown: for the first UE, the contents of 1030 includes a header and/or some control information signaling 1032, an index for a first DL SPS/UL CG configuration to be activated for the first UE along with the corresponding information elements (IEs) for activation, 1034, and so on, until an index for an [M_1]-th (where M_1>=1) DL SPS/UL CG configuration to be activated for the first UE along with the corresponding information elements (IEs) for activation, 1036, and finally some control information signaling and/or (zero) padding, 1038. Similarly, the contents of 1040 includes a header and/or some control information signaling 1042, an index for a first DL SPS/UL CG configuration to be activated for the N-th UE along with the corresponding information elements (IEs) for activation, 1044, and so on, until an index for an [M_N]-th (where M_N>=1) DL SPS/UL CG configuration to be activated for the N-th UE along with the corresponding information elements (IEs) for activation, 1046, and finally some control information signaling and/or (zero) padding, 1048.

In one embodiment for group release of DL SPS/UL CG for multiple UEs, when multiple DL SPS (Type-2, per terminology of the above discussed embodiments for DL SPS Type-1 with RRC activation/release) configurations or multiple UL CG Type-2 configurations need to be released, the corresponding release commands can be multiplexed in a UE-group release command and conveyed via PDCCH or PDSCH.

In one example of this embodiment, a UE-group release command for DL SPS/UL CG configurations is supported via PDCCH, e.g., an existing DCI format in 3GPP NR Rel-15/16 or a group-common DCI (GC-DCI) format (say DCI format 2_x e.g., 2_5, or e.g., same/similar to a GC-DCI for UE-group activation command as described in the embodiments for group activation of DL SPS/UL CG for one or multiple UEs via PDSCH above) in a common PDCCH reception in a common CORESET and common search space (CSS) set (e.g., a separately configured CORESET/CSS set or an existing CORESET/CSS set in 3GPP NR Rel-15/16), and addressed to a common RNTI (e.g., a new common RNTI, say CS-G-RNTI, or an existing common RNTI in 3GPP NR Rel-15/16).

In one example, if a new format is used for the GC-DCI, then a size of the new format is aligned with one of the existing DCI formats to ensure no increase in UE blind decoding attempts. In one example, a GC-DCI used for UE-group release of DL SPS/UL CG configurations can include predetermined values for predetermined fields for validation of a GC-DCI as a UE-group release, such as one or more of: HARQ process number (HPN) set to all 0's, NDI=0, RV=00, MCS=all 1's, and FDRA=all 1's (if supported and/or applicable).

In another example, a GC-DCI for UE-group release of DL SPS/UL CG includes indications for multiple "states," each state for one UE, wherein each state from a set of configured states corresponds to one or multiple DL SPS/UL CG configuration(s) configured to the UE, so that states can be used to release one or multiple DL SPS/UL CG configurations for the UE at once.

In yet another example, each state release can accompany an indication for UE identity to distinguish which state release corresponds to which UE; for details of UE identity indication, same/similar methods as described in the embodiments for procedures for group activation of DL SPS/UL CG for one or multiple UEs via PDSCH discussed above for the case of UE-group activation can be used. In a further example, there are predetermined or configured values on the number of UEs that can share a UE-group release command using PDCCH, such as those for DCI formats 2_x in 3GPP NR Rel-15/16.

In one example, a UE-group release command for DL SPS/UL CG configurations is supported via PDSCH, and can include one or more of the following: an indication for the number [M] of UEs that share the UE-group release command, and [M] release commands for the corresponding [M] UEs, possibly along with an indication for the bit-width of each release command. In one example, a release command for a UE contained in a UE-group release command can include an indication of a "state," where each state from a set of configured states corresponds to one or multiple DL SPS/UL CG configuration(s) configured to the UE, so states can be used to release one or multiple DL SPS/UL CG configurations for the UE at once.

In another example, a release command for a UE contained in a UE-group release command can include an indication for one or multiple DL SPS/UL CG configurations, e.g., one or multiple indexes for the configuration(s) configured to the UE, so that DL SPS/UL CG configuration(s) corresponding to those index(es) is/are released.

In one example, when both UE-group activation and UE-group release of DL SPS/UL CG configurations using PDSCH are supported, and when the distinction for activation versus release cannot be obtained by the corresponding PDCCH, then an indication within the PDSCH is needed for both UE-group activation command and UE-group release command to distinguish between the two, e.g., a "0" or "000" header/field for release and a "1" or "111" for activation, or some other default structure/setting for parameters. Regarding number [M] of UE sharing a UE-group release command, the bit-width of each release command and the entire UE-group release command, and regarding how to identify which component/release command corresponds to which UE, same/similar methods as described in the embodiments for contents of a group activation of DL SPS/UL CG for one or multiple UEs via PDSCH above for the case of UE-group activation can be used.

In one example, for release of DL SPS/UL CG configuration(s) for one or multiple UEs, regardless of using PDCCH or PDSCH for the release command, HARQ feedback and retransmission is supported. According to this example, regarding HARQ procedures for UE-group release command, same/similar methods as those described above in the embodiments for group activation of DL SPS/UL CG for one or multiple UEs via PDSCH for HARQ feedback and retransmission for UE-group activation, PUCCH resource determination, and so on, can be used.

In one enhancement, for release of DL SPS/UL CG configuration(s) for one or multiple UEs, regardless of using PDCCH or PDSCH for the release command, a cell/carrier/BWP indication field can be used to perform cross-cell/carrier/BWP release of DL SPS/UL CG configuration(s). According to this enhancement, there is no need for reception of PDCCH in a same cell/carrier/BWP where a DL SPS/UL CG is configured/located. In one enhancement, for a UE-group release command (at least using PDSCH) received on a first cell/carrier/BWP, there can be a cell/carrier/BWP indication per "state" release for each UE, so that, the same command can release DL SPS/UL CG configuration(s) for a first UE in a first cell/carrier/BWP and DL SPS/UL CG configuration(s) for a second UE in a second cell/carrier/BWP.

In one enhancement, a single group command, which multiplexes multiple individual commands for DL SPS/UL CG configuration(s) for one or multiple UEs, can pertain activation or release of one or multiple DL SPS configuration(s) and activation or release of one or multiple UL CG configuration(s), wherein the group command indicates for each individual command whether each individual command is for DL SPS or for UL CG and/or whether each individual command is for activation or for release.

In one embodiment for DCI/MAC-based update/modification of DL SPS/UL CG configuration(s) along with HARQ-ACK Feedback, for a DL SPS (Type-1 or Type-2, per terminology in the above discussed embodiments for DL SPS Type-1 with RRC activation/release) or UL CG configuration, a UE can receive an "updating command" or a "modification command" to dynamically or semi-dynamically update/modify some configuration parameters and continue to use the DL SPS/UL CG resources with the updated/modified parameters, wherein the UE is expected to provide HARQ-ACK feedback for a detected updating/modification DCI. In one example, an "updating command" or a "modification command" is an "updating DCI" or a "modification DCI," while in another example, "updating command" or a "modification command" is an "updating MAC command" or a "modification MAC command."

An updating/modification DCI/MAC is expected to be used mainly for minor updates to some/few configuration parameters, such as link-related parameter, e.g., MCS, beam/SRI/TCI/number of repetitions, and so on, while it is possible in principle to use the updating/modification DCI/MAC as a means to perform major updates to the DL SPS/UL CG configuration, such as time/frequency resource allocation. The benefit of such a (semi-)dynamic updating/modification DCI/MAC for DL SPS Type-1 (per terminology in the above discussed embodiments for DL SPS Type-1 with RRC activation/release) or UL CG Type-1, wherein RRC (re-)configures and also activates/deactivates the resources, is that such (minor) parameter updates can be achieved with much lower latency and much less signalling overhead (i.e., only an updating DCI along with HARQ feedback) compared to the legacy method of a complete RRC reconfiguration.

The benefit of such an updating/modification DCI/MAC for DL SPS (Type-2, per terminology in the above discussed embodiments for DL SPS Type-1 with RRC activation/release) or UL CG Type-2, wherein RRC (re-)configures some parameters but DCI indicates most of the parameters and activates/deactivates the resources, is to avoid the legacy method of a releasing/deactivation DCI (or releasing MAC command, per the embodiments for group release of DL SPS/UL CG for multiple UEs, which describes UE-group commands) along with the corresponding HARQ feedback/procedure and then another activation DCI (or activation MAC command, per the embodiments for group activation of DL SPS/UL CG for one or multiple UEs via PDSCH), and replace it with only an updating DCI along with HARQ feedback/procedure—i.e., one DCI is saved, which still has some benefit in terms of signalling overhead and latency. In addition, although updating/modification DCI/MAC is useful for both DL SPS and UL CG, an updating DCI might be more beneficial for UL CG, compared to DL SPS, since less information about traffic data and link parameters might be available to the gNB. Updating/modification DCI/MAC provides the gNB with a tool to update the DL SPS/UL CG configuration(s) with less latency and overhead, and possibly with some UE-assisted information.

In one example, an updating DCI/MAC is used to update/change the number of repetitions for a DL SPS/UL CG configuration (Type-1 or Type-2), e.g., based on link quality or reference signal measurements/reports. This is an enhancement compared to a purely semi-static RRC configuration of a number of repetitions for DL SPS/UL CG.

In one example, to update parameters for a single DL SPS/UL CG configuration (regardless of being Type-1 or Type-2 (for DL SPS, per terminology of the above discussed embodiments for DL SPS Type-1 with RRC activation/release)) of one UE, an updating DCI is transmitted to the UE, which is a UE-specific/individual DCI format including parameters to identify the updating DCI (compared to other DCIs/DCI formats) as well as parameters to indicate the updated parameters.

In one example, an updating DCI is similar to an activation DCI for a DL SPS (Type-2, per terminology of the above discussed embodiments for DL SPS Type-1 with RRC activation/release)/UL CG Type-2. In another example, an updating DCI for DL SPS/UL CG can be a DCI format 1_0, 1_1, 1_2, and so on/0_0, 0_1, 1_2, and so on, addressed to CS-RNTI, and uses default settings for some DCI fields to identify the updating DCI, such as one or more of NDI, HPN, and RV, e.g., NDI=0, HPN=all zeros, and RV=00. If a UE is configured with more than one DL SPS/UL CG configuration (Type-1 or Type-2), then the updating DCI includes an indication for which DL SPS/UL CG configuration is updated, such as an index or "state" of the DL SPS/UL CG configuration.

Such a setting is sufficient for updating a DL SPS Type-1 (per terminology of the above discussed embodiments for DL SPS Type-1 with RRC activation/release)/UL CG Type-1 configuration, since no activation/release DCI is expected for such a DL SPS/UL CG configuration, and any DCI with addressed to CS-RNTI is interpreted as an updating DCI. For updating a DL SPS Type-2 (per terminology of the above discussed embodiments for DL SPS Type-1 with RRC activation/release)/UL CG Type-2 configuration, however, a distinction is needed compared to an activation and release DCI; to achieve this, extra indication is needed, for which one or more of the following can be used: TPC command field, time domain resource allocation (TDRA) field or frequency domain resource allocation (FDRA) field, e.g., TPC=00/11, TDRA=all 1s, FDRA=all 1s.

In another example, an updating DCI is expected to have a same format for both DL SPS/UL CG Type-1 and DL SPS/UL CG Type-2, so, e.g., one or multiple of the options above for distinction between an activation DCI and an updating DCI needs to be applied for the updating DCI for both DL SPS/UL CG Type-1 and Type-2.

According to the aforementioned example, when a UE receives an updating DCI for a DL SPS/UL CG configuration, the UE needs to provide HARQ feedback to the gNB, wherein a HARQ feedback is e.g., similar to a HARQ feedback mechanism for releasing DL SPS/UL CG or for DL SPS PDSCH or for a scheduled PDSCH. In one example, a UE generates an ACK if the UE detects a DCI format (e.g., 1_0, 1_1, 1_2, etc./0_0, 0_1, 1_2, etc.) that provides a SPS PDSCH/CG PUSCH update.

In another example, if the gNB does not receive a HARQ-ACK feedback from the UE after expiry of a configured timer/time window/counter after a transmission of an updating DCI for a DL SPS/UL CG configuration, the gNB assumes that the UE did not receive the updating DCI and then decides whether or not to retransmit the updating DCI again (and in case of decision to retransmit, whether the same updating DCI or an amended/modified updating DCI).

In a further example, a HARQ feedback and/or HARQ retransmission for an updating DCI is not supported and/or can be disabled. In a related example, in case of no support for/disabling HARQ-ACK feedback for an updating DCI, the gNB can decide whether or not to retransmit the updating DCI after an initial transmission thereof (and in case of decision to retransmit, whether the same updating DCI or an amended/modified updating DCI) when the DL SPS reception and HARQ feedback/UL CG transmissions do not start after a predetermined/configured number of symbols/slots or after expiry of a configured timer or ending of a time window after a transmission of an updating DCI for a DL SPS/UL CG configuration.

Figure 11:
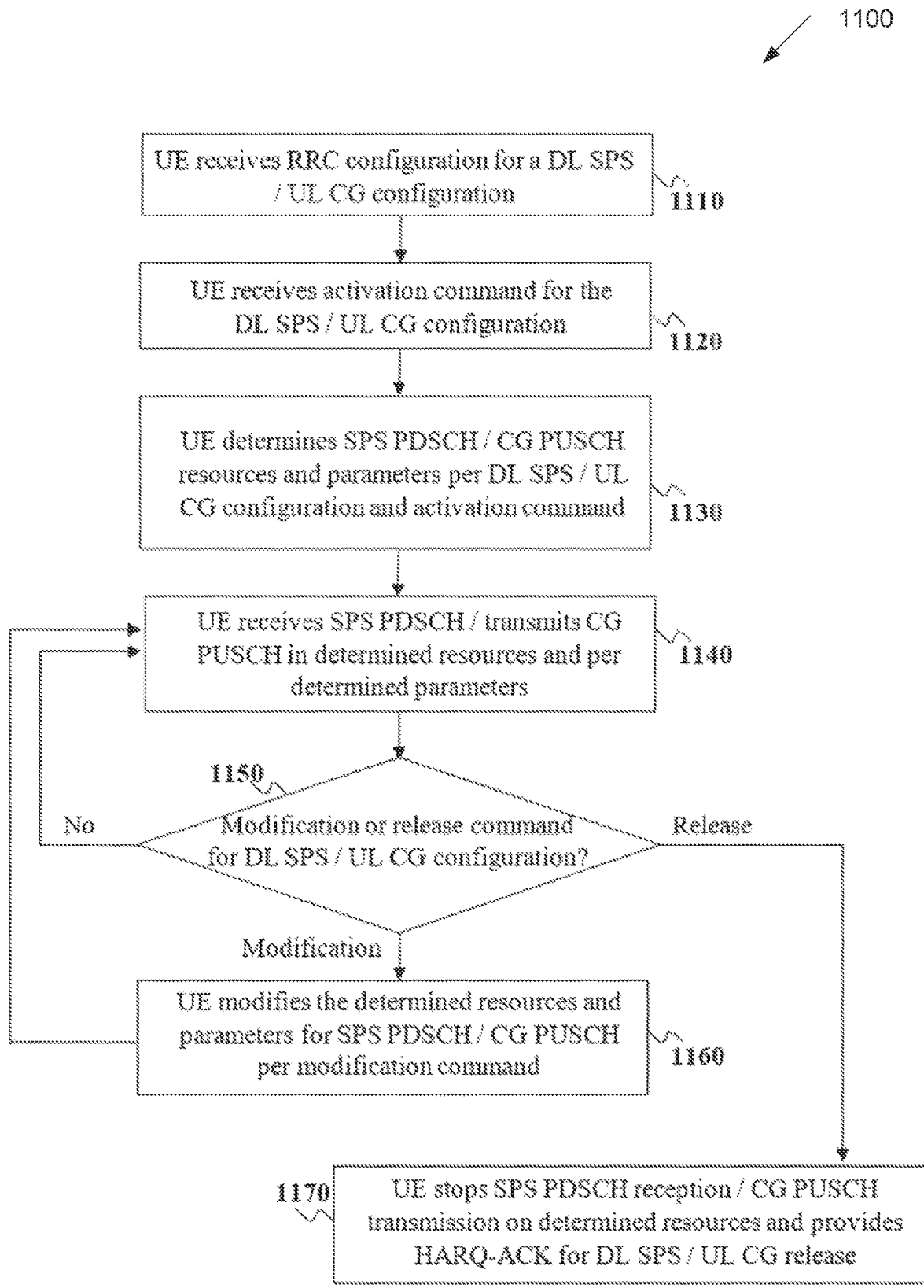
FIG. 11 illustrates a flow chart of a method for a modification command to update/modify a DL SPS/UL CG configuration according to embodiments of the present disclosure.

FIG. 11 illustrates a flow chart of a method 1100 for a modification command to update/modify a DL SPS/UL CG configuration according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

As illustrated in FIG. 11, the UE receives RRC configuration for a DL SPS/UL CG configuration at step 1110. The UE then receives activation command (via RRC, DCI, or MAC) for the DL SPS/UL CG configuration at step 1120. Next, the UE determines resources and parameters for SPS PDSCH/CG PUSCH per DL SPS/UL CG configuration and the activation command at step 1130. The UE receives SPS PDSCH or transmits CG PUSCH in the determined resources and per determined parameters at step 1140. The UE monitors for modification or release command for the DL SPS/UL CG configuration at step 1150. If the UE has not received any modification or release command for DL SPS/UL CG configuration, the UE continues to receive SPS PDSCH or transmit CG PUSCH in the determined resources and per determined parameters as in step 1140. If the UE has received a modification command for the DL SPS/UL CG configuration, the UE modifies the determined resources and parameters for SPS PDSCH reception/CG PUSCH transmission per the modification command at step 1160, and continues to receive SPS PDSCH or transmit CG PUSCH in the (newly) determined resources and per (newly) determined parameters as in step 1140. But, if the UE has received a release command for the DL SPS/UL CG configuration, the UE stops SPS PDSCH reception/CG PUSCH transmission on determined resources and provides HARQ-ACK for DL SPS/UL CG release.

In one example, to update parameters for multiple DL SPS/UL CG configurations (regardless of being Type-1 or Type-2 (for DL SPS, per terminology of the above discussed embodiments for DL SPS Type-1 with RRC activation/release)) corresponding to one or multiple UEs, an updating/modification MAC/MAC-CE command is transmitted to the UE, wherein the which multiplexes multiple updating commands, one updating command for each DL SPS/UL CG configuration. In one example, an updating MAC command intended for a single UE is carried by a unicast PDSCH, which is scheduled by a UE-specific/individual DCI format. In another example, an updating MAC command intended for multiple UEs is carried by a multicast/groupcast/broadcast PDSCH, which is scheduled by a group-common DCI format. Detailed mechanisms (e.g., scheduling, transmission, contents, HARQ procedures, and so on) corresponding to an activation MAC command for multiple DL SPS/UL CG configuration is similar to a UE-group activation command for DL SPS/UL CG, and therefore, similar methods as those in the embodiments discussed above can be used.

In one example, an updating DCI/MAC command for modification of (at least Type-1) DL SPS/UL CG configuration is not expected to be received very frequently. For example, a UE can be configured with a (prohibit) timer, which is reset once an updating DCI/MAC command for DL SPS/UL CG is received, and while the timer is running, no (further) updating DCI/MAC command(s) is/are expected/performed; such a timer can be a timer already configured/predetermined to the UE for other purposes (e.g., a timer for CG PUSCH), or a function thereof e.g., a predetermined/configured fraction of an existing timer, or the timer can be a new timer.

In another example, an updating DCI/MAC command for modification of DL SPS/UL CG configuration is expected by the UE (only) when the link quality degrades noticeably, e.g., when measurements (such as L1-/L3-reference signal received power (RSRP), reference signal received quality (RSRQ), received signal strength indicator (RSSI), signal-to-noise ratio (SNR), signal-to-interference ratio (SINR), and so on) for one or multiple configured DL RS(s) fall below a configured/predetermined threshold; otherwise, i.e., when measurements for the configured DL RS(s) are above the configured/predetermined threshold, no (further) updating DCI/MAC command(s) is/are expected/performed. Here, the configured DL RS(s) can be e.g., DL RS(s)/TCI state(s) configured/indicated for DL SPS reception/UL CG transmission, and/or DL RS(s)/TCI state(s) that are quasi-co-located (QCL) with DL RS(s)/TCI state(s)/SRI(s) configured/indicated for DL SPS reception/UL CG transmission, and/or DL RS(s) configured/indicated as pathloss estimation RS(s) for UL CG transmission, and so on.

In one embodiment for DCI/MAC-based selection of DL SPS/UL CG Type-1 configuration from multiple configurations, when a UE is configured with multiple DL SPS Type-1 (per terminology in the above discussed embodiments for DL SPS Type-1 with RRC activation/release) or UL CG Type-1 configurations, a UE can be indicated to operate with only a single DL SPS Type-1 or a single UL CG Type-1, wherein the indication can be conveyed via a DCI format in PDCCH or a MAC command in a PDSCH. In one example, a selection command can indicate operation of UE for a subset (of size>1) of DL SPS Type-1/UL CG Type-1 configurations from a set of such configurations. In another example, the UE operates a default DL SPS Type-1/UL CG Type-1 configuration before receiving a first DCI/MAC selection command, wherein the default configuration can be a DL SPS Type-1/UL CG Type-1 configuration with the lowest/highest index or with smallest/largest periodicity (in msec, or in symbols/slots w.r.t. a reference numerology, e.g., 15 kHz). In a further example, a HARQ-ACK (or HARQ-ACK/NACK) is expected from the UE after a transmission of a DCI/MAC selection command.

In an enhancement, a DL SPS Type-1/UL CG Type-1 can be configured and activated by RRC but released via a release DCI. In another enhancement, a DL SPS Type-1/UL CG Type-1 can be activated by an activation DCI but released via RRC (reconfiguration/release) message/command.

NR supports transmission and reception based on higher layer configurations, such as radio resource control (RRC) signaling, as described in NR standard specifications.

A semi-persistent scheduling (SPS) of PDSCH receptions is configured by RRC per serving cell and per BWP. Multiple assignments can be active simultaneously in the same BWP. Activation and deactivation of SPS PDSCH receptions are independent among the serving cells.

For an SPS PDSCH reception, a DL assignment is provided to a UE by a PDCCH and the UE stores or clears the DL assignment based on whether the DL assignment indicates SPS PDSCH activation or deactivation, respectively.

RRC configures the following parameters when the SPS PDSCH is configured: cs-RNTI (CS-RNTI for activation, deactivation, and retransmission); nrofHARQ-processes (the number of configured HARQ processes for SPS PDSCH); harq-ProcID-Offset (offset of HARQ process for SPS PDSCH); and periodicity (periodicity of configured downlink assignment for SPS PDSCH).

When an SPS PDSCH is released by upper layers, the UE releases all the corresponding configurations.

After a downlink assignment is configured for SPS PDSCH, the MAC entity may consider sequentially that the Nth downlink assignment occurs in the slot for which: (numberOfSlotsPerFrame×SFN+slot number in the frame) =[(numberOfSlotsPerFrame×SFNstart time+slotstart time)+ N×periodicity×numberOfSlotsPerFrame/10] modulo (1024×numberOfSlotsPerFrame), where SFNstart time and slotstart time are the SFN and slot, respectively, of the first transmission of PDSCH where the configured downlink assignment was (re-)initialized.

There are three types of a PUSCH transmission without dynamic grant: configured grant Type 1 where an uplink grant is provided by RRC, and stored as configured uplink grant; configured grant Type 2 where an uplink grant is provided by PDCCH, and stored or cleared as configured uplink grant based on L1 signalling indicating configured uplink grant activation or deactivation; and retransmissions on a stored configured uplink grant of Type 1 or Type 2 configured with cg-RetransmissionTimer.

Type 1 and Type 2 are configured by RRC per serving cell and per BWP. Multiple configurations can be active simultaneously in the same BWP. For Type 2, activation and deactivation are independent among the serving cells. For the same BWP, the MAC entity can be configured with both Type 1 and Type 2.

RRC configures the following parameters when the configured grant Type 2 is configured: cs-RNTI (CS-RNTI for activation, deactivation, and retransmission); periodicity (periodicity of the configured grant Type 2); nrofHARQ-Processes (the number of HARQ processes for configured grant); harq-ProcID-Offset (offset of HARQ process for configured grant for operation with shared spectrum channel access); and harq-ProcID-Offset2 (offset of HARQ process for configured grant).

RRC configures the following parameters when retransmissions on configured uplink grant is configured: cg-Retransmission Timer (the duration after a configured grant (re)transmission of a HARQ process when the UE may not autonomously retransmit that HARQ process).

After an uplink grant is configured for a configured grant Type 2, the MAC entity may consider sequentially that the $N^{th}$ uplink grant occurs in the symbol for which: [(SFN× numberOfSlotsPerFrame×numberOfSymbolsPerSlot)+(slot number in the frame×numberOfSymbolsPerSlot) symbol number in the slot]=[($SFN_{start\ time}$×numberOfSlotsPerFrame×numberOfSymbolsPerSlot+$slot_{start\ time}$×numberOfSymbolsPerSlot+$symbol_{start\ time}$)+N×periodicity] modulo (1024×numberOfSlotsPerFrame×numberOfSymbolsPerSlot), where $SFN_{start\ time}$, $slot_{start\ time}$, and $symbol_{start\ time}$ are the SFN, slot, and symbol, respectively, of the first transmission opportunity of PUSCH where the configured uplink grant was (re-)initialised.

When the configured uplink grant is released by upper layers, all the corresponding configurations may be released and all corresponding uplink grants may be cleared.

For a configured grant Type 2, the MAC entity may clear the configured uplink grant(s) immediately after first transmission of configured grant confirmation MAC CE or multiple entry configured grant confirmation MAC CE which confirms the configured uplink grant deactivation.

Retransmissions are done by: repetition of configured uplink grants; receiving uplink grants addressed to CS-RNTI; or retransmission on configured uplink grants.

A PDCCH blocking can be a limiting factor for scheduling at a given time a large number of UEs, such as wearables, that typically require reduced cost and consequently have reduced capabilities (RedCap UEs). One reduced capability is a maximum reception BW that results to a corresponding reduction in available PDCCH resources because a maximum CORESET BW or a number of CORESETs that can be supported is reduced.

Another reduced UE capability can be a maximum number of PDCCH candidates that a RedCap UE can monitor per slot and that also leads to an increase in PDCCH blocking. Therefore, there is a need to reduce PDCCH blocking for RedCap UEs having reduced maximum reception BW or having reduced maximum number of PDCCH candidates that a RedCap UE can monitor per slot.

In addition to a PDCCH blocking, a PDCCH overhead is another limiting factor for deployments of RedCap UEs because corresponding services typically require small transport blocks and a ratio of a number of resources required for control signaling over a number of resources required for data signaling becomes large particularly considering that, for a same number of information bits, control signaling typically requires more resources than data signaling due to a corresponding requirement for larger reception reliability. When there is a large number of RedCap UEs, such as industrial wireless sensors, control overhead can lead to a material reduction in system throughput.

Spectral efficiency is another limiting factor for deployments of RedCap UEs that typically have a reduced number of receiver antennas. To compensate for coverage loss due to reduced number of receiver antennas, a PDCCH transmission to a RedCap UE needs to be with repetition or with a larger CCE aggregation level compared to a PDCCH transmission to a non-RedCap UE that has a larger number of receiver antennas, thereby leading to a further increase in PDCCH overhead for scheduling RedCap UEs.

Therefore, there is a need to enable scheduling of multiple RedCap UEs at a given time. There is another need to reduce a PDCCH blocking probability for scheduling RedCap UEs. There is yet another need to reduce control signaling overhead for scheduling RedCap UEs.

In one embodiment, scheduling of multiple PDSCH receptions to or PUSCH transmissions from a group of UEs is provided based on a UE-group common DCI (GC-DCI) format.

A gNB can schedule a PDSCH reception to or a PUSCH transmission from a UE in a slot using either a GC-DCI format or a conventional DCI format scheduling a PDSCH reception to or a PUSCH transmission from only the UE. For example, when the gNB needs to schedule only the UE, the gNB can use the DCI format. When the gNB needs to schedule multiple UEs then, instead of the gNB transmitting multiple PDCCHs providing corresponding multiple DCI formats, the gNB can transmit only one PDCCH providing the GC-DCI. This is typically feasible for traffic types that do not have strict latency requirements, such as several traffic types for RedCap UEs, and the gNB can delay scheduling for a particular UE until there is scheduling for additional UEs so that the gNB can use the GC-DCI format, or until further delay is not possible for corresponding latency requirements and then the gNB can use the DCI format.

The GC-DCI format can include a new RNTI that can be provided by higher layers for scrambling the CRC bits of the GC-DCI format. The new RNTI is referred as group scheduling radio network temporary identifier (GS-RNTI) in this disclosure. In one example, the GS-RNTI is part of system information and is common to all UEs within a serving cell. In another example, the GS-RNTI is included in the configuration of a search space set to a UE for monitoring the GC-DCI format. In yet another example, the CG-RNTI can be provided by a separate configuration that can also include other UE-specific parameters for the contents of the CG-DCI format as the UE-specific parameters are subsequently described. In yet another example, the GC-DCI format can have a same size as a UE-specific DCI format with CRC scrambled by an RNTI such as a cell-RNTI (C-RNTI) and the UE can be configured to perform a CRC check after decoding the DCI format either using the C-RNTI or using the GC-RNTI.

A GC-RNTI can be configured separately for a GC-DCI format scheduling PDSCH reception and for a GC-DCI format scheduling PUSCH transmission so that the contents of the GC-DCI format are only for scheduling PDSCH receptions or only for scheduling PUSCH transmissions.

A UE can receive a PDCCH providing the GC-DCI format either based on a UE-specific search space (USS) or based on a common search space (CSS).

Figure 12:
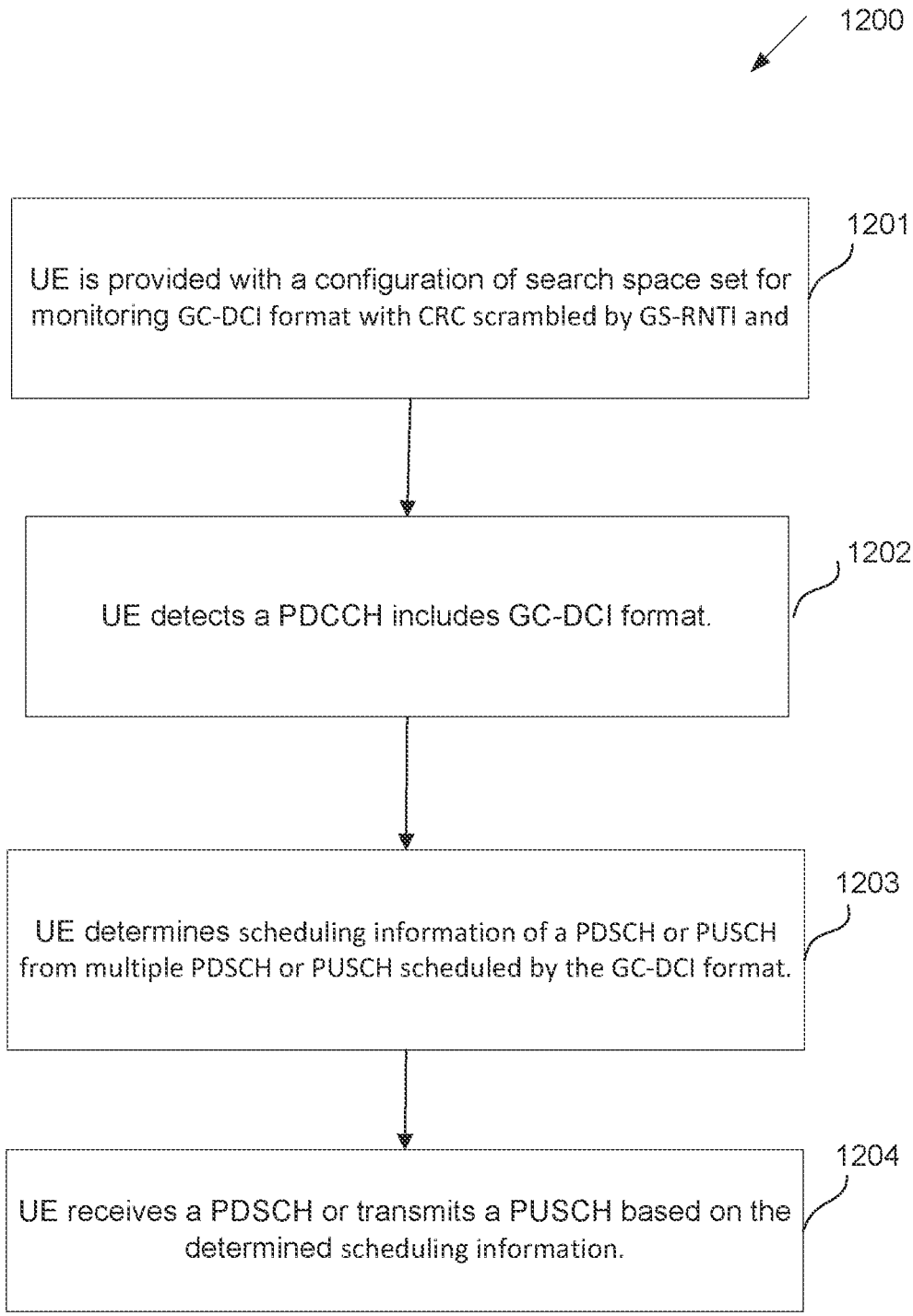
FIG. 12 illustrates a flow chart of a method for a PDSCH reception or a PUSCH transmission scheduled by a group-common DCI (GC-DCI) format according to embodiments of the present disclosure.

FIG. 12 illustrates a flow chart of a method 1200 for a PDSCH reception or a PUSCH transmission scheduled by a GC-DCI format according to embodiments of the present disclosure. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

A UE is provided a configuration for a search space set, wherein the search space set includes a GC-DCI format with CRC scrambled by a GS-RNTI at step 1201. The UE detects the GC-DCI format according to the search space set at step 1202. The UE then determines scheduling information for a PDSCH reception or a PUSCH transmission, wherein the GC-DCI format includes information for multiple PDSCH receptions to or PUSCH transmissions from multiple UEs at step 1203. The UE receives a PDSCH or transmits a PUSCH based on the determined scheduling information at step 1204.

In one example for mapping channel resources to the multiple PDSCH receptions or PUSCH transmissions scheduled by a GC-DCI format, each of the multiple PDSCH receptions or PUSCH transmissions is mapped to time and frequency domain resources independently based on corresponding scheduling information in the GC-DCI format. A payload of the GC-DCI format includes N>=1 blocks, wherein each of the N>=1 blocks provides scheduling information for a PDSCH reception or a PUSCH transmission. Each of the N>=1 blocks can include one or more of the following scheduling information fields for a PDSCH reception PUSCH transmission: identifier for DCI formats, for example when the CG-DCI format schedules either PDSCH receptions or PUSCH transmissions; bandwidth part indicator; frequency domain resource assignment (FDRA); time domain resource assignment (TDRA); modulation and coding scheme (MCS); new data indicator (NDI); redundancy version (RV); HARQ process number; TPC command for scheduled PUSCH or for PUCCH with HARQ-ACK information corresponding to a scheduled PDSCH; VRB-to-PRB mapping; downlink assignment index (DAI); PUCCH resource indicator (PRI); PDSCH-to-HARQ_feedback timing indicator; and a binary bit to indicate to a UE whether or not to transmit the associated PDSCH or to receive the PUSCH.

Some of the aforementioned fields may not be included in the CG-DCI format subject to certain scheduling restrictions. For example, if a different CG-RNTI is used for scheduling PDSCH receptions or PUSCH transmissions, the "identifier for DCI formats" field does not need to be included.

For example, if a BWP change cannot be indicated by the CG-DCI format, the "BWP indicator" field does not need to be included. For example, the FDRA or the TDRA for each UE can be provided in advance by higher layers and then a corresponding FDRA field or TDRA field does not need to be included. For example, the MCS can be provided in advance by higher layers and then the MCS field does not need to be included. For example, for small transport blocks, chase-combining can be used for retransmissions and the RV field does not need to be included.

For example, if a CG-DCI format schedules only initial receptions or transmissions of a transport block, the NDI field and the RV field do not need to be included. For example, only open-loop power control may apply for PUCCH or PUSCH transmissions and then the TPC field does not need to be included.

For example, the VRB-to-PRB mapping can be provided in advance by higher layers and then the field does not need to be included. For example, HARQ-ACK information can be for only one PDSCH reception or according to a Type-1 HARQ-ACK codebook and then the DAI field does not need to be included.

For example, a PUCCH resource can be provided in advance by higher layers and then the PRI field does not need to be included. For example, a PUCCH transmission with HARQ-ACK information in response to a PDSCH reception can be in a first slot that is after the slot of the PDSCH reception by a predetermined number of slots and includes a PUCCH resource wherein the predetermined number of slots can be specified in the system operation or be provided in advance to a UE by higher layers.

It is also possible that the GC-DCI format includes only one FDRA field and a UE determines a FDRA based on the FDRA indicated by the FDRA field and the number of other UEs for which the GC-DCI format indicates a PDSCH reception or a PUSCH transmission under the condition that all UEs have a same number of RBs for respective PDSCH receptions or PUSCH transmissions.

For example, if the bitmap in the CG-DCI format indicates PDSCH receptions for four UEs and the FDRA field indicates RBs 4 through 7, the first UE with indicated PDSCH reception receives the PDSCH in RBs 4 through 7, the second UE with indicated PDSCH reception receives the PDSCH in RBs 8 through 11, the third UE with indicated PDSCH reception receives the PDSCH in RBs 12 through 15, and fourth UE with indicated PDSCH reception receives the PDSCH in RBs 16 through 19.

It is also possible that the FDRA field indicates a total number of RBs, such as RBs 4 through 19, and each UE determines the RBs for a respective PDSCH reception as described above. A UE can be configured in advance which bit in the bitmap corresponds to the UE and can therefore determine an order (first, second, . . . ) relative to other UEs with scheduled PDSCH receptions or PUSCH transmissions. For example, a bit value of "0" can indicate no scheduling and a bit value of "1" can indicate scheduling of a PDSCH reception or of a PUSCH transmission.

It is also possible that a UE is configured by higher layers a number of combinations for values for a number of fields from the previous set of fields. For example, a first combination can include a first set of {FDRA, TDRA, MCS, HARQ process number, PRI} values, a second combination can include a second set of {FDRA, TDRA, MCS, HARQ process number, PRI} values, and so on, and then a block of M bits can indicate one of $2^M$ values.

A UE can be provided by higher layers a configuration of the GC-DCI format. The configuration includes at least one of the following: a location, such as a bit in a bitmap or a starting bit of one block from the N>=1 blocks; the UE determines the scheduling information for an associated PDSCH reception or PUSCH transmission based on the scheduling information included in the one block; a size of M bits for the one block; a payload size of the GC-DCI format; a grant index or block index, k (0, . . . , N−1), indicating a kth PDSCH reception or a kth PUSCH transmission from the N>=1 PDSCH reception or PUSCH transmissions scheduled by the kth block in a GC-DCI format; a size of the bitmap or the number of blocks, N, for scheduling the N PDSCH receptions or N PUSCH transmissions; a scheduling information included in the one block; and a size of the corresponding field to indicate the scheduling information.

If the GC-DCI format includes a bitmap and a block size of M bits is same for all UEs associated with the GC-DCI format, a UE indicated a PDSCH reception or a PUSCH transmission by an i-th bit in the bitmap can derive a location for a corresponding block of M bits providing scheduling information for the PDSCH reception of the PUSCH transmission to be the i-th block of M bits after the bitmap. The block size can also be predetermined/specified in the system operation and then it does not need to be provided as part of the higher layer configuration to a UE for the processing of the contents of the GC-DCI format.

It is also possible that the scheduling information or the size of each field in the scheduling information included in the one block is predetermined/specified in the system operation and does not need to be provided by higher layer signaling. It is also possible that the number of blocks N is derived from the payload size of the GC-DCI format and the size of the bitmap or that the payload size is derived from the number of blocks and the size of the bitmap, or that the size of the bitmap is derived from the payload size and the number of blocks.

For example, for a payload size of P bits and a bitmap size of B bits, the number of blocks is N=(P−B)/M. In general, at least one of the 4 parameters of B, M, N, P can be derived from the remaining ones.

According to the above simplifications, a UE can be provided by higher layers a configuration of the GC-DCI format as follows: a size of a GC-DCI format; and a location in a bitmap, wherein the bitmap is included in payload of the GC-DCI format, for example, the first M bits of the payload.

Based on the size of the GC-DCI format, the UE can decode the GC-DCI format. It is also possible that the size of the GC-DCI format is predetermined, for example equal to a size of a UE-specific DCI format that schedules PDSCH receptions or PUSCH transmissions only from the UE, or equal to a size of a UE-specific DCI format that a UE monitors according to a CSS such as a DCI format 0_0 or 1_0. Based on the location in the bitmap, the UE can determine a number of UEs with scheduled PDSCH receptions or PUSCH transmissions in the bit-map and can determine a block of M bits providing scheduling information to the UE.

For example, for a bitmap of B bits, if the UE determines that each of j bits prior to the bit assigned to the UE has value "1," the UE can determine that the j+1 block of M bits provides scheduling information to the UE. The size of B bits for the bitmap can be specified in the system operation, or configured by higher layers, or determined by the UE based on the size of the GC-DCI format.

For example, for a GC-DCI format size of P bits (excluding CRC bits), if a maximum number of N UEs (same as a number of blocks of M bits in the GC-DCI format) can be scheduled and the scheduling information is provided by a block of M bits, the size of the bitmap if B=P−N×M. For example, for P=30, N=4, and M=5, the size of the bitmap is B=10 bits.

Figure 13:
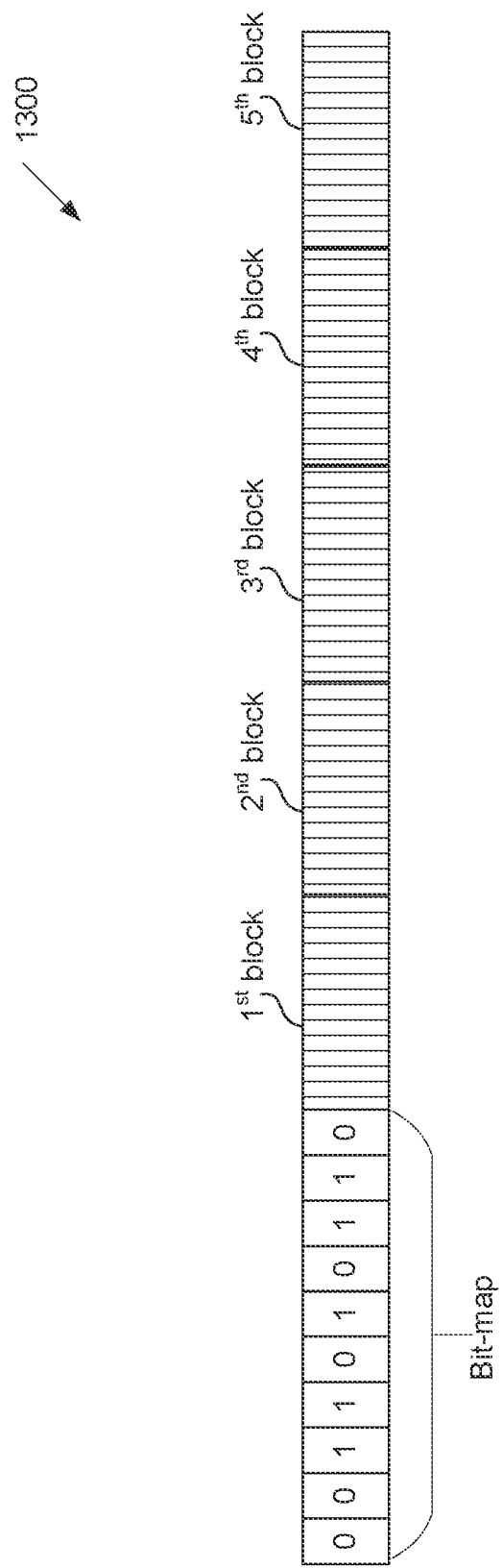
FIG. 13 illustrates an example payload of the GC-DCI format according to embodiments of the present disclosure.

FIG. 13 illustrates an example payload of the GC-DCI format 1300 according to embodiments of the present disclosure. An embodiment of the payload of the GC-DCI format 1300 shown in FIG. 13 is for illustration only.

As illustrated in FIG. 13, the GC-DCI consists of a bitmap with size B=10 and N=5 UE-specific blocks. Each bit from the bitmap is associated with a UE and indicates whether or not a PDSCH or a PUSCH associated UE is scheduled. For example, a bitmap value of "1" indicates scheduling and a bitmap value of "0" indicates no scheduling for a corresponding UE. The kth (k=1, . . . , N) block includes scheduling information for the kth scheduled PDSCH or PUSCH indicated by the bitmap.

Figure 14:
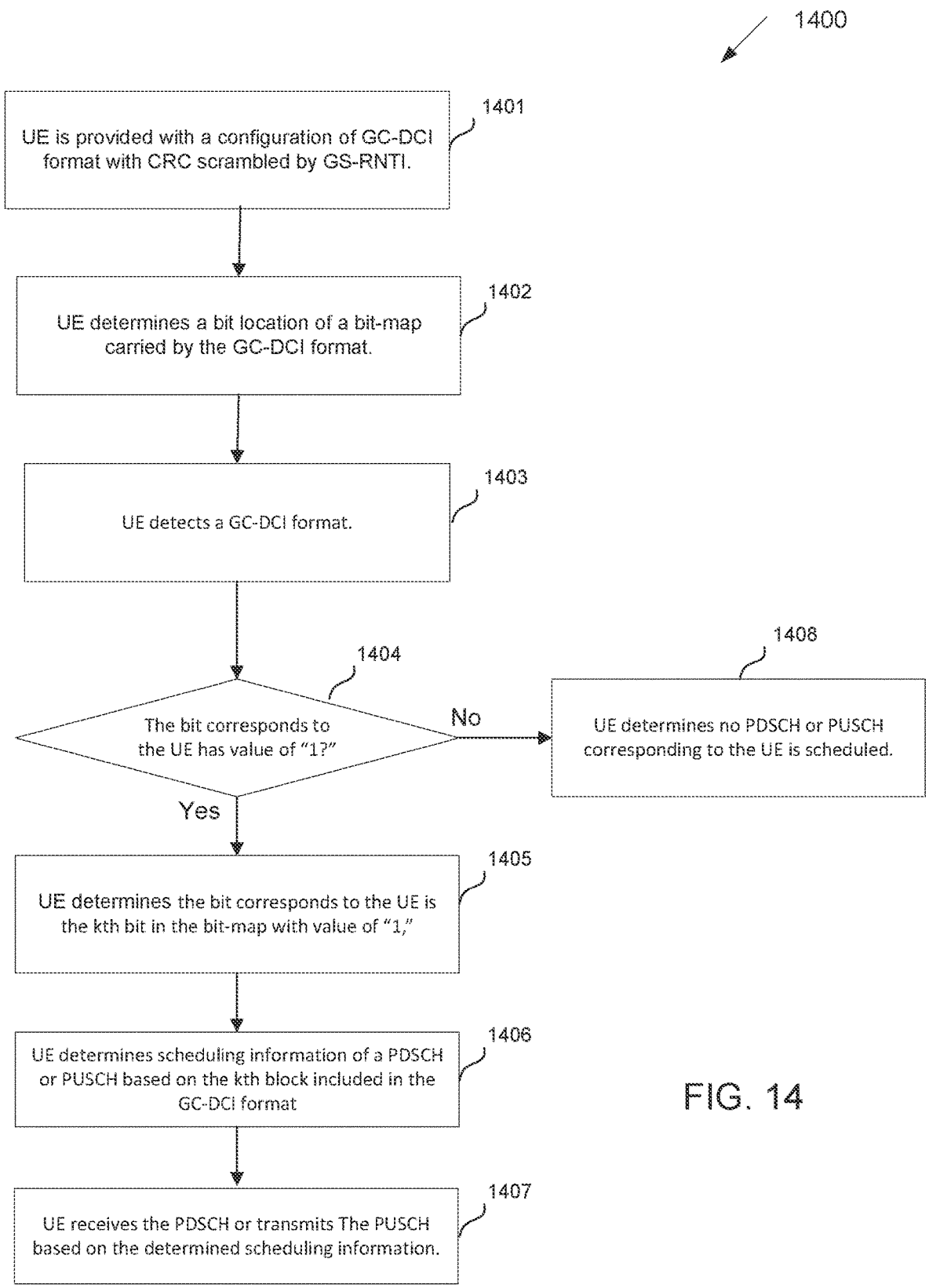
FIG. 14 illustrates a flow chart of a method for a PDSCH reception or a PUSCH transmission scheduled by a GC-DCI format according to embodiments of the present disclosure.

FIG. 14 illustrates a flow chart of a method 1400 for a PDSCH reception or a PUSCH transmission scheduled by a GC-DCI format according to embodiments of the present disclosure. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, a UE is provided a configuration of a GC-DCI format with CRC scrambled by a GS-RNTI at step 1401. The GC-DCI format includes a bitmap for indicating scheduled PDSCH receptions or PUSCH transmissions. The UE determines a bit location of the bitmap that corresponds to the UE based on the configuration at step 1402. The UE detects the GC-DCI format according to a configured search space set at step 1403. The UE determines whether or not the corresponding to the UE bit from the bitmap in the detected GC-DCI format has value of "1" at step 1404. When the bit that corresponds to the UE has value "1," the UE determines that the bit is the kth bit in the bitmap with value of "1" at step 1405. The UE then determines scheduling information for a PDSCH reception or a PUSCH transmission based on the kth block of M bits after the bitmap in the GC-DCI format at step 1405. The UE receives the PDSCH or transmits the PUSCH based on the determined scheduling from the kth block of bits at step 1407. When the bit corresponds to the UE has value of "0," the UE determines that there is no PDSCH reception or PUSCH transmission that is scheduled for the UE by the GC-DCI format at step 1408.

In one example or mapping channel resources of N>=1 PDSCH receptions or PUSCH transmissions scheduled by a GC-DCI format, the N>=1 PDSCH receptions or PUSCH transmissions can be multiplexed in time domain, using same frequency domain resources and orthogonal time domain resources.

Figure 15:
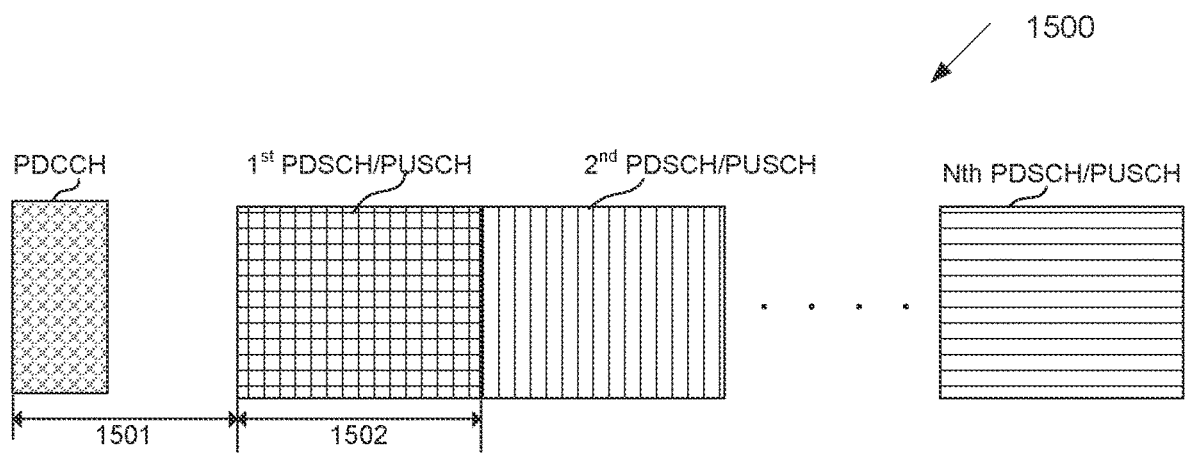
FIG. 15 illustrates an example mapping channel resources of N>=1 PDSCH/PUSCH scheduled by a GC-DCI format according to embodiments of the present disclosure.

FIG. 15 illustrates an example mapping channel resources 1500 for N>=1 PDSCH/PUSCH scheduled by a GC-DCI format according to embodiments of the present disclosure. An embodiment of the mapping channel resources 1500 shown in FIG. 15 is for illustration only.

For determining a frequency domain resource assignment (FDRA) based on the aforementioned example for mapping channel resources, the FDRA in terms of a set of contiguously allocated non-interleaved or interleaved virtual resource blocks (RBs) is same for the N>=1 PDSCH receptions or PUSCH transmissions scheduled by the GC-DCI format. In one example, a downlink/uplink resource allocation type 1 can be used. In this case, one FDRA field indicates to a group of scheduled UEs a set of contiguously allocated non-interleaved or interleaved virtual resource blocks (RBs) that are subsequently mapped to physical RBs. In one example, the virtual RBs are within a CORESET BW of size $N_{CORESET}^{size}$ PRBs, wherein the UE receives a PDCCH providing the GC-DCI format based on a search space set associated with the CORESET. In another example, the GC-DCI format can include one FDRA field that is applicable and common to each PDSCH reception or PUSCH transmission and indicates a corresponding set of virtual RBs.

For determining a time domain resources assignment (TDRA) based on the aforementioned example for mapping channel resources of N>=1 PDSCH receptions or PUSCH transmissions scheduled by a GC-DCI format, the first slot of the kth (k=1, N) PDSCH receptions or PUSCH transmissions, $n_k^{start\_slot}$, is $n_k^{start\_slot}=n_1^{start\_slot}+(k+1)N_{slots}$, where $N_{slots}$ is a number of consecutive slots for a PDSCH reception or a PUSCH transmission, and $n_1^{start\_slot}=O_{slot}$, where $O_{slot}$ is a slot offset after a slot of a PDCCH reception that provides the GC-DCI format. $O_{slot}$ can be indicated by the GC-DCI format, or provided by higher layers for example together with the configuration of GC-DCI format fields or can be predetermined in the system operation. 1501 and 1502 illustrates $O_{slot}$ and $N_{slots}$, respectively in FIG. 15.

For the GC-DCI format scheduling N>=1 PDSCH receptions or PUSCH transmission based on the aforementioned example for mapping of channel resources mapping, the GC-DCI format can include one or more common fields and N>=1 sets of UE-specific fields, wherein the one or more common fields indicate scheduling information common to the N>=1 PDSCH receptions or PUSCH transmissions, and a set from the N>=1 sets of UE-specific fields indicates scheduling information only for a corresponding PDSCH reception or PUSCH transmission.

A UE can be provided by higher layers a configuration for the GC-DCI format, wherein the configuration includes at least one of the following: a payload size of the GC-DCI format; a grant index, k (0, . . . , N−1) indicating a kth PDSCH reception or a kth PUSCH transmission with scheduling information included in kth set of UE-specific fields; a number of sets of UE-specific fields, N; scheduling information included in a UE-specific field; scheduling information included in a common field; a size of corresponding fields providing scheduling information for the kth PDSCH reception or PUSCH transmission; a starting location/bit of a set of UE-specific fields; and a size of corresponding common fields providing scheduling information common to N>=1 PDSCH reception or PUSCH transmissions.

For determining common fields of the GC-DCI format for scheduling N>=1 PDSCH receptions or PUSCH transmissions based on the aforementioned example for mapping of channel resources, the configuration of the common fields, such as the information provided by the common fields, corresponding size of each common field, and an arrangement of the common fields in the GC-DCI format, can be predefined in the specification of the system operation.

For example, the one or more common fields are located at the beginning of payload of the GC-DCI format. The one or more common fields can provide any of the following scheduling information where a field of the common fields is not be included when a corresponding functionality is predetermined or can be determined by other means as it was described for the aforementioned example: identifier for DCI formats; bandwidth part indicator field; frequency domain resource assignment field, when a frequency domain resource allocation (FDRA) table is used, the FDRA table can either be defined in the specification of system operation or provided to a UE by higher layers, for example, as part of system information or as part of the configuration of the GC-DCI format; a slot offset, $O_{slots}$, between a first slot of a first PDSCH reception or PUSCH transmission and a last slot of a PDCCH reception that provides the GC-DCI format; ad a transmission duration such as a number of consecutive slots N slots for each PDSCH reception or PUSCH transmission.

For determining UE-specific fields of the GC-DCI format for scheduling N>=1 PDSCH receptions or PUSCH transmissions based on the aforementioned example for mapping channel resources, a set of UE-specific fields in the GC-DCI format can include any of the following fields where a field of the UE-specific fields is not be included when a corresponding functionality is predetermined or can be determined by other means as it was described for the aforementioned example: a bit indicating whether or not a corresponding PDSCH reception or PUSCH transmission is scheduled; a modulation and coding scheme; a new data indicator; a redundancy version; a HARQ process number; a downlink assignment index; a TPC command for a scheduled PUSCH transmission or for PUCCH transmission in response to a scheduled PDSCH reception; a PUCCH resource indicator; and a PDSCH-to-HARQ_feedback timing indicator.

In one example, it is also possible that the configuration of a set of UE-specific fields is same for all UEs that monitor PDCCH for detection of the GC-DCI format and then a location for the set of UE-specific fields can be a serial index for the N>=1 sets of UE-specific fields instead of a starting bit of the set of UE-specific fields in the payload size of the GC-DCI format.

In one example, a bitmap to indicate UEs with PDSCH receptions or PUSCH transmissions can also apply for a UE to determine a corresponding block of bits that provides UE-specific fields. The size of a set of UE-specific fields be predetermined/specified in the system operation and then it does not need to be provided as part of the higher layer configuration to a UE for the processing of the contents of the GC-DCI format. It is also possible that the scheduling information or the size of UE-specific field is predetermined/specified in the system operation and does not need to be provided by higher layer signaling. A UE decodes a set of UE-specific fields with an index k (k=0, . . . , N−1), for scheduling information of an associated PDSCH to receive or an associated PUSCH to transmit, wherein the set index, k, can be provided to the UE by higher layers.

In one example for mapping of channel resources for N>=1 PDSCH receptions or PUSCH transmissions scheduled by a GC-DCI format, the N>=1 PDSCH receptions or PUSCH transmissions can be multiplexed in frequency domain, using same time domain resources and orthogonal frequency domain resources.

Figure 16:
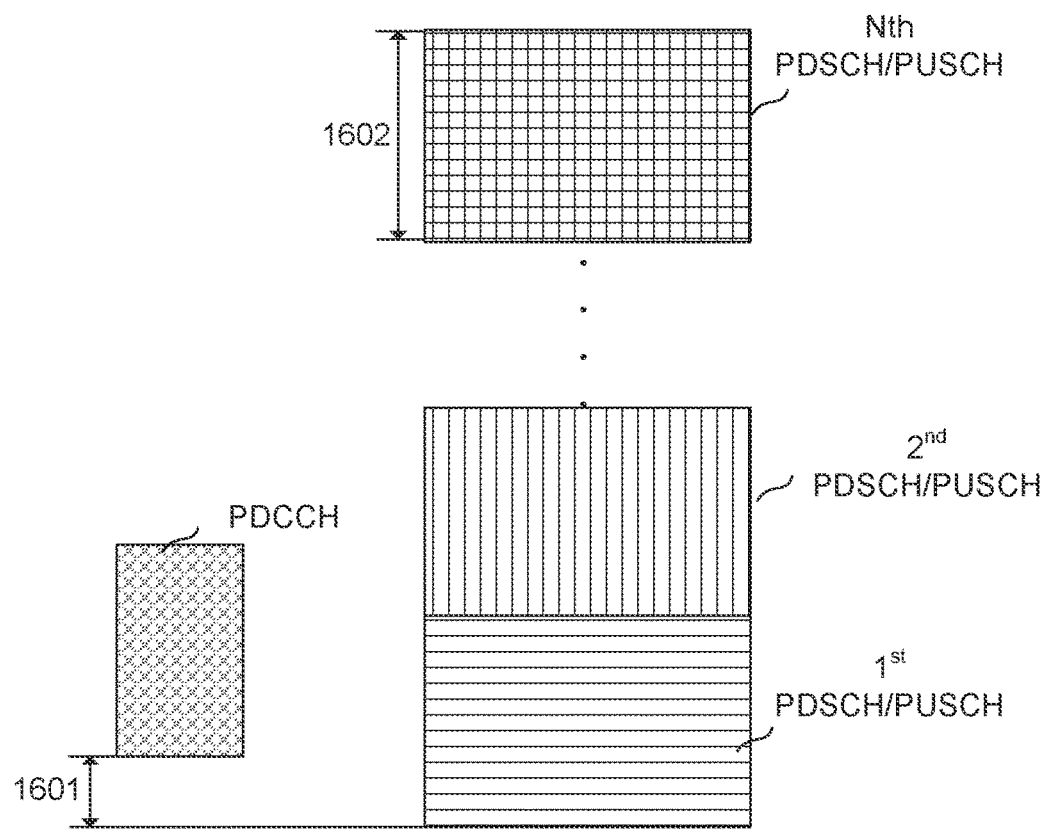
FIG. 16 illustrates an example mapping of channel resources for N>=1 PDSCH receptions or PUSCH transmissions scheduled by a GC-DCI format according to embodiments of the present disclosure.

FIG. 16 illustrates an example mapping 1600 of channel resources for N>=1 PDSCH receptions or PUSCH transmissions scheduled by a GC-DCI format according to embodiments of the present disclosure. An embodiment of the mapping 1600 of channel resources shown in FIG. 16 is for illustration only.

For determining a TDRA based on the aforementioned example for mapping channel resources of N>=1 PDSCH receptions or PUSCH transmissions scheduled by a GC-DCI format, the TDRA, including any of time gap between a last slot of a PDCCH reception that provides the GC-DCI format and a first slot of a corresponding PDSCH reception or PUSCH transmission, mapping type, and start symbol and length, are same for the N>=1 PDSCH receptions or PUSCH transmissions.

For determining the FDRA based on the aforementioned example for mapping of channel resources for N>=1 PDSCH receptions or PUSCH transmissions scheduled by a GC-DCI format, the start of the kth (k=1, ..., N) PDSCH reception or PUSCH transmission in the frequency domain with lowest RB index, $n_k^{first\_RB}$, can be determined based on the first RB $n_1^{first\_RB}$ of the first PDSCH reception or PUSCH transmission, such that $n_k^{first\_RB} = n_1^{first\_RB} + (k-1) N_{RBs}$, where $N_{RBs}$ is a number of continuous RBs per PDSCH reception or PUSCH transmission. Also, $n_1^{first\_RB}$ can be determined based on a RB offset, $O_{RBs}$, between the first RB of the first PDSCH reception or PUSCH transmission and a first RB or a last RB of a PDCCH reception that provides the GC-DCI format, or of a first RB of a DL BWP or of an UL BWP of the first PDSCH reception or PUSCH transmission, respectively. $O_{RBS}$ and $N_{RBS}$ are illustrated as 1601, and 1602, respectively in FIG. 16. Both interleaving and non-interleaving mapping can be considered for the assigned $N_{RBS}$ RBs for each PDSCH reception or PUSCH transmission.

For a GC-DCI format for scheduling N>=1 PDSCH receptions or PUSCH transmissions based on the aforementioned example for mapping of channel resources, the GC-DCI format can include one or more common fields and N>=1 sets of UE-specific fields, as described for the aforementioned example.

For determining common fields of the GC-DCI format for scheduling N>=1 PDSCH receptions or PUSCH transmissions based on the aforementioned example for mapping of channel resources, the configuration of the common fields, such as the information provided by the common fields and an arrangement of the common fields in the GC-DCI format, can be predefined in the specification of the system operation. For example, the one or more common fields are located at the beginning of payload of the GC-DCI format.

The one or more common fields can provide any of the following scheduling information where a field of the common fields is not be included when a corresponding functionality is predetermined or can be determined by other means as it was described for the aforementioned example: identifier for DCI formats; bandwidth part indicator field; TDRA field to indicate a row index in a TDRA table, the TDRA table can either be defined in the specification of the system operation or provided to a UE by higher layers, for example, as part of system information or as part of the configuration of the GC-DCI format; an RB offset, $O_{RBS}$, between a first RB of a first PDSCH reception or PUSCH transmission and a first or last RB of a CORESET where the UE receives the PDCCH that provides the GC-DCI format, or of first RB of a DL BWP or of an UL BWP for the PDSCH reception or for the PUSCH transmission, respectively; and a set of contiguously allocated resource blocks, $N_{RBS}$.

For determining UE-specific fields of the GC-DCI format for scheduling N>=1 PDSCH receptions or PUSCH transmissions based on the aforementioned example for mapping channel resources, a set of UE-specific fields in the GC-DCI format can include any of the following fields where a field of the UE-specific fields is not be included when a corresponding functionality is predetermined or can be determined by other means as it was described for the aforementioned example: a binary bit to indicate whether or not the associated PDSCH reception or PUSCH transmission is scheduled; a modulation and coding scheme; a new data indicator; a redundancy version; a HARQ process number; a downlink assignment index; a TPC command for scheduled PUSCH transmission or for a PUCCH transmission corresponding to a scheduled PDSCH reception; a PUCCH resource indicator; and a PDSCH-to-HARQ_feedback timing indicator.

In one example, it is also possible that the configuration of a set of UE-specific fields is same for UEs that monitor PDCCH for detection of the GC-DCI format and then a location for the set of UE-specific fields can be a serial index for the N>=1 sets of UE-specific fields instead of a starting bit of the set of UE-specific fields in the payload size of the GC-DCI format.

In one example, a bitmap to indicate UEs with PDSCH receptions or PUSCH transmissions can also apply for a UE to determine a corresponding block of bits that provides UE-specific fields. The size of a set of UE-specific fields be predetermined/specified in the system operation and then it does not need to be provided as part of the higher layer configuration to a UE for the processing of the contents of the GC-DCI format.

It is also possible that the scheduling information or the size of UE-specific field is predetermined/specified in the system operation and does not need to be provided by higher layer signaling. A UE decodes a set of UE-specific fields with index k (k=0, ..., N-1), for scheduling information of an associated PDSCH to receive or an associated PUSCH to transmit, wherein the set index, k, can be provided to the UE by higher layers.

For any of the aforementioned examples, some UE-specific fields can also be UE-common fields. For example, a PDSCH-to-HARQ_feedback timing indicator or a modulation and coding scheme can be UE-common fields. Also, the GC-DCI format can be limited for scheduling initial transmission of a transport block (retransmissions can be scheduled by a UE-specific DCI format) and then a new data indicator field or a redundancy version field may not be included.

For any of the aforementioned examples, with the exception of the binary bit, the remaining fields can exist only for a sub-set of UEs. For example, a number of UEs that can be scheduled by a GC-DCI format can be limited to a number that is predetermined in the system operation or is configured by higher layers together with the configuration of the GC-DCI format.

For example, the GC-DCI format can include a bitmap of 10 bits corresponding to 10 UEs and the GC-DCI format can schedule only up to 4 UEs that are indicated by the bitmap, where for example a bitmap value of "1" indicates scheduling and a bitmap value of "0" indicates no scheduling for a corresponding UE. Then, the GC-DCI format includes 4 sets of UE-specific fields. This allows the UEs scheduled by the GC-DCI format to be dynamically selected based on the bitmap while avoiding a large size for the GC-DCI format by having a limit on the number of UEs that can be scheduled and having a corresponding limit to the number of sets of UE-specific fields.

In one embodiment, group scheduling for semi-persistently scheduled (SPS) PDSCH receptions is provided, wherein a UE monitors PDCCH for detection of a CGS-DCI format that indicates activation, deactivation, or retransmission of SPS PDSCH for a group of UEs.

A new RNTI can be provided by higher layers to a UE for scrambling the CRC bits of the CGS-DCI format. The new RNTI is referred as configured group scheduling radio network temporary identifier (CGS-RNTI) in this disclosure. In one example, CGS-RNTI is part of system information and is common to all UEs within a serving cell. In another example, CGS-RNTI is included in the configuration of a search space set for monitoring the CGS-DCI format. In yet another example, CGS-RNTI is separately provided by higher layers to a UE.

A UE can receive PDCCH with the CGS-DCI format either according to a UE-specific search space (USS) or according to a common search space (CSS).

A GSC-DCI format with CRC scrambled by CGS-RNTI can have a same size as a GC-DCI format with CRC scrambled by GS-RNTI as described in the aforementioned embodiment, or a same size as a DCI format with CRC scrambled by a C-RNTI scheduling PDSCH receptions to a UE, and the two DCI formats can be differentiated based on the RNTI. The CGS-DCI format includes N>=1 DL assignments, or scheduling information blocks, for PDSCH receptions. A UE determines activation, deactivation, or retransmission of SPS PDSCH reception based on scheduling information blocks associated with the UE.

Figure 17:
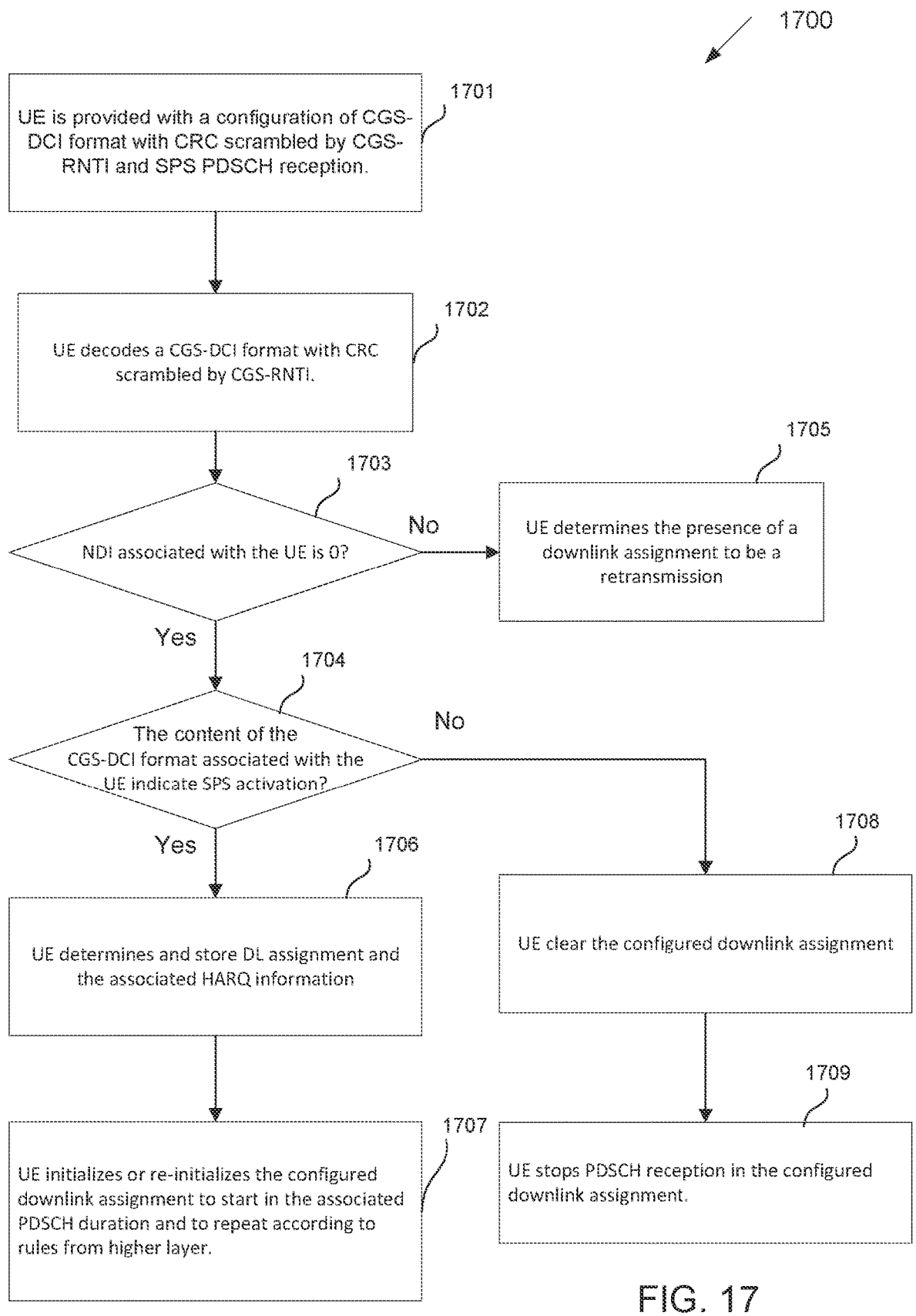
FIG. 17 illustrates a flow chart of a method for activation, deactivation, retransmission of SPS based on a CGS-DCI format according to embodiments of the present disclosure.

FIG. 17 illustrates a flow chart of a method 1700 for activation, deactivation, retransmission of SPS based on a CGS-DCI format according to embodiments of the present disclosure. An embodiment of the method 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

A UE is provided by higher layers a configuration for a CGS-DCI format with CRC scrambled by a CGS-RNTI, and a configuration for SPS PDSCH receptions at step 1701. The UE is configured one or more search space sets to monitor PDCCH for detection of the CGS-DCI format with CRC scrambled by the CGS-RNTI. The UE successfully decodes the CGS-DCI format with CRC scrambled by CGS-RNTI at step 1702. The UE determines whether or not the new data indicator (NDI) associated with the UE is zero at step 1703. When the NDI is 0, the UE then determines whether or not the content of the CGS-DCI format associated with the UE indicates activation of SPS PDSCH receptions at step 1704. If the content of CGS-DCI format associated with the UE indicates activation of SPS PDSCH receptions, the UE determines and stores the corresponding DL assignment and the associated HARQ information at step 1706. The UE initializes the configured assignment to start in the associated PDSCH duration and to repeat with a periodicity provided by the configuration by higher layers for the SPS PDSCH receptions at step 1707. If the content of CGS-DCI associated with the UE indicates deactivation of the SPS PDSCH reception, the UE clears the configured downlink assignment at step 1708 and stops PDSCH reception at step 1709.

For determining payload/content of the CGS-DCI format, the payload can be same as the GC-DCI format based on the aforementioned examples. Same as GC-DCI format with CRC scrambled by GS-RNTI, the CGS-DCI format carries scheduling information for N>=1 PDSCH scheduled to a group of UEs. A UE determines a PDSCH scheduled to the UE from the N>=1 PDSCH. The UE then determines activation, deactivation, or retransmission indication based on the scheduling information of the scheduled PDSCH associated to the UE.

A UE validates, for scheduling activation or scheduling release, a DL SPS assignment PDCCH if: the CRC of a corresponding CGS-DCI format is scrambled with a CGS-RNTI, and the new data indicator field in the CGS-DCI format associated with a PDSCH scheduled to the UE is set to "0," and the DFI flag field, if present, in the DCI format is set to "0."

If a UE is provided a single configuration for SPS PDSCH, DL SPS PDSCH scheduling activation PDCCH validation is achieved if HARQ process number field associated with a PDSCH scheduled to the UE is set to all "0"s, and RV for the CGS-DCI format is set to all "0"s.

If a UE is provided a single configuration for SPS PDSCH, DL SPS PDSCH scheduling release PDCCH validation is achieved if all fields for the CGS-DCI format are set according to following examples.

In one example, a HARQ process number field associated with a PDSCH scheduled to the UE is set to all "0"s, RV is set to all "0"s, MCS associated with a PDSCH scheduled to the UE is set to all "1"s, FDRA associated with a PDSCH scheduled to the UE is set to all "0"s for FDRA Type 0 or for FDRA Type 2 with $\mu=1$, FDRA associated with a PDSCH scheduled to the UE is set to all "1"s for FDRA Type1 or FDRA Type 2 with $\mu=1$.

In another example, a HARQ process number associated with a PDSCH scheduled to the UE is set to all "0"s, RV is set to all "0"s, MCS associated with a PDSCH scheduled to the UE is set to all "1"s, FDRA associated with a PDSCH scheduled to the UE is set to all "0"s for FDRA Type 0, FDRA associated with a PDSCH scheduled to the UE is set to all "1"s for FDRA Type1.

If a UE is provided more than one configurations for SPS PDSCH, a value of the HARQ process number field associated with a PDSCH scheduled to the UE in a CGS-DCI format indicates an activation for a SPS PDSCH configuration with a same value as provided by higher layers, for example by SPSconfig-index. Validation of the CGS-DCI format is achieved if the RV field for the CGS-DCI format is set to all "0"s.

If a UE is provided more than one configurations for SPS PDSCH: if the UE is provided SPS-ReleaseStateList, a value of the HARQ process number field associated with a PDSCH scheduled to the UE in a CGS-DCI format indicates a corresponding entry for scheduling release of one or more SPS PDSCH configurations; and if the UE is not provided SPS-ReleaseStateList, a value of the HARQ process number field associated with a PDSCH scheduled to the UE in a CGS-DCI format indicates a release for a SPS PDSCH configuration with a same value as provided by SPSconfig-index.

Validation of the CGS-DCI format for multiple DL SPS scheduling release is achieved if all fields for the CSG-DCI format are set according to following examples.

In one example, RV is set to all "0"s, MCS associated with a PDSCH scheduled to the UE is set to all "1"s, FDRA associated with a PDSCH scheduled to the UE is set to all "0"s for FDRA Type 0 or for FDRA Type 2 with $\mu=1$, FDRA associated with a PDSCH scheduled to the UE is set to all "1"s for FDRA Type1 or FDRA Type 2 with $\mu=1$.

In another example, RV is set to all "0"s, MCS associated with a PDSCH scheduled to the UE is set to all "1"s, FDRA associated with a PDSCH scheduled to the UE is set to all "0"s for FDRA Type 0, FDRA associated with a PDSCH scheduled to the UE is set to all "1"s for FDRA Type 1.

In one embodiment, group scheduling based configured grant (CG) Type 2 PUSCH is provided, wherein a UE monitors PDCCH for detection of a group-common configured grant scheduling DCI format (CGS-DCI format) that can indicate activation, deactivation, or retransmission of CG-PUSCH transmissions for a group of UEs.

A new RNTI can be provided to a UE by higher layers for scrambling the CRC bits of the CGS-DCI format. The new RNTI is referred as configured group scheduling radio network temporary identifier (CGS-RNTI) in this disclosure. In one example, CGS-RNTI is part of system information and is common to all UEs within a serving cell. In another example, CGS-RNTI is included in the configuration of a search space set for monitoring PDCCH for detection of the GC-DCI format. In yet another example, CGS-RNTI is separately provided by higher layers to a UE.

The CGS-DCI format can be received by a UE either according to a UE-specific search space (USS) or according to a common search space (CSS).

For group scheduling based CG-PUSCH Type 2, an UL grant is provided by a PDCCH that provides a CGS-DCI format with CRC scrambled by CGS-RNTI, and stored or cleared based on L1 signaling indicating activation or deactivation of a CG-PUSCH transmission.

A CGS-DCI format with CRC scrambled by CGS-RNTI can have a same size as the CGS-DCI format with CRC scrambled by GS-RNTI for group dynamic scheduling of PDSCH as described in the aforementioned embodiment, or a same size as a DCI format with CRC scrambled by a C-RNTI scheduling PDSCH receptions to a UE. The CGS-DCI format includes N>=1 UL grants or scheduling information for CG-PUSCH transmissions. A UE determines activation, deactivation, or retransmission based on scheduling information associated with the UE.

Figure 18:
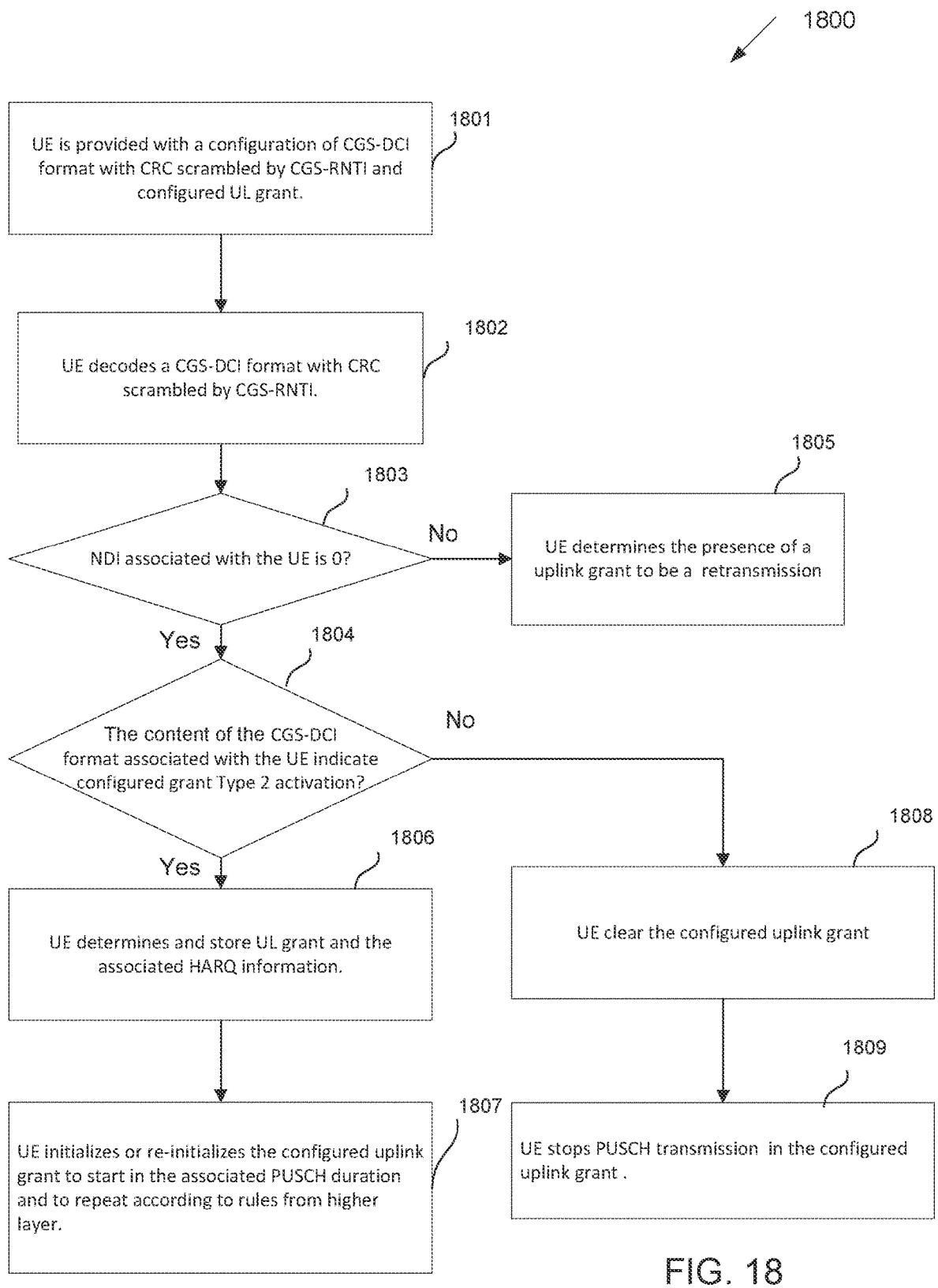
FIG. 18 illustrates a flow chart of a method for activation, deactivation, retransmission of CG-PUSCH Type 2 based on a CGS-DCI format according to embodiments of the present disclosure.

FIG. 18 illustrates a flow chart of a method 1800 for activation, deactivation, retransmission of CG-PUSCH Type 2 based on a CGS-DCI format according to embodiments of the present disclosure. An embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

A UE is provided by higher layers a configuration for a CGS-DCI format with CRC scrambled by a CGS-RNTI, and a configuration for a CG-PUSCH Type-2 transmission at step 1801. The UE is configured to monitor PDCCH for detection of a CGS-DCI format with CRC scrambled by the CGS-RNTI. The UE successfully decodes the CGS-DCI format with CRC scrambled by the CGS-RNTI at step 1802. The UE determines whether or not the NDI field in the CGS-DCI format that is associated with the UE has zero value at step 1803. When the NDI has zero value, the UE determines whether or not the content of the CGS-DCI format associated with the UE indicates activation of a CG-PUSCH transmission at step 1804. If the content of GC-DCI associated with the UE indicates activation of a CG-PUSCH transmission, the UE determines and stores the UL grant and the associated HARQ information based on the associated content of the CGS-DCI format at step 1806. The UE initializes the configured UL grant to start CG-PUSCH transmissions with a duration and periodicity as configured by higher layers at step 1807. If the content of CGS-DCI format associated with the UE indicates deactivation of a CG-PUSCH Type 2 transmission, the UE clears the configured UL grant at step 1808 and stops the CG-PUSCH Type 2 transmissions at step 1809.

For determining payload/content of the CGS-DCI format, the payload can be same as the GC-DCI format based on aforementioned examples. Same as GC-DCI format with CRC scrambled by GS-RNTI, the CGS-DCI format carries scheduling information for N>=1 PUSCH scheduled to a group of UEs. A UE determines a PUSCH scheduled to the UE from the N>=1 PUSCH. The UE then determines activation, deactivation, or retransmission indication based on the scheduling information of the scheduled PUSCH associated to the UE.

A UE validates, for scheduling activation or scheduling release, a configured UL grant Type 2 PDCCH if: the CRC of a corresponding CGS-DCI format is scrambled with a CGS-RNTI; the new data indicator field in the CGS-DCI format associated with a PUSCH scheduled to the UE is set to "0"; and the DFI flag field, if present, in the DCI format is set to "0."

If a UE is provided a single configuration for UL grant Type 2 PUSCH, UL grant Type 2 PUSCH scheduling activation PDCCH validation is achieved if HARQ process number field associated with a PUSCH scheduled to the UE is set to all "0"s, and RV for the CGS-DCI format is set to all "0"s.

If a UE is provided a single configuration for UL grant Type 2 PUSCH, UL grant Type 2 PUSCH scheduling release PDCCH validation is achieved if all fields for the CGS-DCI format are set according to following examples.

In one example, a HARQ process number field associated with a PUSCH scheduled to the UE is set to all "0"s, RV is set to all "0"s, MCS associated with a PUSCH scheduled to the UE is set to all "1"s, FDRA associated with a PUSCH scheduled to the UE is set to all "0"s for FDRA Type 0 or for FDRA Type 2 with µ=1, FDRA associated with a PUSCH scheduled to the UE is set to all "1"s for FDRA Type1 or FDRA Type 2 with µ=1.

In another example, a HARQ process number associated with a PUSCH scheduled to the UE is set to all "0"s, RV is set to all "0"s, MCS associated with a PUSCH scheduled to the UE is set to all "1"s, FDRA associated with a PUSCH scheduled to the UE is set to all "0"s for FDRA Type 0, FDRA associated with a PUSCH scheduled to the UE is set to all "1"s for FDRA Type1.

If a UE is provided more than one configurations for UL grant Type 2 PUSCH, a value of the HARQ process number field associated with a PUSCH scheduled to the UE in a CGS-DCI format indicates an activation for a corresponding UL grant Type 2 PUSCH configuration with a same value as provided by higher layers, for example by Configuredgrant-config-index. Validation of the CGS-DCI format is achieved if the RV field for the CGS-DCI format is set to all "0"s.

If a UE is provided more than one configurations for UL grant Type 2 PUSCH: if the UE is provided Type2Configuredgrantconfig-ReleaseStateList, a value of the HARQ process number field associated with a PUSCH scheduled to the UE in a CGS-DCI format indicates a corresponding entry for scheduling release of one or more UL Type 2 PUSCH configurations; and if the UE is not provided Type2Configuredgrantconfig-ReleaseStateList, a value of the HARQ process number field associated with a PUSCH scheduled to the UE in a CGS-DCI format indicates a release for a corresponding UL Type 2 PUSCH configuration with a same value as provided by Configuredgrant-config-index.

Validation of the CGS-DCI format for multiple configured UL grant Type 2 scheduling release is achieved if all fields for the CSG-DCI format are set according to following examples.

In one example, RV is set to all "0"s, MCS associated with a PUSCH scheduled to the UE is set to all "1"s, FDRA associated with a PUSCH scheduled to the UE is set to all "0"s for FDRA Type 0 or for FDRA Type 2 with $\mu=1$, FDRA associated with a PUSCH scheduled to the UE is set to all "1"s for FDRA Type1 or FDRA Type 2 with $\mu=1$.

In another example, RV is set to all "0"s, MCS associated with a PUSCH scheduled to the UE is set to all "1"s, FDRA associated with a PUSCH scheduled to the UE is set to all "0"s for FDRA Type 0, FDRA associated with a PUSCH scheduled to the UE is set to all "1"s for FDRA Type 1.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive:
first configuration information for reception of first physical downlink control channels (PDCCHs), wherein a PDCCH from the first PDCCHs provides a first downlink control information (DCI) format that includes a first number of information bits,
second configuration information for a location of a second number of information bits in the first DCI format, the second number of information bits being smaller than the first number of information bits, and
at least one of the first PDCCHs; and
a processor operably connected to the transceiver, the processor configured to determine, from the second number of information bits, values of one or more fields associated with reception of a first physical downlink shared channel (PDSCH) or with transmission of a first physical uplink shared channel (PUSCH).

2. The UE of claim 1, wherein:
the processor is further configured to determine that the one or more fields include at least one of:
a time domain resource allocation,
a frequency domain resource allocation,
an indication whether the second number of information bits correspond to a PDSCH reception or to a PUSCH transmission,
a modulation coding scheme,
a hybrid automatic repeat request (HARQ) process number, and
a redundancy version; and
the transceiver is further configured to receive the first PDSCH or transmit the first PUSCH.

3. The UE of claim 1, wherein:
the first number of information bits include a third number of information bits,
a location for the third number of information bits is predetermined in the first DCI format, and
the processor is further configured to determine, from the third number of information bits, values of one or more fields associated with reception of the first PDSCH or with transmission of the first PUSCH.

4. The UE of claim 1, wherein:
the transceiver is further configured to receive third configuration information for a number of semi-persistently scheduled (SPS) PDSCHs or for a number of configured-grant (CG) PUSCHs;
the processor is further configured to determine, from the values of the one or more fields, activation or release for respective one or more:
SPS PDSCHs from the number of SPS PDSCHs, or
CG PUSCHs from the number of CG PUSCHs; and
the transceiver is further configured to:
receive an SPS PDSCH from the one or more SPS PDSCHs if a respective determination is for activation,
suspend reception of an SPS PDSCH from the one or more SPS PDSCHs if a respective determination is for release,
transmit a CG PUSCH from the one or more CG PUSCHs if a respective determination is for activation, and
suspend transmission of a CG PUSCH from the one or more CG PUSCHs if a respective determination is for release.

5. The UE of claim 1, wherein the transceiver is further configured to:
receive third configuration information for a number of semi-persistently scheduled (SPS) PDSCHs or for a number of configured-grant (CG) PUSCHs,
receive the first PDSCH, wherein the first PDSCH includes a field with a value indicating activation or release of at least one SPS PDSCH from the number of SPS PDSCHs or of at least one CG PUSCH from the number of CG PUSCHs,
receive the at least one SPS PDSCH if the value indicates activation,
suspend reception of the at least one SPS PDSCH if the value indicates release,
transmit the at least one CG PUSCH if the value indicates activation, and
suspend transmission of the at least one CG PUSCH if the value indicates release.

6. The UE of claim 1, wherein:
the transceiver is further configured to receive third configuration information for reception of second PDCCHs,
a PDCCH from the second PDCCHs provides a second DCI format having a third number of information bits,
the third number of information bits is equal to the first number of information bits, and
the processor is further configured to determine, from the third number of information bits, values of one or more fields for reception of a second PDSCH or for transmission of a second PUSCH.

7. The UE of claim 6, wherein the transceiver is further configured to:
receive the first PDSCH or transmit the first PUSCH, wherein the first PDSCH or the first PUSCH includes a transport block; and receive the second PDSCH or transmit the second PUSCH, wherein the second PDSCH or the second PUSCH includes the transport block.

8. A base station (BS) comprising:
a processor configured to determine a second number of information bits to indicate values of one or more fields associated with reception of a first physical downlink shared channel (PDSCH) or with transmission of a first physical uplink shared channel (PUSCH); and
a transceiver operably connected to the processor, the transceiver configured to transmit:
    first configuration information associated with reception of first physical downlink control channels (PDCCHs), wherein a PDCCH from the first PDCCHs provides a first downlink control information (DCI) format that includes a first number of information bits,
    second configuration information for a location of a second number of information bits in the first DCI format, the second number of information bits being smaller than the first number of information bits,
    at least one of the first PDCCHs.

9. The BS of claim 8, wherein:
the processor is further configured to determine the one or more fields to indicate at least one of:
    a time domain resource allocation,
    a frequency domain resource allocation,
    an indication whether the second number of information bits correspond to a PDSCH transmission or to a PUSCH reception,
    a modulation coding scheme,
    a hybrid automatic repeat request (HARQ) process number, and
    a redundancy version; and
the transceiver is further configured to transmit the first PDSCH or receive the first PUSCH.

10. The BS of claim 8, wherein:
the first number of information bits include a third number of information bits,
a location for the third number of information bits is predetermined in the first DCI format, and
the processor is further configured to determine the third number of information bits to indicate values of one or more fields associated with reception of the first PDSCH or with transmission of the first PUSCH.

11. The BS of claim 8, wherein:
the transceiver is further configured to transmit third configuration information for a number of semi-persistently scheduled (SPS) PDSCHs or for a number of configured-grant (CG) PUSCHs;
the processor is further configured to determine the values of the one or more fields to indicate activation or release for respective one or more:
    SPS PDSCHs from the number of SPS PDSCHs, or
    CG PUSCHs from the number of CG PUSCHs; and
the transceiver is further configured to:
    transmit an SPS PDSCH from the one or more SPS PDSCHs if a respective indication is for activation,
    suspend transmission of an SPS PDSCH from the one or more SPS PDSCHs if a respective indication is for release,
    receive a CG PUSCH from the one or more CG PUSCHs if a respective indication is for activation, and
    suspend reception of a CG PUSCH from the one or more CG PUSCHs if a respective indication is for release.

12. The BS of claim 8, wherein the transceiver is further configured to:
    transmit third configuration information for a number of semi-persistently scheduled (SPS) PDSCHs or for a number of configured-grant (CG) PUSCHs,
    transmit the first PDSCH, wherein the first PDSCH includes a field with a value indicating activation or release of at least one SPS PDSCH from the number of SPS PDSCHs or of at least one CG PUSCH from the number of CG PUSCHs,
    transmit the at least one SPS PDSCH if the value indicates activation,
    suspend transmission of the at least one SPS PDSCH if the value indicates release,
    receive the at least one CG PUSCH if the value indicates activation, and
    suspend reception of the at least one CG PUSCH if the value indicates release.

13. The BS of claim 8, wherein:
the transceiver is further configured to transmit third configuration information for transmission of second PDCCHs,
a PDCCH from the second PDCCHs provides a second DCI format having a third number of information bits,
the third number of information bits is equal to the first number of information bits, and
the processor is further configured to determine the third number of information bits to indicate values of one or more fields for reception of a second PDSCH or for transmission of a second PUSCH.

14. The BS of claim 13, wherein the transceiver is further configured to:
    transmit the first PDSCH or receive a first PUSCH, wherein the first PDSCH or the first PUSCH include a transport block; and
    transmit the second PDSCH or receive the second PUSCH, wherein the second PDSCH or the second PUSCH include the transport block.

15. A method comprising:
receiving first configuration information for reception of first physical downlink control channels (PDCCHs), wherein a PDCCH from the first PDCCHs provides a first downlink control information (DCI) format that includes a first number of information bits;
receiving second configuration information for a location of a second number of information bits in the first DCI format, the second number of information bits being smaller than the first number of information bits;
receiving at least one of the first PDCCHs; and
determining, from the second number of information bits, values of one or more fields associated with reception of a first physical downlink shared channel (PDSCH) or with transmission of a first physical uplink shared channel (PUSCH).

16. The method of claim 15, further comprising:
determining the one or more fields include at least one of:
    a time domain resource allocation,
    a frequency domain resource allocation,
    an indication whether the second number of information bits correspond to a PDSCH reception or to a PUSCH transmission,
    a modulation coding scheme,
    a hybrid automatic repeat request (HARQ) process number, and
    a redundancy version; and
receiving the first PDSCH or transmitting the first PUSCH.

17. The method of claim 15, further comprising:
receiving third configuration information for a number of semi-persistently scheduled (SPS) PDSCHs or for a number of configured-grant (CG) PUSCHs;
determining, from the values of the one or more fields, activation or release for respective one or more:
SPS PDSCHs from the number of SPS PDSCHs, or
CG PUSCHs from the number of CG PUSCHs;
receiving an SPS PDSCH from the one or more SPS PDSCHs when the determination is for activation for the respective one or more SPS PDSCHs;
suspending reception of an SPS PDSCH from the one or more SPS PDSCH when the determination is for release for the respective one or more SPS PDSCHs;
transmitting a CG PUSCH from the one or more CG PUSCHs when the determination is for activation for the respective one or more CG PUSCHs; and
suspending transmission of a CG PUSCH from the one or more CG PUSCH when the determination is for release for the respective one or more CG PUSCHs.

18. The method of claim 15, further comprising:
receiving third configuration information for a number of semi-persistently scheduled (SPS) PDSCHs or for a number of configured-grant (CG) PUSCHs;
receiving the first PDSCH, wherein the first PDSCH includes a field with a value indicating activation or release of at least one SPS PDSCH from the number of SPS PDSCHs or of at least one CG PUSCH from the number of CG PUSCH;
receiving the at least one SPS PDSCH when the value indicates activation of the at least one SPS PDSCH;
suspending reception of the at least one SPS PDSCH when the value indicates release of the at least one SPS PDSCH;
transmitting the at least one CG PUSCH when the value indicates activation of the at least one CG PUSCH; and
suspending transmission of the at least one CG PUSCH when the value indicates release of the at least one CG PUSCH.

19. The method of claim 15, further comprising:
receiving third configuration information for reception of second PDCCHs, wherein a PDCCH from the second PDCCHs provides a second DCI format having a third number of information bits, wherein the third number of information bits is equal to the first number of information bits; and
determining, from the third number of information bits, values of one or more fields for reception of a second PDSCH or for transmission of a second PUSCH.

20. The method of claim 19, further comprising:
receiving the first PDSCH or transmitting the first PUSCH, wherein the first PDSCH or the first PUSCH include a transport block; and
receiving the second PDSCH or transmitting the second PUSCH, wherein the second PDSCH or the second PUSCH include the transport block.

\* \* \* \* \*